United States Patent
Kwon et al.

(10) Patent No.: US 11,606,293 B2
(45) Date of Patent: *Mar. 14, 2023

(54) BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

(71) Applicant: LG ELECTRONICS INC., Seoul (KR)

(72) Inventors: Woosuk Kwon, Seoul (KR); Minsung Kwak, Seoul (KR); Sejin Oh, Seoul (KR); Kyoungsoo Moon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 125 days.

This patent is subject to a terminal disclaimer.

(21) Appl. No.: 17/314,886

(22) Filed: May 7, 2021

(65) Prior Publication Data

US 2021/0281512 A1 Sep. 9, 2021

Related U.S. Application Data

(63) Continuation of application No. 16/666,069, filed on Oct. 28, 2019, now Pat. No. 11,032,195, which is a
(Continued)

(51) Int. Cl.
*H04L 12/741* (2013.01)
*H04L 45/74* (2022.01)
(Continued)

(52) U.S. Cl.
CPC ............... *H04L 45/74* (2013.01); *H04L 9/40* (2022.05); *H04L 12/18* (2013.01);
(Continued)

(58) Field of Classification Search
CPC ........... H04L 45/74; H04L 9/40; H04L 12/18; H04L 12/1863; H04L 47/34; H04L 69/22; H04L 69/324
(Continued)

(56) References Cited

U.S. PATENT DOCUMENTS

2008/0209295 A1 8/2008 Kim
2009/0034442 A1* 2/2009 Song ..................... H04H 20/30
370/310
(Continued)

FOREIGN PATENT DOCUMENTS

KR 10-2008-0079076 A 8/2008
KR 10-2013-0140117 A 12/2013
KR 10-2014-0054961 A 5/2014

OTHER PUBLICATIONS

ETSI, "Digital Video Braodcastirtg (DVB); Generic Stream Encapulation (GSE); Part 1: Protocol," ETSI TS 102 606-1, V1.2.1, Juy. 2014, 37 pgs.

*Primary Examiner* — Christopher M Crutchfield
*Assistant Examiner* — Jean F Voltaire
(74) *Attorney, Agent, or Firm* — Birch, Stewart, Kolasch & Birch, LLP

(57) ABSTRACT

A method of transmitting a broadcast signal, includes processing one or more input packets to generate one or more link layer packets, a link layer packet including a header and a payload, the header including packet type information representing a type of an input packet in the payload and payload configuration information representing a configuration of the payload, the payload configuration information representing whether the link layer packet carries a single input packet or not, wherein the type of the input packet is either an Internet Protocol (IP) packet or a Movie Picture Exports Group (MPEG) Transport Stream (TS) packet, the payload configuration information is set to 0 (zero) in
(Continued)

response to a layer packet including a single input packet, and 1 in response to a link layer packet including more than one input packet or a segmented part of one input packet, in response to the link layer packet including the single input packet, the header includes header mode information, the header mode information is set to 0 (zero) in response to a payload length that is less than 2048 bytes, 1 in response to a payload length that is larger than 2047 bytes; processing the one or more link layer packets to generate the broadcast signal; and transmitting the broadcast signal.

12 Claims, 84 Drawing Sheets

Related U.S. Application Data continuation of application No. 15/115,555, filed as application No. PCT/KR2015/011768 on Nov. 4, 2015, now Pat. No. 10,498,649.

(60) Provisional application No. 62/082,084, filed on Nov. 19, 2014, provisional application No. 62/075,167, filed on Nov. 4, 2014.

(51) Int. Cl.
*H04L 12/18* (2006.01)
*H04L 69/324* (2022.01)
*H04L 69/22* (2022.01)
*H04L 9/40* (2022.01)
*H04L 47/34* (2022.01)

(52) U.S. Cl.
CPC .......... *H04L 12/1863* (2013.01); *H04L 47/34* (2013.01); *H04L 69/22* (2013.01); *H04L 69/324* (2013.01)

(58) Field of Classification Search
USPC .......................................... 370/392
See application file for complete search history.

(56) References Cited

U.S. PATENT DOCUMENTS

| | | | |
|---|---|---|---|
| 2009/0296624 A1* | 12/2009 | Ryu | H04H 20/72 370/312 |
| 2009/0307727 A1* | 12/2009 | Thesling | H04N 7/10 725/127 |
| 2010/0195499 A1* | 8/2010 | Dattagupta | H04N 21/2381 370/235 |
| 2011/0064082 A1 | 3/2011 | Zalewski | |
| 2013/0297822 A1 | 11/2013 | Park et al. | |
| 2014/0123199 A1 | 5/2014 | Kim et al. | |
| 2014/0314103 A1 | 10/2014 | Michael | |
| 2015/0063357 A1* | 3/2015 | Hwang | H04L 5/0044 370/392 |

* cited by examiner

FIG. 2

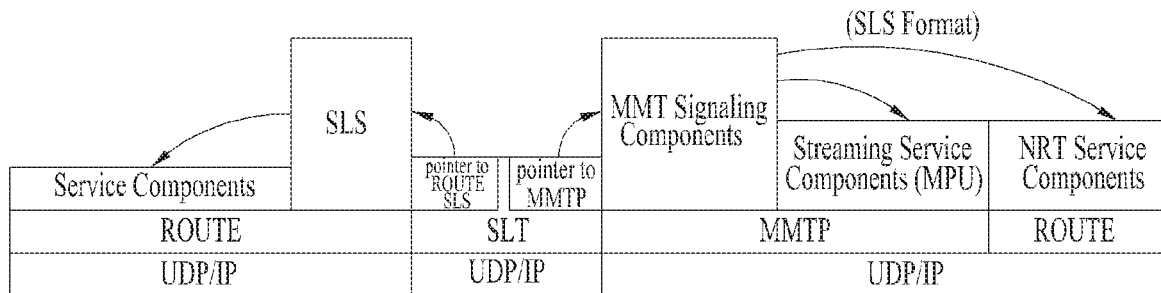

FIG. 3

| Element or Attribute Name | Use |
|---|---|
| SLT | |
|    @bsid | 1 |
|    @sltSectionVersion | 1 |
|    @sltSectionNumber | 0..1 |
|    @totalSltSectionNumbers | 0..1 |
|    @language | 0..1 |
|    @capabilities | 0..1 |
|    InetSigLoc | 0..1 |
|    Service | 1..N |
|       @serviceId | 1 |
|       @SLT serviceSeqNumber | 1 |
|       @protected | 0..1 |
|       @majorChannelNo | 1 |
|       @minorChannelNo | 1 |
|       @serviceCategory | 1 |
|       @shortServiceName | 1 |
|       @hidden | 0..1 |
|       @slsProtocolType | 1 |
|       BroadcastSignaling | 0..1 |
|       @slsPlpId | 0..1 |
|       @slsDestinationIpAddress | 0..1 |
|       @slsDestinationUdpPort | 0..1 |
|       @slsSourceIpAddress | 0..1 |
|       @slsMajorProtocolVersion | 0..1 |
|       @SlsMinorProtocolVersion | 0..1 |
|       @serviceLanguage | 0..1 |
|       @broadbandAccessRequired | 0..1 |
|       @capabilities | 0..1 |
|       InetSigLoc | 0..1 |

FIG. 5

| Element or Attribute Name | | | Use |
|---|---|---|---|
| bundleDescription | | | |
| | userServiceDescription | | |
| | | @serviceId | M |
| | | @atsc: serviceId | M |
| | | @atsc: serviceStatus | OD |
| | | @atsc: fullMPDUri | M |
| | | @atsc: sTSIDUri | M |
| | | name | 0..N |
| | | lang | CM |
| | | serviceLanguage | 0..N |
| | | atsc: capabilityCode | 0..1 |
| | | deliveryMethod | 1..N |
| | | r12: broadcastAppService | 1..N |
| | | basePattern | 1..N |
| | | r12: unicastAppService | 0..N |
| | | basePattern | 1..N |

FIG. 6

| Element and Attribute Names | | | | Use |
|---|---|---|---|---|
| S - TSID | | | | |
| | @serviceId | | | O |
| | RS | | | 1..N |
| | | @bsid | | OD |
| | | @sIpAddr | | OD |
| | | @dIpAddr | | OD |
| | | @dport | | OD |
| | | @PLPID | | OD |
| | | LS | | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

FIG. 7

| Element or Attribute Name | | | | | Use |
|---|---|---|---|---|---|
| bundleDescription | | | | | |
| | userServiceDescription | | | | |
| | | @serviceId | | | M |
| | | @atsc: serviceId | | | M |
| | | Name | | | 0..N |
| | | | Lang | | CM |
| | | serviceLanguage | | | 0..N |
| | | atsc: capabilityCode | | | 0..1 |
| | | atsc: Channel | | | 1 |
| | | | @atsc: majorChannelNo | | M |
| | | | @atsc: minorChannelNo | | M |
| | | | @atsc: serviceLang | | O |
| | | | @atsc: serviceGenre | | O |
| | | | @atsc: serviceIcon | | M |
| | | | atsc: ServiceDescription | | 0..N |
| | | | | @atsc: serviceDescrText | M |
| | | | | @atsc: serviceDescrLang | O |
| | | atsc:mpuComponent | | | 0..1 |
| | | | @atsc: mmtPackageId | | M |
| | | | @atsc: next MmtPackageId | | O |
| | | atsc: routeComponent | | | 0..1 |
| | | | @atsc: sTSIDUri | | M |
| | | | @slsPlpId | | OD |
| | | | @slsDestinationIpAddress | | OD |
| | | | @slsDestinationUdpPort | | M |
| | | | @slsSourceIpAddress | | M |
| | | | @slsMajorProtocolVersion | | OD |
| | | | @SlsMinorProtocolVersion | | OD |
| | | atsc: broadbandComponent | | | 0..1 |
| | | | @atsc: fullfMPDUri | | M |
| | | atsc: ComponentInfo | | | 1..N |
| | | | @atsc: component Type | | M |
| | | | @atsc: component Role | | M |
| | | | @atsc: component ProtectedFlag | | OD |
| | | | @atsc: component Id | | M |
| | | | @atsc: component Name | | O |

FIG. 13
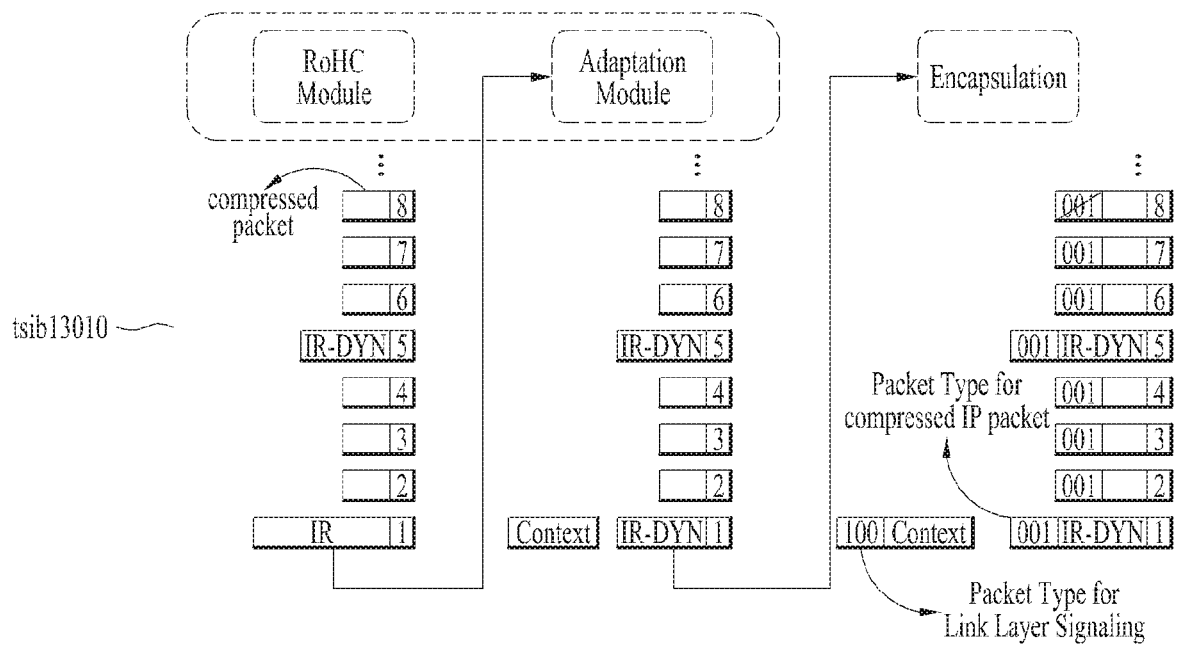
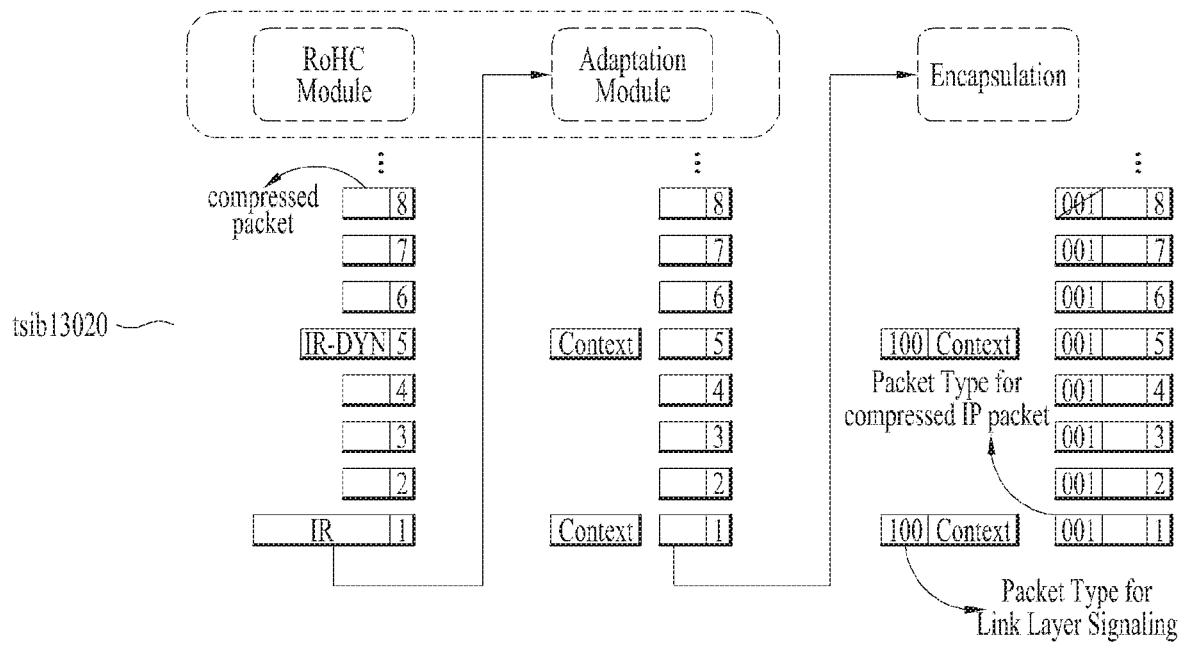

FIG. 14

Link_Mapping_Table (tsib14010):

| Syntax | Number of bits | Mnemonic |
|---|---|---|
| Link_Mapping_Table() { | | |
|  signaling_type | 8 | "0x01" |
|  PLP_ID | 6 | uimsbf |
|  Reserved | 2 | |
|  num_session | 8 | uimsbf |
|  for(i = 0; i < num_session; i++) { | | |
|   src_IP_add | 32 | uimsbf |
|   dst_IP_add | 32 | uimsbf |
|   src_UDP_port | 16 | uimsbf |
|   dst_UDP_port | 16 | uimsbf |
|   SID_flag | 1 | bslbf |
|   compressed_flag | 1 | bslbf |
|   reserved | 6 | '000000' |
|   if(SID_flag == "1") { | | |
|    SID | 8 | uimsbf |
|   } | | |
|   if(compressed_flag == "1") { | | |
|    context_id | 8 | uimsbf |
|   } | | |
|  } | | |
| } | | |

ROHC-U_description_table (tsib14020):

| Syntax | Number of bits | Mnemonic |
|---|---|---|
| ROHC-U_description_table { | | |
|  signaling_type | 8 | "0x02" |
|  PLP_ID | 6 | uimsbf |
|  adaptation_mode | 2 | uimsbf |
|  context_config | 2 | bslbf |
|  reserved | 6 | bslbf |
|  context_id | 8 | uimsbf |
|  context_profile | 8 | uimsbf |
|  if (context_config = 0x01) { | | |
|   context_length | 8 | uimsbf |
|   static_chain_byte () | var | uimsbf |
|  } | | |
|  else if (context_config = 0X02) { | | |
|   context_length | 8 | uimsbf |
|   dynamic_chain_byte () | var | uimsbf |
|  } | | |
|  else if (context_config = 0x03) { | | |
|   context_length | 8 | uimsbf |
|   static_chain_byte () | var | uimsbf |
|   dynamic_chain_byte () | var | uimsbf |
|  } | | |
| } | | |

FIG. 22

| Flag | | Operation | | PHY Input Format |
|---|---|---|---|---|
| HCF | EF | Header Compression | Encapsulation | |
| 1 | 1 | Enable | Enable | Link Layer Packet with Compressed IP payload |
| 1 | 0 | Enable | Disable | Not used |
| 0 | 1 | Disable | Enable | Link Layer Packet with IP payload |
| 0 | 0 | Disable | Disable | IP Packet direct input |

FIG. 24

Table 6.1 RoHC Profiles

| Identifier | Profile | Protocol Combination | Reference | Usage for ATSC 3.0 |
|---|---|---|---|---|
| 0×0000 | RoHC uncompressed | No Compression | RFC 5795 | Optional |
| 0×0001 | RoHC RTP | RTP/UDP/IP | RFC 3095, RFC 4815 | Optional |
| 0×0002 | RoHC UDP | UDP/IP | RFC 3095, RFC 4815 | Mandatory |
| 0×0003 | RoHC ESP | ESP/IP | RFC 3095, RFC 4815 | Not Used |
| 0×0004 | RoHC IP | IP | RFC 3843, RFC 4815 | Mandatory |
| 0×0007 | RoHC RTP/UDP-Life | RTP/UDP-Life/IP | RFC 4019, RFC 4815 | Optional |
| 0×0008 | RoHC UDP-Life | UDP-Life/IP | RFC 4019, RFC 4815 | Optional |
| 0×0101 | RoHCv2 RTP | RTP/UDP/IP | RFC 5225 | Optional |
| 0×0102 | RoHCv2 UDP | UDP/IP | RFC 5225 | Mandatory |
| 0×0103 | RoHCv2 ESP | ESP/IP | RFC 5225 | Not Used |
| 0×0104 | RoHCv2 IP | IP | RFC 5225 | Mandatory |
| 0×0107 | RoHCv2 RTP/UDP-Life | RTP/UDP-Life/IP | RFC 5225 | Optional |
| 0×0108 | RoHCv2 UDP-Life | UDP-Life/IP | RFC 5225 | Optional |

FIG. 28

| Transport Mode | Static Chain | Dynamic Chain | General Header Compressed Packet | Associated Configuration Mode |
|---|---|---|---|---|
| Mode 1 | Signaling | Signaling | Normal Data Pipe | Mode 1, Mode 2 |
| Mode 2 | Signaling | Base Data Pipe | | |
| Mode 3 | Base Data Pipe | Base Data Pipe | | |
| Mode 4 | Signaling | Normal Data Pipe (IR-DYN packet) | | Mode 3 |
| Mode 5 | Base Data Pipe | | | |

FIG. 30

| Syntax | Description |
|---|---|
| ATSC3.0_Link_Layer_Packet() { <br>    Packet_Type <br>    if (Packet_Type =="000" \|\| Packet_Type =="001") { <br>        Link_Layer_Packet_Header_for_IP () <br>    } <br>    else if (Packet_Type =="010") { <br>        Link_Layer_Packet_Header_for_Compressed_IP () <br>    } <br>    else if (Packet_Type =="011") { <br>        Link_Layer_Packet_Header_for_TS () <br>    } <br>    else if (Packet_Type =="110") { <br>        Link_Layer_Packet_Header_for_Signaling () <br>    } <br>    else if (Packet_Type =="111") { <br>        Link_Layer_Packet_Header_for_Framed_Packet () <br>    } <br>    else if { <br>        Reserved <br>    } <br>    Link_Layer_Packet_Payload () <br>} | Table 8.1 <br><br> Clause 0 <br><br><br> Clause 8.2 <br><br><br> Clause 8.3 <br><br><br> Clause 8.4 <br><br><br> Clause 8.5 |

FIG. 32

| Syntax | Number of bits | Mnemonic |
|---|---|---|
| ATSC3.0_Link_Layer_Packet_Header() { | | |
|     Packet_Type | 3 | '000' or '001' |
|     Payload_Config | 1 | bslbf |
|     if (Payload_Config =="0") { | | |
|         Count | 4 | bslbf |
|     } | | |
|     else if (Payload_Config =="1") { | | |
|         Last_Segment_Indicator | 1 | bslbf |
|         Segment_ID | 3 | uimsbf |
|         Segment_Sequence_Number | 4 | uimsbf |
|         if (Last_Segment_Indicator =="0") { | | |
|             Segment_Length_ID | 4 | bslbf |
|         } | | |
|         else { | | |
|             Last_Segment_Length | 12 | uimsbf |
|         } | | |
|     } | | |
| } | | |

| PC field value | Meaning | Next Field | Extended Header Size | Extended Header Field | Total Header Length |
|---|---|---|---|---|---|
| 0 | Single IP packet or multiple IP packets | Count | - | - | 1 byte |
| 1 | Segmented IP packet | LI(=="0"),Seg_ID | 1 byte | Seg_SN,Seg_Len_ID | 2 bytes |
| | | LI(=="1"),Seg_ID | 2 bytes | Seg_SN,L_Seg_Len | 3 bytes |

FIG. 33

| Count field (4bits) | Number of concatenated (connected) IP packets | Count field (4bits) | Number of concatenated (connected) IP packets |
|---|---|---|---|
| 0000 | 1 | 1000 | 9 |
| 0001 | 2 | 1001 | 10 |
| 0010 | 3 | 1010 | 11 |
| 0011 | 4 | 1011 | 12 |
| 0100 | 5 | 1100 | 13 |
| 0101 | 6 | 1101 | 14 |
| 0110 | 7 | 1110 | 15 |
| 0111 | 8 | 1111 | 16 | t61010

| Segment length ID field | Segment length (byte) | Segment length ID field | Segment length (byte) |
|---|---|---|---|
| 0000 | 512 (= min_Len) | 1000 | 2560 |
| 0001 | 768 | 1001 | 2816 |
| 0010 | 1024 | 1010 | 3072 |
| 0011 | 1280 | 1011 | 3328 |
| 0100 | 1536 | 1100 | 3584 |
| 0101 | 1792 | 1101 | 3840 |
| 0110 | 2048 | 1110 | 4096 |
| 0111 | 2304 | 1111 | 4352 | t61020

FIG. 39

| Syntax | Number of bits | Mnemonic |
|---|---|---|
| ATSC3.0_Link_Layer_Packet_Header() { | | |
|     Packet_Type | 3 | '010' |
|     Payload_Config | 1 | bslbf |
|     if (Payload_Config =="0") { | | |
|         Common_Context_ID_Indicator | 1 | bslbf |
|         Count | 3 | uimsbf |
|         for(i=0; i<Count; i++) { | | |
|             Length | 16 | uimsbf |
|         } | | |
|         if (CI =="1") { | | |
|             Common_CID | 8 or 16 | bslbf |
|         } | | |
|     } | | |
|     else { | | |
|         Last_Segment_Indicator | 1 | bslbf |
|         Segment_ID | 3 | bslbf |
|         Segment_Sequence_Number | 4 | bslbf |
|         if (Last_Segment_Indicator =="0") { | | |
|             Segment_Length_ID | 4 | bslbf |
|         } | | |
|         else { | | |
|             Last_Segment_Indicator | 12 | uimsbf |
|         } | | |
|     } | | |
| } | | |

FIG. 45

| Syntax | Number of bits | Mnemonic |
|---|---|---|
| ATSC3.0_Link_Layer_Packet_Header() { | | |
|     Packet_Type | 3 | '110' |
|     Payload_Config | 1 | bslbf |
|     if (Payload_Config =="0") { | | |
|         Count | 4 | uimsbf |
|         Signaling_Class | 3 | bslbf |
|         Information_Type | 3 | bslbf |
|         Signaling_Format | 2 | bslbf |
|         if (Signaling_Format =="1x") { | | |
|             for(i=0; i<Count; i++){ | | |
|                 Length | 16 | uimsbf |
|             } | | |
|         } | | |
|     } | | |
|     else { | | |
|         Last_Segment_Indicator | 1 | bslbf |
|         Segment_ID | 3 | uimsbf |
|         Segment_Sequence_Number | 4 | uimsbf |
|         if (Last_Segment_Indicator =="0") { | | |
|             Segment_Length_ID | 4 | bslbf |
|             if (Segment_Sequence_Number =="0000") { | | |
|                 Signaling_Class | 3 | bslbf |
|                 Information_Type | 3 | bslbf |
|                 Signaling_Format | 2 | bslbf |
|             } | | |
|         } | | |
|         else { | | |
|             Last_Segment_Length | 12 | uimsbf |
|         } | | |
|     } | | |
| } | | |

FIG. 47

| Syntax | Number of bits | Mnemonic |
|---|---|---|
| ATSC3.0_Link_Layer_Packet_Header() { | | |
|     Packet_Type | 3 | '110' |
|     Reserved | 5 | bslbf |
|     framed_packet() | | |
| } | | |

FIG. 48

| Syntax | Number of bits | Format |
|---|---|---|
| framed_packet () { | | |
| ethernet_type | 16 | uimsbf |
| length | 16 | '11' |
| packet() | Var. | bslbf |
| } | | |

FIG. 49

| Syntax | Number of bits | Mnemonic |
|---|---|---|
| Fast_Information_Chunk(){ | | |
|     FIT_data_version | 8 | uimsbf |
|     num_broadcast | 8 | uimsbf |
|     for(i=0; i<num_broadcast; i++){ | | |
|         broadcast_id | 16 | uimsbf |
|         delivery_system_id | 16 | uimsbf |
|         base_DP_id | 8 | uimsbf |
|         base_DP_version | 5 | uimsbf |
|         reserved | 3 | '111' |
|         num_service | 8 | uimsbf |
|         for(j=0; j<num_service; j++){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for(k=0; k<num_component; k++){ | | |
|                 component_id | 8 | bslbf |
|                 DP_id | 8 | bslbf |
|                 RoHC_init_descriptor() | var | |
|             } | | |
|         } | | |
|     } | | |
| } | | |

FIG. 51

| Synrax | No. Bits | Format |
|---|---|---|
| Emergency_Alert_Table (){ | | |
|     table_id | 8 | uimsbf |
|     section_synax-indicator | 1 | '0' |
|     private_indicator | 1 | '1' |
|     reserved | 2 | '11' |
|     secion_length | 12 | uimsbf |
|     table_id_extension { | | |
|         EAT_protocol_version | 8 | 0X0 |
|         reserved | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     automatic_thing_flag | 1 | bslbf |
|     num_EAS_messages | 7 | uimsbf |
|     IF(automatic_tuning_flag==0X01) { | | |
|         automatic_tuning_channel_number | 8 | uimsbf |
|         automatic_tuning_DP_id | 8 | uimsbf |
|         automatic_tuning_service_id | 16 | uimsbf |
|     } | | |
|     for (m=0; m<num_EAS_messages; m++) { | | |
|         EAS_message_id | 32 | uimsbf |
|         EAS_IP_version_flag | 1 | bslbf |
|         EAS_message_transfer_type | 3 | uimsbf |
|         EAS_message_encoding_type | 3 | uimsbf |
|         EAS_NRT_flag | 1 | bslbf |
|         if(EAS_message_transfer_type==0X02) { | | |
|             reserved | 4 | '1111' |
|             EAS_message_length/*N*/ | 12 | uimsbf |
|             EAS_message_bytes() | 8*N | var |
|         } | | |
|         else if (EAS_message_transfer_type==0X003) { | | |
|             IP_address | 32 or 128 | uimsbf |
|             UDP_port_num | 16 | uimsbf |
|             DP_id | 8 | uimsbf |
|         } | | |
|         if(EAS_NRT_flag==0X01){ | | |
|             EAS_NRT_service_id | 16 | uimsbf |
|         } | | |
|     } | | |
| } | | |

FIG. 52

| Information Type for Header Compression | Description |
|---|---|
| 000 | Initialization Information |
| 001 | Configytation Parameters |
| 010 | Static Chain |
| 011 | Dynamic Chain |
| 100 | Reserved |
| 101 | Reserved |
| 110 | Reserved |
| 111 | Reserved |

FIG. 53

| Syntax | Number of bits | Mnemonic |
|---|---|---|
| Payload_for_Initialization() { | | |
|     num_RoHC_channels | 8 | uimsbf |
|     for(i=0; i<num_DP; i++){ | | |
|         RoHC_channels_id | 8 | uimsbf |
|         max_cid | 16 | uimsbf |
|         large_cids | 1 | bslbf |
|         reserved | 3 | '111' |
|         num_profiles | 4 | uimsbf |
|         for(j=0; j<num_profiles; j++){ | | |
|             profiles() | var | uimsbf |
|         } | | |
|         num_IP_stream | 8 | uimsbf |
|         for(k=0; k<num_IP_stream; k++){ | | |
|             IP_address() | var | uimsbf |
|         } | | |
|     } | | |
| } | | |

FIG. 54

| Syntax | Number of bits | Mnemonic |
|---|---|---|
| Payload_for_ROHC_configuration() { | | |
|     RoHC_channel_id | 8 | uimsbf |
|     num_context | 8 | uimsbf |
|     for(i=0; i<num_DP; i++){ | | |
|         context_id | 8 or 16 | uimsbf |
|         context_profile | 8 | uimsbf |
|         packet_configuration_mode | 4 | uimsbf |
|         context_transmission_mode | 4 | uimsbf |
|     } | | |
| } | | |

FIG. 55

| Syntax | Number of bits | Mnemonic |
|---|---|---|
| Payload_for_static_chain() { | | |
|     context_id | 8 or 16 | uimsbf |
|     context_profile | 8 | uimsbf |
|     static_chain_length | 8 | uimsbf |
|     static_chain () | var | bslbf |
|     dynamic_chain_incl | 1 | uimsbf |
|     reserved | 7 | '111' |
|     if(dynamic_chain_incl == 0x01){ | | |
|         dynamic_chain_length | 8 | uimsbf |
|         dynamic_chain () | var | bslbf |
|     } | | |
| } | | |

FIG. 56

| Syntax | Number of bits | Mnemonic |
|---|---|---|
| Payload_for_dynamic_chain() { | | |
|     context_id | 8 or 16 | |
|     context_profile | 8 | uimsbf |
|     dynamic_chain_length | 8 | uimsbf |
|     dynamic_chain () | var | bslbf |
| } | | |

FIG. 58

| Syntax | No. of bits | Mnemonic |
|---|---|---|
| ATSC3.0_LLP_Header() { | | |
|   Packet_Type | 3 | '000' or '001' |
|   Payload_Config | 1 | bslbf |
|   if(Payload_Config=="0") { | | |
|     Header_Mode | 1 | bslbf |
|     if(Header_Mode =="0") { | | |
|       Length | 11 | uimsbf |
|     } | | |
|     else if(Header_Mode =="1") { | | |
|       Length | 16 | uimsbf |
|       Label_flag | 1 | bslbf |
|       Reserved | 2 | |
|       if(Label_flag=="1") { | | |
|         Label | 24 | uimsbf |
|       } | | |
|     } | | |
|   } | | |
|   else if(Payload_Config=="1"){ | | |
|     SC_flag | 1 | bslbf |
|     if(SC_flag=="0") { | | |
|       Segment_ID | 3 | uimsbf |
|       Segment_SN | 4 | uimsbf |
|       if(Segment_SN=="0000") { | | |
|         F_Segment_Length | 11 | uimsbf |
|         Label_flag | 1 | bslbf |
|         if(Label_flag=="1") { | | |
|           Label | 24 | uimsbf |
|         } | | |
|       } | | |
|       else { | | |
|         Last_Segment_Indicator | 1 | bslbf |
|         Segment_Length_ID | 3 | bslbf |
|       } | | |
|     } | | |
|     else { | | |
|       Count | 3 | uimsbf |
|       Length_Mode | 1 | bslbf |
|       for (i=0; i<Count; i++) { | | |
|         if(Length_Mode=="0") | | |
|           Length | 11 | uimsbf |
|         else | | |
|           Length | 16 | uimsbf |
|       } | | |
|       Padding | var | |
|     } | | |
|   } | | |
| } | | |

FIG. 61

| Segment order | Type | PC | S/C | Seg ID | Seg SN | Length | LI | Seg LenID |
|---|---|---|---|---|---|---|---|---|
| 1 | Same | 1 | 0 | Same | 0000 | Indicates payload length | - | - |
| 2 | | | | | 0001 | - | 0 | Select one value from table |
| 3 | | | | | 0010 | - | 0 | |
| 4 | | | | | 0011 | - | 0 | |
| 5 | | | | | 0100 | - | 0 | |
| 6 | | | | | 0101 | - | 0 | |
| 7 | | | | | 0110 | - | 0 | |
| 8 (Last) | | | | | 0111 | - | 1 | |

FIG. 64

| Packet configuration | 1st byte | 2nd byte | 3rd byte | Header Length | comment |
|---|---|---|---|---|---|
| Short Single Packet | xxx00xxx | xxxxxxxx | - | 2B | |
| Long Single Packet | xxx01xxx | xxxxxxxx | xxxxx0xx | 3B | |
| Segmentation (1st segment) | xxx10xxx | 0000xxxx | xxxxxxx0 | 3B | |
| Segmentation (Int. or Last segment) | xxx10xxx | 1xxxxxxx | - | 2B | |
| Segmentation (Int. or Last segment) | xxx10xxx | x1xxxxxx | - | 2B | |
| Segmentation (Int. or Last segment) | xxx10xxx | xx1xxxxx | - | 2B | |
| Segmentation (Int. or Last segment) | xxx10xxx | xxx1xxxx | - | 2B | |
| Short Packet Concatenation | xxx11nn0 | xxxxxxxx | xxxxxxxx | (11n/8 +1) B | Padding bits are required for byte align |
| Long Packet Concatenation | xxx11nn1 | xxxxxxxx | xxxxxxxx | (2n+1) B | |

FIG. 72 t72010:

| Count (2bits) | No. of Concatenated Packets (N) | Size for Length indication | | | Total Header Length | Header portion per one input packet |
|---|---|---|---|---|---|---|
| | | Length field (b) | Padding bit (b) | Total (B) | | |
| 00 | 2 | 18 | 6 | 3 | 4 | 2.00 |
| 01 | 3 | 27 | 5 | 4 | 5 | 1.67 |
| 10 | 4 | 36 | 4 | 5 | 6 | 1.50 |
| 11 | 5 | 45 | 3 | 6 | 7 | 1.40 | t72020:

| Count (2bits) | No. of Concatenated Packets (N) | Size for Length indication | | | Total Header Length | Header portion per one input packet |
|---|---|---|---|---|---|---|
| | | Length field (b) | Padding bit (b) | Total (B) | | |
| 00 | 2 | 28 | 4 | 4 | 5 | 2.50 |
| 01 | 3 | 42 | 6 | 6 | 6 | 2.33 |
| 10 | 4 | 56 | 0 | 0 | 7 | 2.00 |
| 11 | 5 | 70 | 2 | 2 | 10 | 2.00 |

FIG. 74

| Packet Type Value | Meaning |
|---|---|
| 000 | IPv4 |
| 001 | IPv6 |
| 010 | Compressed IP Packet |
| 011 | MPEG-2 Transport Stream |
| 100 | Reserved |
| 101 | Reserved |
| 110 | Signaling |
| 111 | Framed_Packet_Type |

| Len_ID | Length (byte) |
|---|---|
| 0000 | 512 |
| 0001 | 768 |
| 0010 | 1024 |
| 0011 | 1280 |
| 0100 | 1536 |
| 0101 | 1792 |
| 0110 | 2048 |
| 0111 | 2304 |
| 1000 | 2560 |
| 1001 | 2816 |
| 1010 | 3072 |
| 1011 | 3328 |
| 1100 | 3584 |
| 1101 | 3840 |
| 1110 | 4096 |
| 1111 | 4352 |

Single packet

| Type (3b) | PC (00) | LM (00) | E (1b) |

| Type (3b) | PC (00) | LM (01) | E (1b) | Len_ID (4b) | R (4b) |

| Type (3b) | PC (00) | LM (10) | E (1b) | Length (short packet) (11b) | R (5b) |

| Type (3b) | PC (00) | LM (11) | E (1b) | Length (long packet) (2B) |

|←——Fixed Header (1B)——→|←——————Length Part——————→|

FIG. 81

| T field | S field | Packet Type Value | Meaning |
|---|---|---|---|
| 0 | - | - | IP (v4 or v6) |
| 1 | 0 | 000 | Compressed IP Packet |
| | | 001 | MPEG-2 Transport Stream |
| | | 010 – 110 | Reserved |
| | | 111 | Extension |
| | 1 | 000 | Signaling for Fast channel scan and Service Acquisition |
| | | 001 | Signaling for Emergency Alert |
| | | 010 | Signaling for Header Compression |
| | | 011 – 110 | Reserved |
| | | 111 | Multiple signaling information |

| Packet Configuration | Length Extension | Seg_ID | Seg_SN | LI | Count | E | Optional Header Size (bits) |
|---|---|---|---|---|---|---|---|
| Single packet | 5 | - | - | - | - | 1 | 6 |
| Segmentation | - | 3 | 5 | 1 | - | 1 | 10 |
| Concatenation | 5 | - | - | - | 5 | 1 | 10 |

2-byte header is added for byte alignment (b)

| Packet Configuration | Length Extension | Seg_ID | Seg_SN | LI | Count | E | Optional Header Size (bits) | Note |
|---|---|---|---|---|---|---|---|---|
| Single packet | 5 | - | - | - | - | 1 | 6 | |
| Segmentation | - | 3 | 3 | 1 | - | 1 | 8 | Support max. 16k |
| Concatenation | 4 | - | - | - | 3 | 1 | 8 | Support max. 16k |
| Concatenation | 3 | - | - | - | 4 | 1 | 8 | Support max. 16k |

Up to 16 kB packet is supported in order to add only 1-byte header (c)

| Packet Configuration | Length Extension | Seg_ID | Seg_SN | LI | Count | E | Optional Header Size (bits) |
|---|---|---|---|---|---|---|---|
| Single packet | 3 | - | - | - | - | 1 | 6 |
| Segmentation | - | 3 | 3 | 1 | - | 1 | 8 |
| Concatenation | 3 | - | - | - | 3 | 1 | 7 |

Only 1-byte header is added while 65 kB packet is supported

FIG. 83
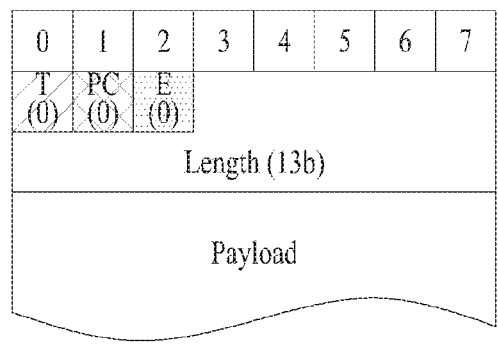
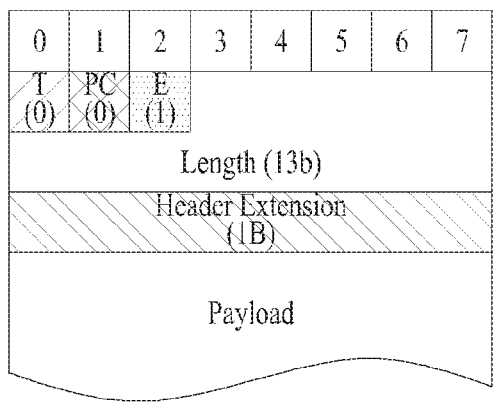
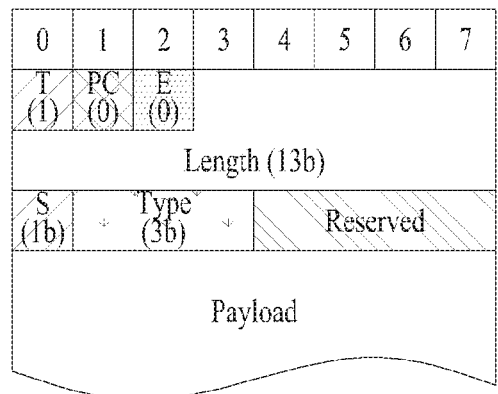
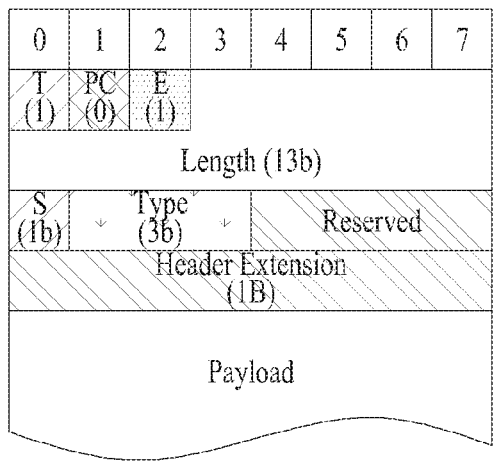

BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

CROSS-REFERENCE TO RELATED APPLICATIONS

This application is a Continuation of U.S. patent application Ser. No. 16/666,069 filed on Oct. 28, 2019, which is a Continuation of U.S. patent application Ser. No. 15/115,555 filed on Jul. 29, 2016 (now U.S. Pat. No. 10,498,649 issued on Dec. 3, 2019), which was filed as the National Phase of PCT/KR2015/011768 filed on Nov. 4, 2015, which claims priority under 35 U.S.C. § 119(e) to U.S. Provisional Application Nos. 62/075,167 filed on Nov. 4, 2014 and 62/082,084 filed on Nov. 19, 2014, all of these applications are hereby expressly incorporated by reference into the present application.

BACKGROUND OF THE INVENTION

Field of the Invention

The present invention relates to an apparatus for transmitting a broadcast signal, an apparatus for receiving a broadcast signal and methods for transmitting and receiving a broadcast signal.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

SUMMARY OF THE INVENTION

A digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

A method of transmitting a broadcast signal according to an embodiment of the present invention includes: generating one or more input packets according to a first protocol; generating one or more link layer packets including the one or more input packets according to a second protocol, wherein each of the one or more link layer packets includes a header and a payload, wherein the header includes packet type information indicating types of the input packets, and payload configuration information indicating whether the payload includes one input packet, more than one input packet, or a part of one input packet; and generating a broadcast signal including the one or more link layer packets.

The header may further include header extension information indicating whether an extension header is included in the header, when the payload configuration information indicates that the payload includes one input packet.

The header may further include S/C information indicating whether the payload includes more than one input packet or a segment including part of data of one input packet, when the payload configuration information indicates that the payload includes more than one input packet or a part of one input packet.

When the S/C information indicates that the payload includes a segment including part of data of one input packet, the header may further include segment sequence number information indicating a sequence number of the segment in the one input packet.

When the S/C information indicates that the payload includes a segment including part of data of one input packet, the header may further include last segment identification information indicating whether the segment is the last segment in the one input packet.

When the S/C information indicates that the payload includes more than one input packet, the header may further include count information indicating the number of input packets included in the link layer packet.

The header may further include length information indicating a length of the payload, wherein the length information is provided in the form of a length identifier, wherein a payload length corresponding to a value allocated to the length identifier is predetermined by a rule in a broadcast system.

The header may include packet type flag information indicating whether a packet of a higher layer, included in the payload, is a packet conforming to a default protocol, and data identification information indicating whether data carried by the packet of the higher layer, included in the payload, corresponds to broadcast data or signaling information, wherein combinations of the packet type flag information and the data identification information are used to identify data included in the payload.

An apparatus for transmitting a broadcast signal according to another embodiment of the present invention includes: a first protocol processor for generating one or more input packets according to a first protocol; a second protocol processor for generating one or more link layer packets including the one or more input packets according to a second protocol, wherein each of the one or more link layer packets includes a header and a payload, w % herein the header includes packet type information indicating types of the input packets, and payload configuration information indicating whether the payload includes one input packet, more than one input packet, or a part of one input packet; and a broadcast signal generator for generating a broadcast signal including the one or more link layer packets.

The header may further include header extension information indicating whether an extension header is included in the header, when the payload configuration information indicates that the payload includes one input packet.

The header may further include S/C information indicating whether the payload includes more than one input packet or a segment including part of data of one input packet, when the payload configuration information indicates that the payload includes more than one input packet or a part of one input packet.

When the S/C information indicates that the payload includes a segment including part of data of one input packet, the header may further include segment sequence number information indicating a sequence number of the segment in the one input packet.

When the S/C information indicates that the payload includes a segment including part of data of one input packet, the header may further include last segment identification information indicating whether the segment is the last segment in the one input packet.

When the S/C information indicates that the payload includes more than one input packet, the header may further include count information indicating the number of input packets included in the link layer packet.

The header may further include length information indicating a length of the payload, wherein the length information is provided in the form of a length identifier, wherein a payload length corresponding to a value allocated to the length identifier is predetermined by a rule in a broadcast system.

The present invention can control quality of service (QoS) with respect to services or service components by processing data on the basis of service characteristics, thereby providing various broadcast services.

The present invention can achieve transmission flexibility by transmitting various broadcast services through the same radio frequency (RF) signal bandwidth.

The present invention can provide methods and apparatuses for transmitting and receiving broadcast signals, which enable digital broadcast signals to be received without error even when a mobile reception device is used or even in an indoor environment.

The present invention can effectively support future broadcast services in an environment supporting future hybrid broadcasting using terrestrial broadcast networks and the Internet.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a relation between an SLT and service layer signaling (SLS) according to an embodiment of the present invention;

FIG. 3 illustrates an SLT according to an embodiment of the present invention;

FIG. 5 illustrates a USBD fragment for ROUTE/DASH according to an embodiment of the present invention;

FIG. 6 illustrates an S-TSID fragment for ROUTE/DASH according to an embodiment of the present invention;

FIG. 7 illustrates a USBD/USD fragment for MMT according to an embodiment of the present invention:

FIG. 13 illustrates an example of adaptation modes in IP header compression according to an embodiment of the present invention (transmitting side);

FIG. 14 illustrates a link mapping table (LMT) and an RoHC-U description table according to an embodiment of the present invention;

FIG. 22 illustrates operations in the link layer and formats of a packet transferred to a physical layer depending on flag values according to an embodiment of the present invention;

FIG. 24 illustrates RoHC profiles according to an embodiment of the present invention;

FIG. 28 illustrates combinations of information which can be transmitted out of band according to an embodiment of the present invention;

FIG. 30 illustrates a syntax of a link layer packet structure according to an embodiment of the present invention;

FIG. 32 illustrates a syntax of the link layer packet header structure when IP packets are delivered to the link layer according to another embodiment of the present invention;

FIG. 33 illustrates values of fields in the link layer packet header when IP packets are transmitted to the link layer according to another embodiment of the present invention;

FIG. 39 illustrates a syntax of the link layer packet header for RoHC transmission according to an embodiment of the present invention;

FIG. 45 illustrates a syntax of the structure of the link layer packet when signaling information is transmitted to the link layer according to another embodiment of the present invention;

FIG. 47 illustrates a syntax of the structure of the link layer packet for framed packet transmission according to an embodiment of the present invention;

FIG. 48 illustrates a syntax of a framed packet according to an embodiment of the present invention;

FIG. 49 illustrates a syntax of a fast information channel (FIC) according to an embodiment of the present invention;

FIG. 51 illustrates a syntax of an emergency alert table (EAT) according to an embodiment of the present invention;

FIG. 52 illustrates a method for identifying information related to header compression, which is included in a payload of a link layer packet according to an embodiment of the present invention;

FIG. 53 illustrates initialization information according to an embodiment of the present invention;

FIG. 54 illustrates configuration parameters according to an embodiment of the present invention;

FIG. 55 illustrates static chain information according to an embodiment of the present invention;

FIG. 56 illustrates dynamic chain information according to an embodiment of the present invention;

FIG. 58 illustrates a syntax of the structure of the header of a link layer packet according to another embodiment of the present invention;

FIG. 61 is a table showing a case in which one segment of an input packet is included in a link layer payload in a link layer packet header structure according to another embodiment of the present invention;

FIG. 64 is a table showing header lengths in a link layer packet header structure according to another embodiment of the present invention;

FIG. 72 is a table showing word based length indication according to the number of input packets in a link layer packet header structure according to another embodiment of the present invention;

FIG. 74 illustrates definition of a Type element and a Length ID field depending on values thereof according to an embodiment of the present invention;

FIG. 76 illustrates a link layer packet header when a PC element value is "00" according to an embodiment of the present invention;

FIG. 81 illustrates combinations for identifying the type of a packet included in a payload according to an embodiment of the present invention;

FIG. 82 illustrates sizes of data allocated to each element or field to signal segmentation and/or concatenation according to an embodiment of the present invention;

FIG. 83 illustrates link layer packet header structures when a single input packet is included in a payload of a link layer packet according to an embodiment of the present invention;

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
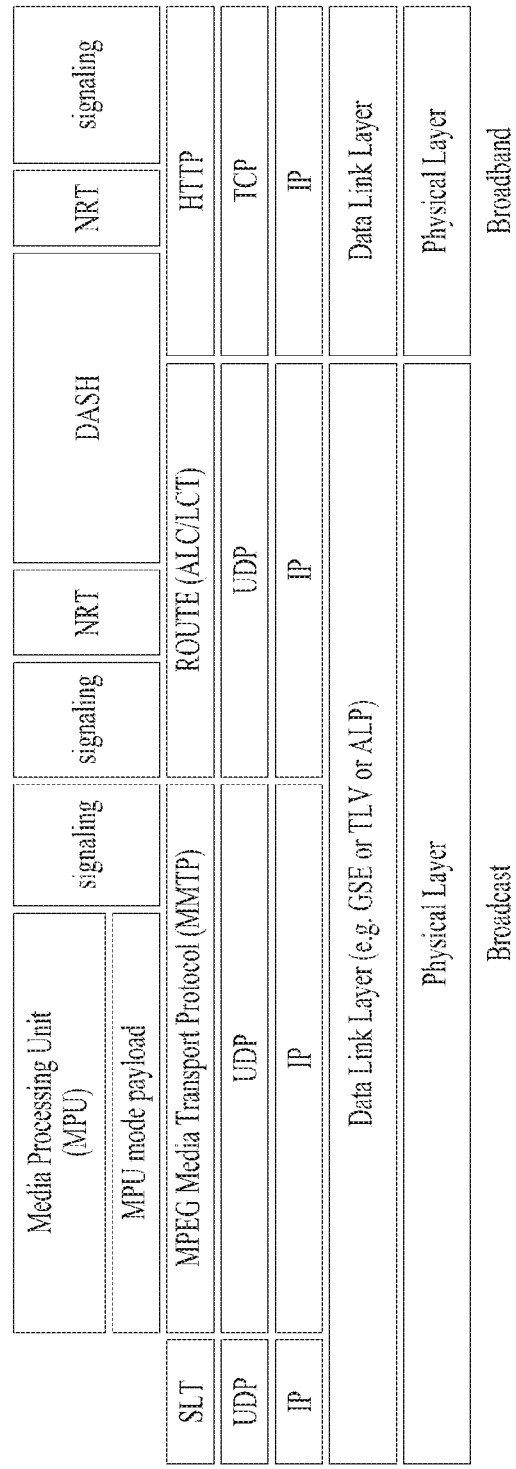
FIG. 1 illustrates a receiver protocol stack according to an embodiment of the present invention.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media. EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a UDP/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel. Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with (@; may correspond to an attribute, and a field which is not marked with @2 may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this sit instance. According to a given embodiment, a value of this field may have be a three-character language code defined in the ISO. This field may be omitted.

@capabilities can indicate required capabilities for decoding and meaningfully presenting the content for all the services in this sit instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "T" (true), that one or more components necessary for meaningful presentation is protected. When set to "O" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be boolean value that when present and set to "true" indicates that the service is intended for testing or proprietary use, and is not to be selected by ordinary TV receivers. The default value is "false" when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL_type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the slt root element and the attribute urlType of that InetSigLoc element includes URL_type 0x00 (URL to signaling server). In this case, attribute url for URL_type 0x00 supports the query parameter svc=<service_id> where service_id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@slsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted.

In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0.1" may indicate that a corresponding field is an optional field.

Figure 4:
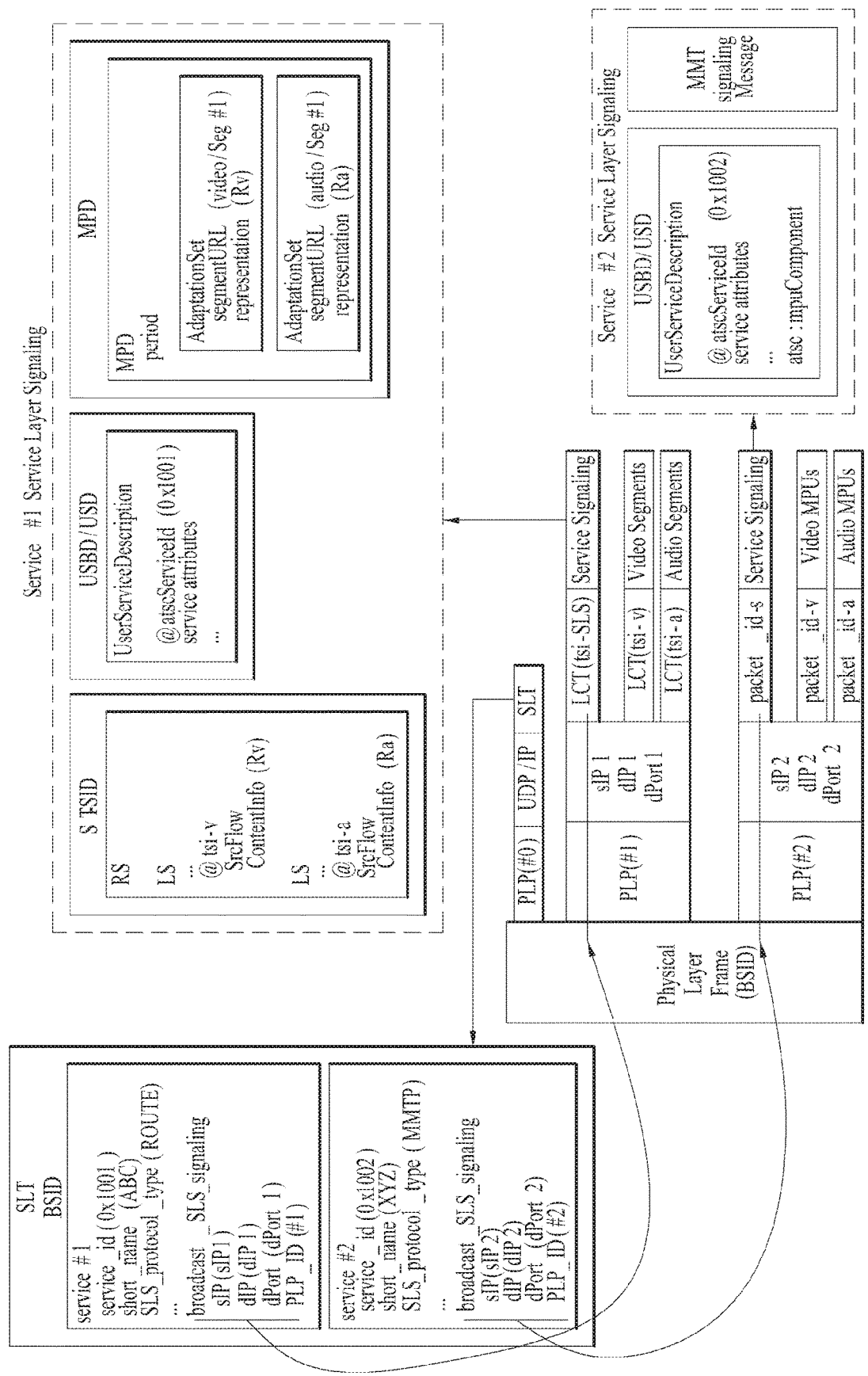
FIG. 4 illustrates SLS bootstrapping and a service discovery process according to an embodiment of the present invention.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions. The described figure illustrates the following signaling sequences. Receiver starts acquiring the SLT described above. Each service identified by service_id delivered over ROUTE sessions provides SLS bootstrapping information: PLPID (#1), source IP address (sIP1), destination IP address (dIP1), and destination port number (dPort1). Each service identified by service_id delivered over MMTP sessions provides SLS bootstrapping information: PLPID (#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD.

For service delivery using MMTP, the USBD references the MMT signaling's MPT message, the MP Table of which provides identification of package ID and location information for assets belonging to the service. Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD. S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, an network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (ServiceaglobalServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carny the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service_id.

The RS element may have information about a ROUTE session for delivering the service data. Service data or service components may be delivered through a plurality of ROUTE sessions, and thus the number of RS elements may be 1 to N.

The RS element may include @bsid, @sIpAddr, @ddIpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast_stream_id in the SLT.

@sIpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPIpId, @sTSIDDestinationIpAddress, @sTSIDDestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPIpId can be a string representing an integer number indicating the PLP ID of the physical layer pipe carrying the S-TSID for this service. (default: current physical layer pipe).

@sTSIDDestinationIpAddress can be a string containing the dotted-IPv4 destination address of the packets carrying S-TSID for this service. (default: current MMTP session's source IP address).

@sTSIDDestinationUdpPort can be a string containing the port number of the packets carrying S-TSID for this service.

@sTSIDSourceIpAddress can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects. 2=Dialog, 3=Commentary, 4=Visually Impaired, 5=Hearing Impaired, 6=Voice-Over, 7-254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata. 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset_id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, O may denote an optional field. OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below.

MMT ATSC3 (MA3) message mmt_atsc3_message( ): This message carries system metadata specific for services including service layer signaling as described above. mmt_atsc3 message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT sig-naling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

Figure 8:
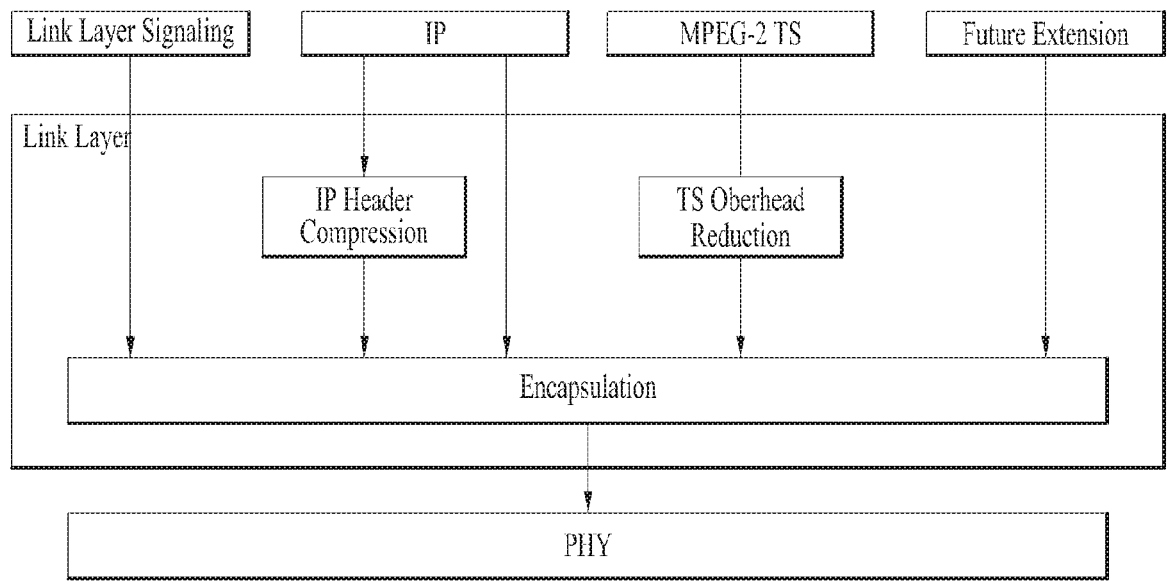
FIG. 8 illustrates a link layer protocol architecture according to an embodiment of the present invention.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer packet or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction. IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

Figure 9:
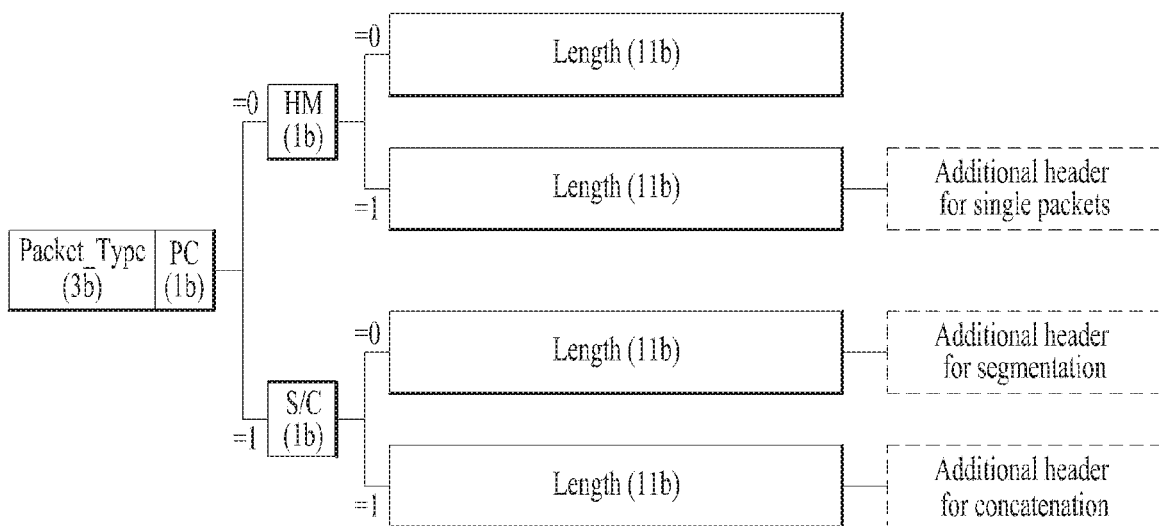
FIG. 9 illustrates a structure of a base header of a link layer packet according to an embodiment of the present invention.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet_Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet_Type is "000", "001" "100" or "111", that is the original data type of an ALP packet is one of an IPv4 packet, a compressed IP packet, link layer signaling or extension packet. When the MPEG-2 TS packet is encapsulated, the value of Packet_Type can be "010". Other values of the Packet_Type field may be reserved for future use.

Payload_Configuration (PC) field can be a 1-bit field that indicates the configuration of the payload. A value of 0 can indicate that the link layer packet carries a single, whole input packet and the following field is the Header_Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an additional header for segmentation defined below is present following the Length field. A value of 1 can indicate that the payload carries more than one complete input packet and an additional header for concatenation defined below is present following the Length field. This field can be present only when the value of Payload_Configuration field of the ALP packet is 1.

Length field can be a 11-bit field that indicates the 11 least significant bits (LSBs) of the length in bytes of payload carried by the link layer packet. When there is a Length_MSB field in the following additional header, the length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with an additional header, a segmented packet and a concatenated packet. According to a given embodiment, more packet configurations may be made through a combination of each additional header, an optional header, an additional header for signaling information to be described below, and an additional header for time extension.

Figure 10:
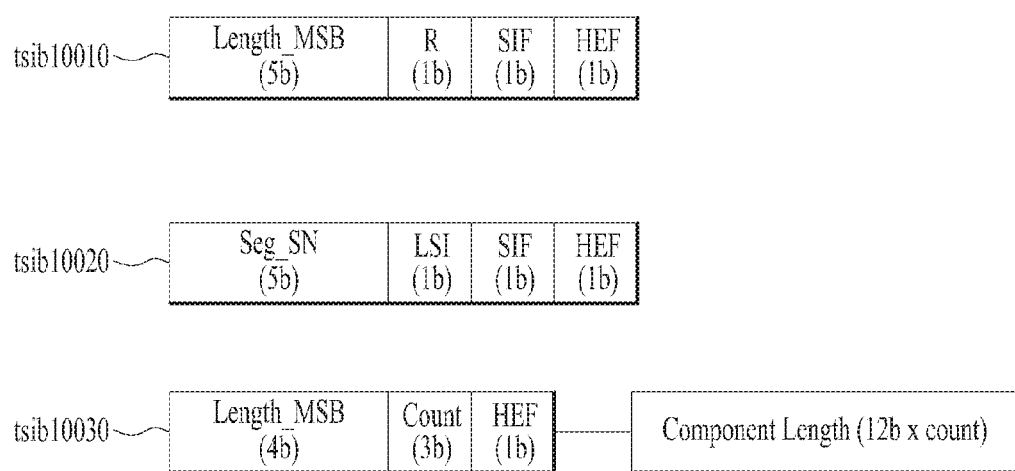
FIG. 10 illustrates a structure of an additional header of a link layer packet according to an embodiment of the present invention.

FIG. 10 illustrates a structure of an additional header of a link layer packet according to an embodiment of the present invention.

Various types of additional headers may be present. Hereinafter, a description will be given of an additional header for a single packet.

This additional header for single packet can be present when Header_Mode (HM)="1". The Header_Mode (HM) can be set to 1 when the length of the payload of the link layer packet is larger than 2047 bytes or when the optional fields are used. The additional header tsibl0010 for a single packet is shown in FIG. 10.

Length_MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length_MSB field may be changed, and thus a maximum expressible payload length may be changed. According to a given embodiment, each length field may indicate a length of a whole link layer packet rather than a payload.

SIF (Sub stream Identifier Flag) field can be a 1-bit field that can indicate whether the sub stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header tsibl0020 of FIG. 10 can be present when Segmentation_Concatenation (S/C)="0". Segment_Sequence_Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header tsibl0030 of FIG. 10 can be present when Segmentation_Concatenation (S/C)="1".

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component_Length, four stuffing bits can follow after the last Component_Length field. These bits can be set to 0. According to a given embodiment, a Component_length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub stream Identifier) can be a 8-bit field that can indicate the sub stream identifier for the link layer packet. If there is optional header extension, SID present between additional header and optional header extension.

Header_Extension ( ) can include the fields defined below.

Extension_Type can be an 8-bit field that can indicate the type of the Header_Extension ( ).

Extension_Length can be a 8-bit field that can indicate the length of the Header Extension ( ) in bytes counting from the next byte to the last byte of the Header_Extension ( ).

Extension_Byte can be a byte representing the value of the Header_Extension ( ).

Figure 11:
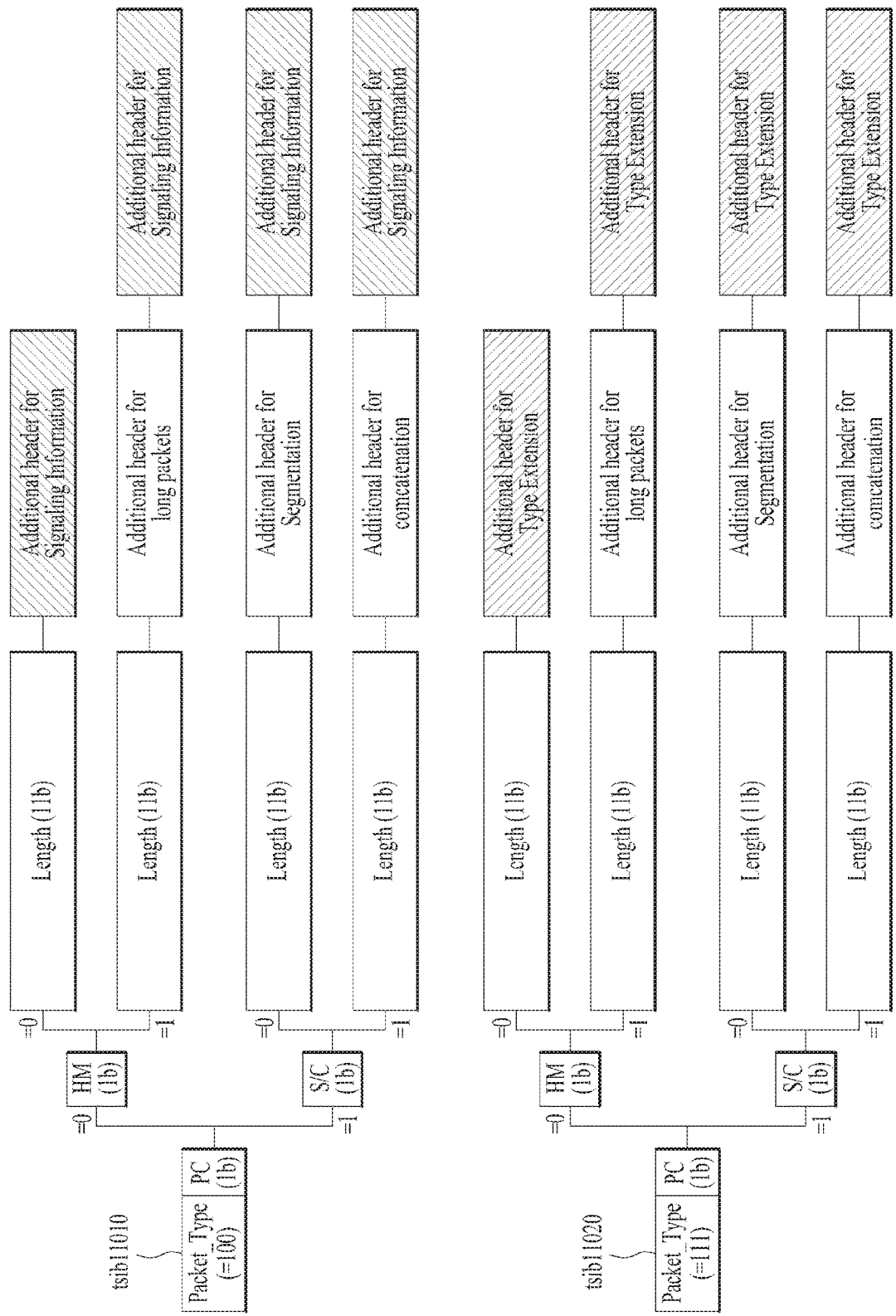
FIG. 11 illustrates a structure of an additional header of a link layer packet according to another embodiment of the present invention.

FIG. 11 illustrates a structure of an additional header of a link layer packet according to another embodiment of the present invention.

Hereinafter, a description will be given of an additional header for signaling information.

How link layer signaling is incorporated into link layer packets are as follows.

Signaling packets are identified by when the Packet_Type field of the base header is equal to 100.

FIG. 11 shows the structure of the link layer packets containing additional header tsibl1010 for signaling information. In addition to the link layer header, the link layer packet can consist of two additional parts, additional header for signaling information and the actual signaling data itself. The total length of the link layer signaling packet is shown in the link layer packet header.

The additional header for signaling information can include following fields.

According to a given embodiment, some fields may be omitted.

Signaling_Type can be an 8-bit field that can indicate the type of signaling.

Signaling_Type_Extension can be a 16-bit filed that can indicate the attribute of the signaling. Detail of this field can be defined in signaling specification.

Signaling_Version can be an 8-bit field that can indicate the version of signaling.

Signaling_Format can be a 2-bit field that can indicate the data format of the signaling data. Here, a signaling format may refer to a data format such as a binary format, an XML format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet_type is 111 in the base header as described above. FIG. 11 shows the structure of the link layer packets containing an additional header tsibl1020 for type extension.

The additional header for type extension can include following fields. According to a given embodiment, some fields may be omitted.

extended_type can be a 16-bit field that can indicate the protocol or packet type of the input encapsulated in the link layer packet as payload. This field cannot be used for any protocol or packet type already defined by Packet_Type field.

Figure 12:
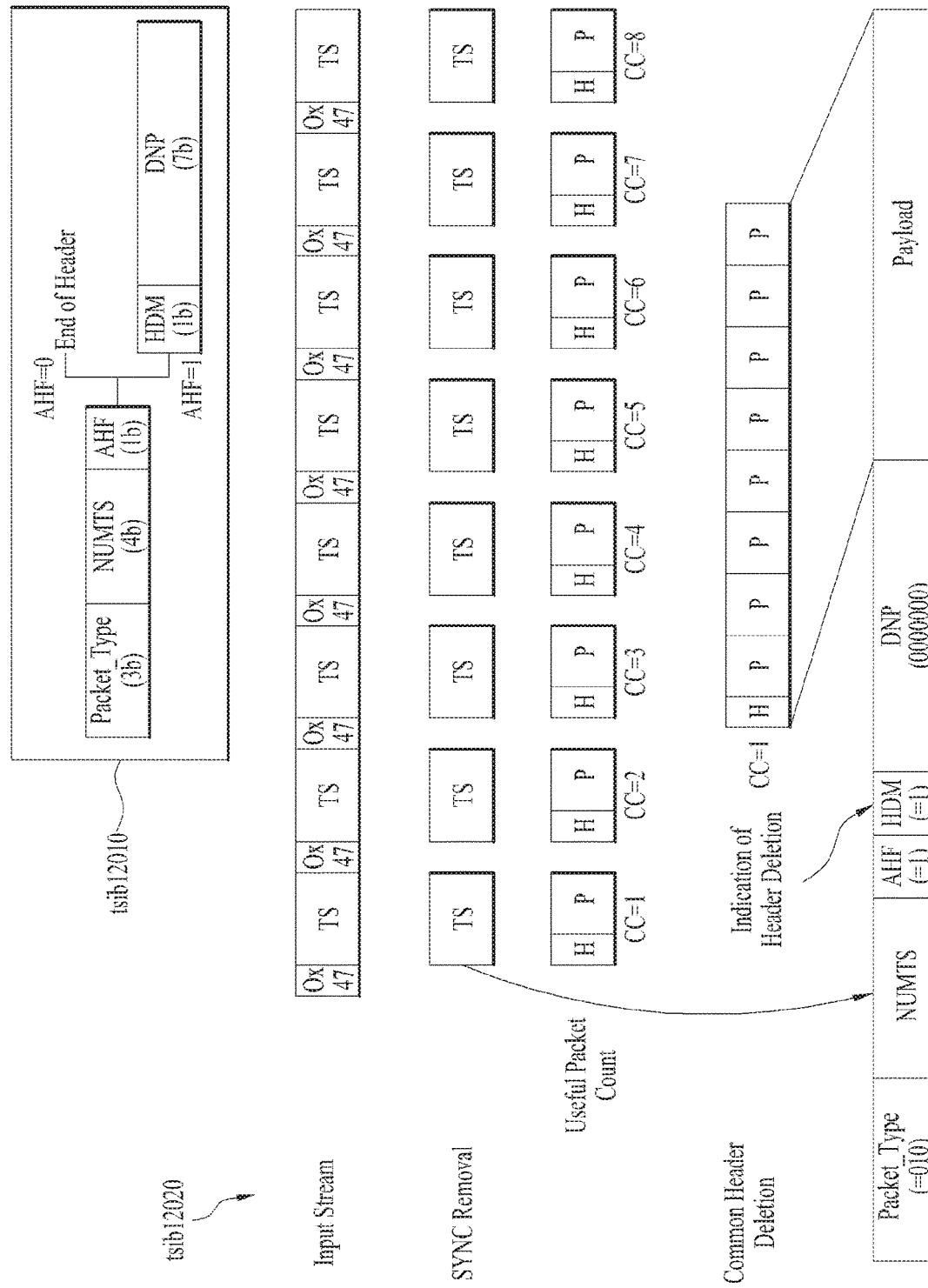
FIG. 12 illustrates a header structure of a link layer packet for an MPEG-2 TS packet and an encapsulation process thereof according to an embodiment of the present invention.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field. The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion.

According to a given embodiment, a performance order of respective mechanisms may be changed. In addition, some mechanisms may be omitted according to a given embodiment.

The overall structure of the link layer packet header tsibl2010 when using MPEG-2 TS packet encapsulation is depicted in FIG. 12.

Hereinafter, a description will be given of each illustrated field. Packet_Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "0" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion cannot be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

FIG. 12 shows an example of a process tsibl2020 in which an input stream of a TS packet is encapsulated into a link layer packet. First, a TS stream including TS packets having SYNC byte (0x47) may be input. Second, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (RoHC). In addition, for broadcasting usage, adaptation function is added.

In the transmitter side, ROHC compressor reduces the size of header for each packet. Then, adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above. In particular, in the present system, an RoHC framework can operate in a unidirectional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below.

Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling.

In Adaptation Mode 2 (tsibl3010), the adaptation module can detect the IR packet from RoHC packet flow and extract the context information (static chain). After extracting the context information, each IR packet can be converted to an IR-DYN packet. The converted IR-DYN packet can be included and transmitted inside the ROHC packet flow in the same order as IR packet, replacing the original packet.

In Adaptation Mode 3 (tsibl3020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each JR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (context) information can be encapsulated based on transmission structure. For example, context information can be encapsulated to the link layer signaling. In this case, the packet type value can be set to "100".

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. At the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT) provides a list of upper laver sessions carried in a PLP. The LMT also provides addition information for processing the link layer packets carrying the upper layer sessions in the link layer.

An example of the LMT (tsibl4010) according to the present invention is illustrated.

signaling type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper laver sessions carried in the PLP identified by the above PLP_ID field. When the value of signaling_type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

src_UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed_flag can be a 1-bit Boolean field that indicates whether the header compression is applied the link layer packets carrying the upper layer session identified by above 4 fields, Src_IP add, Dst_IP add, Src_UDP_Port and Dst_UDP_Port. When the value of this field is set to 0, the link layer packet carrying the upper layer session may have a value of 0x00 of Packet_Type field in its base header.

When the value of this field is set to 1, the link layer packet carrying the upper layer session may have a value of 0x01 of Packet_Type field in its base header and the Context_ID field can be present.

SID can be an 8-bit unsigned integer field that indicates sub stream identifier for the link layer packets carrying the upper layer session identified by above 4 fields, Src_IP_add, Dst_IP_add, Src_UDP_Port and Dst_UDP_Port. This field can be present when the value of SID_flag is equal to 1.

context_id can be an 8-bit field that provides a reference for the context id (CID) provided in the ROHC-U description table. This field can be present when the value of compressed_flag is equal to 1.

An example of the RoHC-U description table (tsibl4020) according to the present invention is illustrated. As described in the foregoing, the RoHC-U adaptation module may generate information related to header compression.

signaling_type can be an 8-bit field that indicates the type of signaling carried by this table. The value of signaling_type field for ROHC-U description table (RDT) can be set to "0x02".

PLP_ID can be an 8-bit field that indicates the PLP corresponding to this table.

context_id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to "0x0". If the static_chain( ) or dynamic_chain( ) byte is included in this table, this field may be set to "0x01" or "0x02" respectively. If both of the static_chain( ) and dynamic_chain( ) byte are included in this table, this field may be set to "0x03".

context_length can be an 8-bit field that indicates the length of the static chain byte sequence. This field can be omitted.

static_chain_byte( ) can be a field that conveys the static information used to initialize the ROHC-U decompressor. The size and structure of this field depend on the context profile.

dynamic_chain_byte( ) can be a field that conveys the dynamic information used to initialize the ROHC-U decompressor. The size and structure of this field depend on the context profile.

The static_chain byte can be defined as sub-header information of IR packet. The dynamic_chain_byte can be defined as sub-header information of IR packet and IR-DYN packet.

Figure 15:
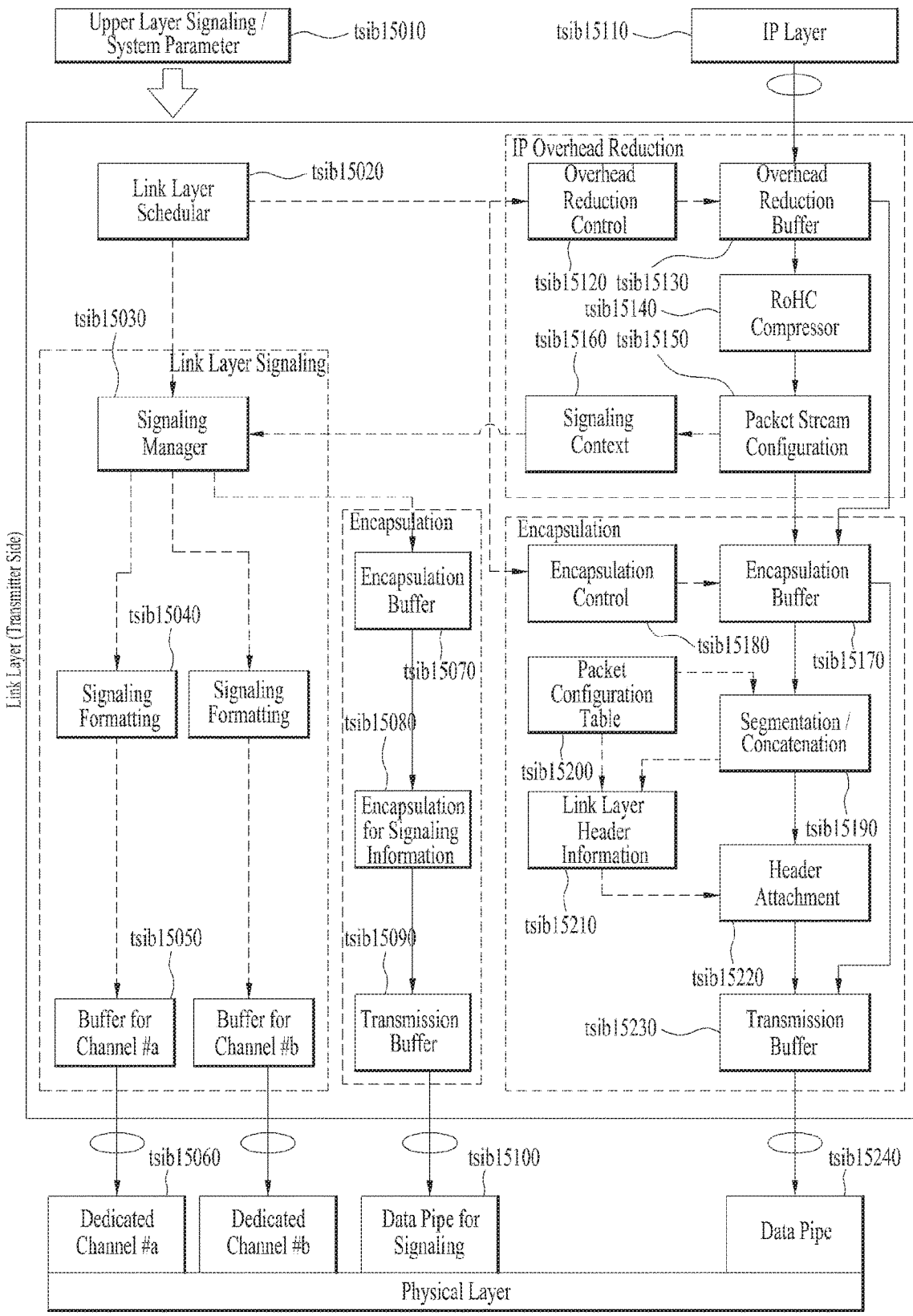
FIG. 15 illustrates a structure of a link layer on a transmitter side according to an embodiment of the present invention.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsibl5010 may be delivered to the link layer. In addition, an IP stream including IP packets may be delivered to the link layer from an IP layer tsibl5110.

As described above, the scheduler tsibl5020 may determine and control operations of several modules included in the link layer. The delivered signaling information and/or system parameter tsibl5010 may be filterer or used by the scheduler tsibl5020. Information, which corresponds to a part of the delivered signaling information and/or system parameter tsibl5010, necessary for a receiver may be delivered to the link layer signaling part. In addition, information, which corresponds to a part of the signaling information, necessary for an operation of the link layer may be delivered to an overhead reduction controller tsibl5120 or an encapsulation controller tsibl5180.

The link layer signaling part may collect information to be transmitted as a signal in a physical layer, and convert/configure the information in a form suitable for transmission. The link layer signaling part may include a signaling manager tsibl5030, a signaling formatter tsibl5040, and/or a buffer for channels tsibl5050.

The signaling manager tsibl5030 may receive signaling information delivered from the scheduler tsibl5020 and/or signaling (and/or context) information delivered from the overhead reduction part. The signaling manager tsibl5030 may determine a path for transmission of the signaling information for delivered data. The signaling information may be delivered through the path determined by the signaling manager tsibl5030. As described in the foregoing, signaling information to be transmitted through a divided channel such as the FIC, the EAS, etc. may be delivered to the signaling formatter tsibl5040, and other signaling information may be delivered to an encapsulation buffer tsibl5070.

The signaling formatter tsibl5040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsibl5030, and input to the signaling formatter tsibl5040. The signaling formatter tsibl5040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsibl5050 may deliver the signaling information received from the signaling formatter tsibl5040 to separate dedicated channels tsibl5060. The number and content of the separate channels may vary depending on embodiments.

As described in the foregoing, the signaling manager tsibl5030 may deliver signaling information, which is not delivered to a particular channel, to the encapsulation buffer tsibl5070. The encapsulation buffer tsibl5070 may function as a buffer that receives the signaling information which is not delivered to the particular channel.

An encapsulation block for signaling information tsibl5080 may encapsulate the signaling information which is not delivered to the particular channel. A transmission buffer tsibl5090 may function as a buffer that delivers the encapsulated signaling information to a DP for signaling information tsibl5100. Here, the DP for signaling information tsibl5100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsibl5130 may receive an IP packet delivered from an upper layer. The received IP packet may be input to the overhead reduction part through the overhead reduction buffer tsibl5130.

An overhead reduction controller tsibl5120 may determine whether to perform overhead reduction on a packet stream input to the overhead reduction buffer tsibl5130. The overhead reduction controller tsibl5120 may determine whether to perform overhead reduction for each packet stream. When overhead reduction is performed on a packet stream, packets may be delivered to a robust header compression (RoHC) compressor tsibl5140 to perform overhead reduction. When overhead reduction is not performed on a packet stream, packets may be delivered to the encapsulation part to perform encapsulation without overhead reduction. Whether to perform overhead reduction of packets may be determined based on the signaling information tsibl5010 delivered to the link layer. The signaling information may be delivered to the encapsulation controller tsibl5180 by the scheduler tsibl5020.

The RoHC compressor tsibl5140 may perform overhead reduction on a packet stream. The RoHC compressor tsibl5140 may perform an operation of compressing a header of a packet. Various schemes may be used for overhead reduction. Overhead reduction may be performed using a scheme proposed by the present invention. The present invention presumes an IP stream, and thus an expression "RoHC compressor" is used. However, the name may be changed depending on embodiments. The operation is not restricted to compression of the IP stream, and overhead reduction of all types of packets may be performed by the RoHC compressor tsibl5140.

A packet stream configuration block tsibl5150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsibl5160. The information to be transmitted to the packet stream may be transmitted to the encapsulation part.

The signaling and/or context controller tsibl5160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsibl5170 may receive a packet stream for encapsulation. Packets subjected to overhead reduction may be received when overhead reduction is performed, and an input IP packet may be received without change when overhead reduction is not performed.

An encapsulation controller tsibl5180 may determine whether to encapsulate an input packet stream. When encapsulation is performed, the packet stream may be delivered to a segmentation/concatenation block tsibl5190. When encapsulation is not performed, the packet stream may be delivered to a transmission buffer tsibl5230. Whether to encapsulate packets may be determined based on the signaling information tsibl5010 delivered to the link layer. The signaling information may be delivered to the encapsulation controller tsibl5180 by the scheduler tsibl5020.

In the segmentation/concatenation block tsibl5190, the above-described segmentation or concatenation operation may be performed on packets. In other words, when an input IP packet is longer than a link layer packet corresponding to an output of the link layer, one IP packet may be segmented into several segments to configure a plurality of link layer packet payloads. On the other hand, when an input IP packet is shorter than a link layer packet corresponding to an output of the link layer, several IP packets may be concatenated to configure one link layer packet payload.

A packet configuration table tsibl5200 may have configuration information of a segmented and/or concatenated link layer packet. A transmitter and a receiver may have the same information in the packet configuration table tsibl5200. The transmitter and the receiver may refer to the information of the packet configuration table tsibl5200. An index value of the information of the packet configuration table tsibl5200 may be included in a header of the link layer packet.

A link layer header information block tsibl5210 may collect header information generated in an encapsulation process. In addition, the link layer header information block tsibl5210 may collect header information included in the packet configuration table tsibl5200. The link layer header information block tsibl5210 may configure header information according to a header structure of the link layer packet.

A header attachment block tsibl5220 may add a header to a payload of a segmented and/or concatenated link layer packet. The transmission buffer tsibl5230 may function as a buffer to deliver the link layer packet to a DP tsibl5240 of the physical layer.

The respective blocks, modules, or parts may be configured as one module/protocol or a plurality of modules/protocols in the link layer.

Figure 16:
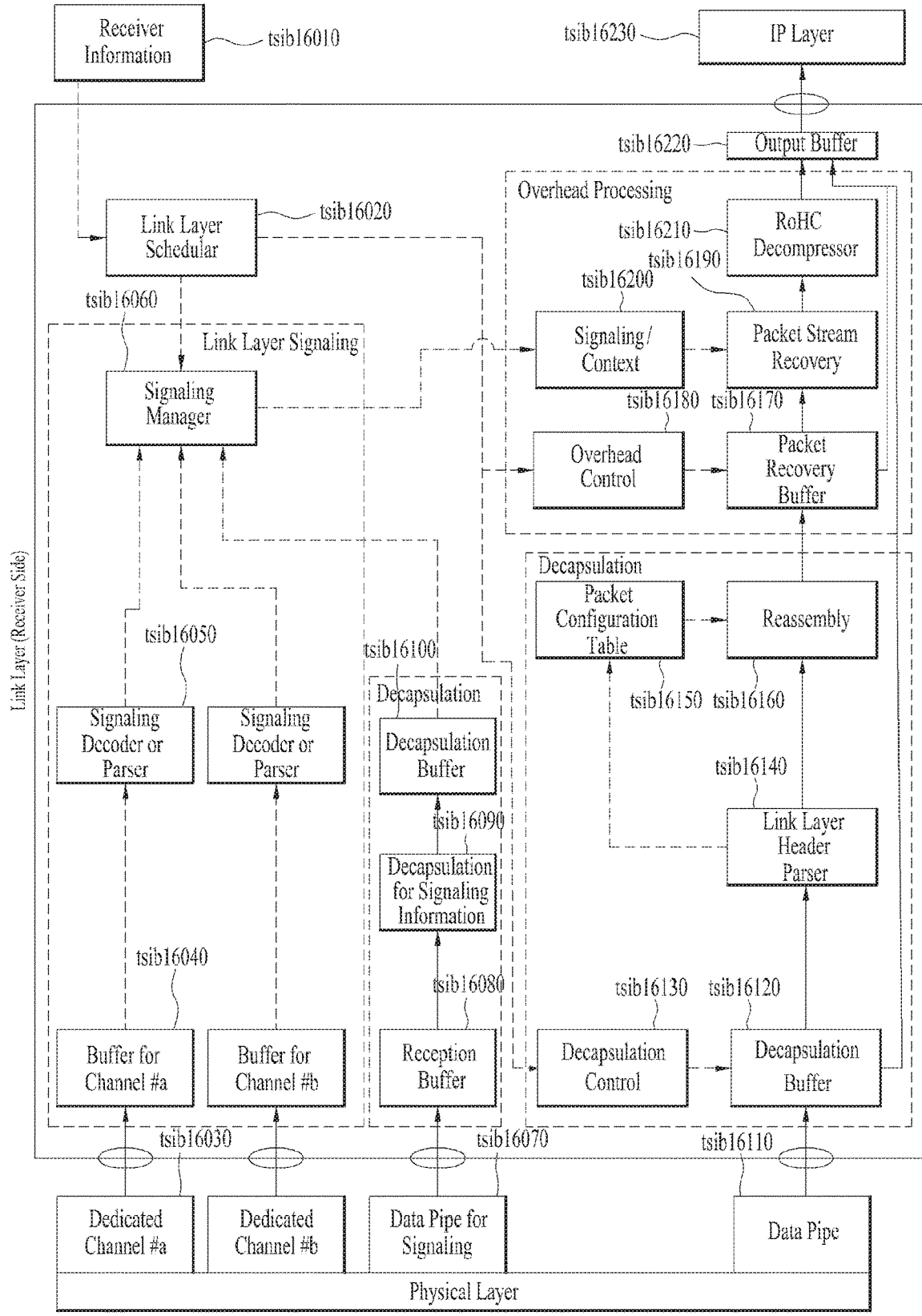
FIG. 16 illustrates a structure of a link layer on a receiver side according to an embodiment of the present invention.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsibl6030, may be delivered to a link layer signaling part. The link layer signaling part may determine signaling information received from the physical layer, and deliver the determined signaling information to each part of the link layer.

A buffer for channels tsibl6040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsibl6050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsibl6060 may integrate signaling information received through several paths. Signaling information received through a DP for signaling tsibl6070 to be described below may be integrated in the signaling manager tsibl6060. The signaling manager tsibl6060 may deliver signaling information necessary for each part in the link layer. For example, the signaling manager tsibl6060 may deliver context information, etc. for recovery of a packet to the overhead processing part. In addition, the signaling manager tsibl6060 may deliver signaling information for control to a scheduler tsibl6020.

General signaling information, which is not received through a separate particular channel, may be received through the DP for signaling tsibl6070. Here, the DP for signaling may refer to PLS, L1, etc. Here, the DP may be referred to as a PLP. A reception buffer tsibl6080 may function as a buffer that receives signaling information delivered from the DP for signaling. In a decapsulation block for signaling information tsibl6090, the received signaling information may be decapsulated. The decapsulated signaling information may be delivered to the signaling manager tsibl6060 through a decapsulation buffer tsibl6100. As described in the foregoing, the signaling manager tsibl6060 may collate signaling information, and deliver the collated signaling information to a necessary part in the link layer.

The scheduler tsibl6020 may determine and control operations of several modules included in the link layer. The scheduler tsibl6020 may control each part of the link layer using receiver information tsibl6010 and/or information delivered from the signaling manager tsibl6060. In addition, the scheduler tsibl6020 may determine an operation mode, etc. of each part. Here, the receiver information tsibl6010 may refer to information previously stored in the receiver. The scheduler tsibl6020 may use information changed by a user such as channel switching, etc. to perform a control operation.

The decapsulation part may filter a packet received from a DP tsibl6110 of the physical layer, and separate a packet according to a type of the packet. It is possible to configure decapsulation parts corresponding to the number of DPs that can be simultaneously decoded in the physical layer.

The decapsulation buffer tsibl6100 may function as a buffer that receives a packet stream from the physical layer to perform decapsulation. A decapsulation controller tsibl6130 may determine whether to decapsulate an input packet stream. When decapsulation is performed, the packet stream may be delivered to a link layer header parser tsibl6140. When decapsulation is not performed, the packet stream may be delivered to an output buffer tsibl6220. The signaling information received from the scheduler tsibl6020 may be used to determine whether to perform decapsulation.

The link layer header parser tsibl6140 may identify a header of the delivered link layer packet. It is possible to identify a configuration of an IP packet included in a payload of the link layer packet by identifying the header. For example, the IP packet may be segmented or concatenated.

A packet configuration table tsibl6150 may include payload information of segmented and/or concatenated link layer packets. The transmitter and the receiver may have the same information in the packet configuration table tsibl6150. The transmitter and the receiver may refer to the information of the packet configuration table tsibl6150. It is possible to find a value necessary for reassembly based on index information included in the link layer packet.

A reassembly block tsibl6160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsibl6170 may function as a buffer that receives a decapsulated RoHC packet or IP packet to perform overhead processing.

An overhead controller tsibl6180 may determine whether to recover and/or decompress the decapsulated packet. When recovery and/or decompression are performed, the packet may be delivered to a packet stream recovery block tsibl6190. When recovery and/or decompression are not performed, the packet may be delivered to the output buffer tsibl6220. Whether to perform recovery and/or decompression may be determined based on the signaling information delivered by the scheduler tsibl6020.

The packet stream recovery block tsibl6190 may perform an operation of integrating a packet stream separated from the transmitter with context information of the packet stream. This operation may be a process of restoring a packet stream such that an RoHC decompressor tsibl6210 can perform processing. In this process, it is possible to receive signaling information and/or context information from a signaling and/or context controller tsibl6200. The signaling and/or context controller tsibl6200 may determine signaling information delivered from the transmitter, and deliver the signaling information to the packet stream recovery block tsibl6190 such that the signaling information may be mapped to a stream corresponding to a context ID.

The RoHC decompressor tsibl6210 may restore headers of packets of the packet stream. The packets of the packet stream may be restored to forms of original IP packets through restoration of the headers. In other words, the RoHC decompressor tsibl6210 may perform overhead processing.

The output buffer tsibl6220 may function as a buffer before an output stream is delivered to an IP layer tsibl6230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

Figure 17:
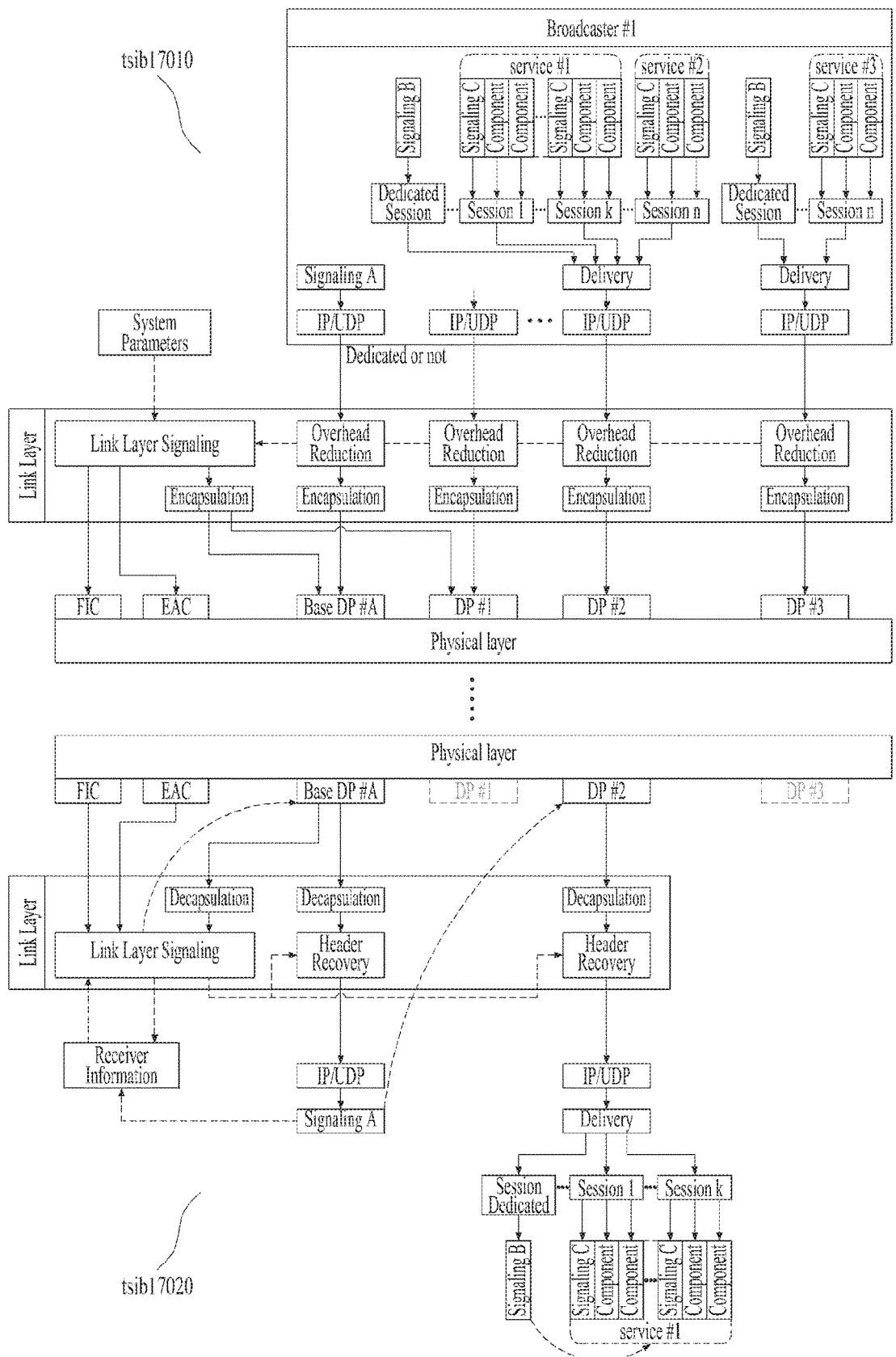
FIG. 17 illustrates a configuration of signaling transmission through a link layer according to an embodiment of the present invention (transmitting/receiving sides)

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsibl7010 on the transmitting side, service providers (broadcasters) may provide a plurality of services (Service #1, #2, . . . ). In general, a signal for a service may be transmitted through a general transmission session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsibl7020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transmission session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsibl7020), the FIC and the EAC are used, and a concept of the base DP/PLP is presumed. As described in the foregoing, concepts of the FIC, the EAC, and the base DP/PLP may not be used.

Figure 18:
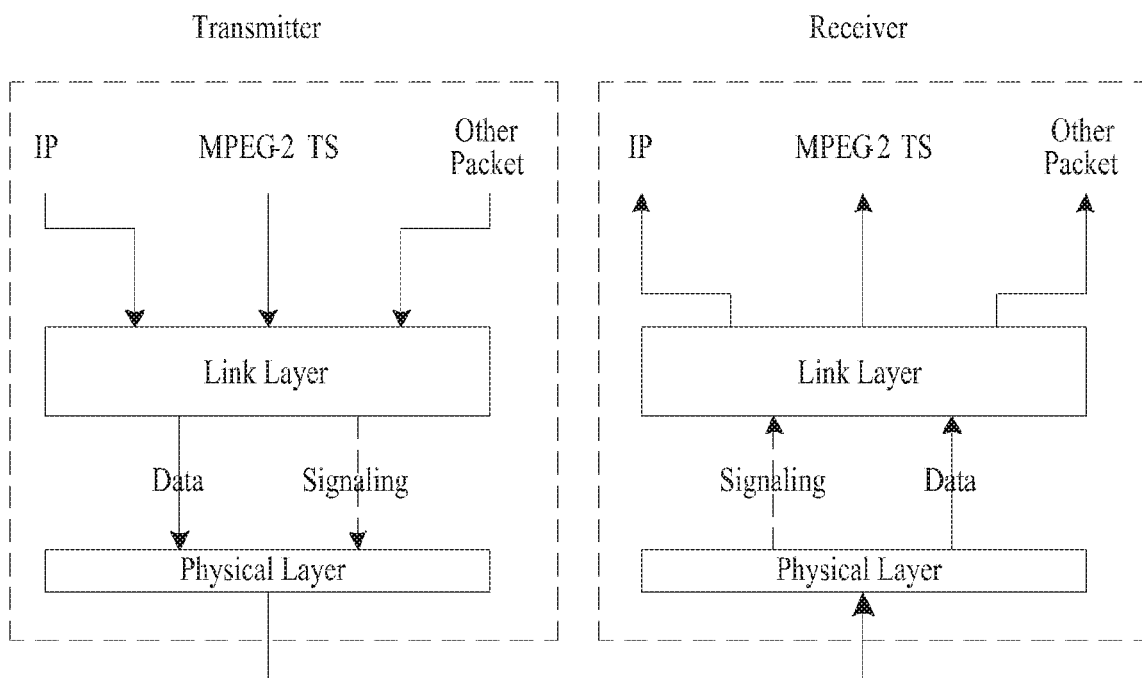
FIG. 18 illustrates an interface of a link layer according to an embodiment of the present invention.

FIG. 18 illustrates an interface of a link layer according to an embodiment of the present invention.

The figure shows a case in which a transmitter uses an IP packet and/or an MPEG2-TS packet used in digital broadcast as an input signal. The transmitter may support a packet structure in a new protocol which can be used in future broadcast systems. Encapsulated data and/or signaling information of the link layer may be transmitted to a physical layer. The transmitter may process transmitted data (which can include signaling data) according to a protocol of the physical layer, which is supported by a broadcast system, and transmit a signal including the data.

A receiver restores the data and/or the signaling information received from the physical layer to data that can be processed in an upper layer. The receiver can read packet headers and determine whether packets received from the physical layer include signaling information (or signaling data) or general data (or content data).

The signaling information (i.e., signaling data) transmitted from the transmitter may include first signaling information which is received from an upper layer and needs to be transmitted to an upper layer of the receiver, second signaling information which is generated in the link layer and provides information related to data processing in the link layer of the receiver and/or third signaling information which is generated in the upper layer or the link layer and transmitted to rapidly identify specific data (e.g. service, content and/or signaling data) in the physical layer.

According to an embodiment of the present invention, additional processing may be performed on packets, delivered from the upper layer, in the link layer.

When a packet delivered from the upper layer is an IP packet, the transmitter can perform IP header compression in the link layer. Overhead can be reduced in IP flow through IP header compression. For IP header compression, robust header compression (RoHC) may be used. Refer to RFC3095 and RFC5795 for details of RoHC.

In one embodiment of the present invention, RoHC can operate in a unidirectional mode. This will be described in detail later.

When the packet delivered from the upper layer is an MPEG-2 transport stream (ST) packet, overhead reduction may be performed on the MPEG-2 TS packet. The MPEG-2 TS packet may include a sync field, a null packet and/or a common packet identifier (PID). Since such data is repeated in each TS packet or unnecessary data, the transmitter can delete the data in the link layer, generate information used for the receiver to restore the data and transmit the information to the receiver.

The transmitter can encapsulate the packet, transmitted from the upper layer, in the link layer. For example, the transmitter can generate a link layer packet by encapsulating the IP packet, the MPEG-2 TS packet and/or a packet in a different protocol in the link layer. Packets in one format can be processed in the physical layer of the transmitter/receiver through encapsulation in the link layer irrespective of protocol type of the network layer. In this case, the MPEG-2 TS packet can be considered to be a packet of the network layer.

The network layer is an upper layer of the link layer. A packet of the network layer can be converted into a payload of a packet of the link layer. In an embodiment of the present invention, packets of the network layer can be included in packets of the link layer by being concatenated and segmented in order to efficiently use resources of the physical layer.

When the size of packets of the network layer is small such that a payload of the link layer can include a plurality of packets of the network layer, a packet header of the link layer can include a protocol field for performing concatenation. Concatenation can be defined as combination of a plurality of packets of the network layer in a payload (a packet payload of the link layer).

When the size of one packet of the network layer is too large to be processed in the physical layer, a packet of the network layer may be segmented into two or more segments. A packet header of the link layer may include necessary information in the form of a protocol field such that the transmitting side can segment the packet of the network layer and the receiving side can reassemble the segmented packets.

Processing of the link layer in the transmitter includes transmission of signaling information generated in the link layer, such as a fast information channel (FIC), an emergency alert system (EAS) message and/or information for overhead reduction.

The FIC is a signaling structure including information necessary for channel scan and fast service acquisition. That is, a main purpose of the FIC is to efficiently transfer information necessary for fast channel scan and service acquisition. Information included in the FIC may correspond to information for connecting a data pipe (DP) (or PLP) and a broadcast service.

Processing of the link layer in the transmitter includes transmission of an emergency alert message and signaling information related thereto through a specific channel. The specific channel may correspond to a channel predefined in the physical layer. The specific channel may be called an emergency alert channel (EAC).

Figure 19:
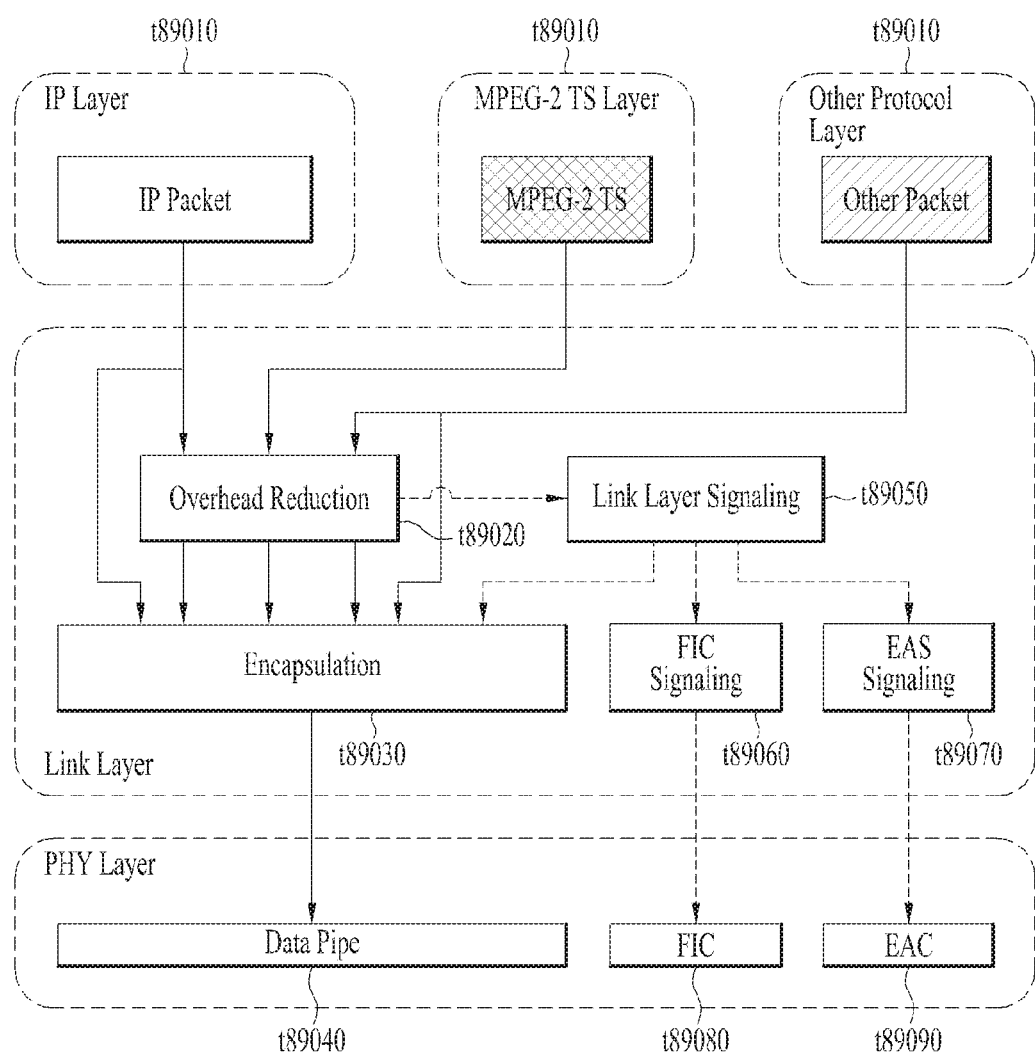
FIG. 19 illustrates operation of a normal mode from among operation modes of the link layer according to an embodiment of the present invention.

FIG. 19 illustrates operation of a normal mode from among operation modes of a link layer according to an embodiment of the present invention.

The link layer proposed by the present invention may have various operation modes for compatibility between an upper layer and a lower layer. The present invention proposes the normal mode and a transparent mode of the link layer. The two operation modes can coexist in the link layer and which mode will be used can be designated using a signaling or system parameter. According to an embodiment, only one of the two modes may be implemented. Different modes may be applied according to an IP layer and a TS layer input to the link layer. Otherwise, different modes may be applied for streams of the IP layer and streams of the TS layer.

According to an embodiment, a new operation mode may be added to the link layer. The new operation mode may be added on the basis of configurations of an upper layer and a lower layer. The new operation mode may include different interfaces on the basis of the configurations of the upper layer and the lower layer. Whether to use the new operation mode may be designated using a signaling or system parameter.

In the normal mode, data is processed according to functions supported by the link layer and then delivered to the physical layer.

First, packets may be respectively transferred from an IP layer, an MPEG-2 TS layer and a specific protocol layer t89010 to the link layer. That is, an IP packet can be delivered from the IP layer to the link layer. An MPEG-2 TS packet can be delivered from the MPEG-2 TS layer to the link layer. A specific packet can be delivered from the specific protocol layer to the link layer.

The delivered packets may or may not be overhead-reduced t89020 and then encapsulated t89030.

Specifically, the IP packet may or may not be overhead-reduced t89020 and then encapsulated t89030. Whether overhead reduction is performed may be designated by a signaling or system parameter. According to an embodiment, overhead reduction may or may not be performed per IP stream. The encapsulated IP packet can be delivered to the physical layer.

The MPEG-2 TS packet may be overhead-reduced t89020 and then encapsulated t89030. In the case of the MPEG-2 TS packet, overhead reduction may be omitted according to an embodiment. However, since a general TS packet has a sync byte (0x47) at the head thereof, it may be efficient to remove such fixed overhead. The encapsulated TS packet can be delivered to the physical layer.

A packet other than the IP or TS packet may or may not be overhead-reduced t89020 and then encapsulated t89030. Whether overhead reduction is performed may be determined according to characteristics of the packet. Whether overhead reduction is performed may be designated by the signaling or system parameter. The encapsulated packet can be delivered to the physical layer.

During overhead reduction t89020, the sizes of the input packets may be reduced through an appropriate method. During the overhead reduction process, specific information may be extracted or generated from the input packets. The specific information is information related to signaling and may be transmitted through a signaling region. The signaling information enables the receiver to restore the packets changed during overhead reduction to the original packets. The signaling information can be delivered through link layer signaling t89050.

Link layer signaling t89050 can transmit and manage the signaling information extracted/generated during overhead reduction. The physical layer may have physically/logically separated transmission paths. Link layer signaling t89050 may deliver the signaling information to the physical layer according to the separated transmission paths. The separated transmission paths may include FIC signaling t89060 and EAS signaling t89070. Signaling information which is not transmitted through the transmission paths may be delivered to the physical layer after being subjected to encapsulation t89030.

Signaling information managed through link layer signaling t89050 may include signaling information delivered from an upper layer, signaling information generated in the link layer and/or system parameters. Specifically, signaling information managed through link layer signaling t89050 may include signaling information that is delivered from the upper layer and needs to be transmitted to an upper layer of the receiver, signaling information that is generated in the link layer and needs to be used in the link layer of the receiver and signaling information that is generated in the upper layer or the link layer and used for fast detection in the physical layer of the receiver.

Data encapsulated t89030 and delivered to the physical layer may be transmitted through a data pipe (DP) 89040. Here, the DP may be a physical layer pipe (PLP). Signaling information transmitted through the aforementioned separate transmission paths may be delivered to respective transmission paths. For example, FIC signaling information can be transmitted through an FIC channel t89080 designated in a physical frame and EAS signaling information can be transmitted through an EAS channel t89090 designed in the physical frame. Information representing presence of a specific channel such as an FIC or EAC can be signaled and transmitted through a preamble region of the physical frame or signaled by scrambling a preamble using a specific scrambling sequence. According to an embodiment, FIC signaling/EAS signaling information may be transmitted through a normal DP region, a PLS region or a preamble instead of a designated specific channel.

The receiver can receive data and signaling information through the physical layer. The receiver can restore the data and signaling information to forms that can be processed in an upper layer and transfer the same to the upper layer. This process can be performed in the link layer of the receiver. The receiver can determine whether received packets are related to the signaling information or the data by reading headers of the packets, for example. When overhead reduction has been performed at the transmitting side, the receiver can restore packets having reduced overhead through overhead reduction to the original packets. In this process, the received signaling information can be used.

Figure 20:
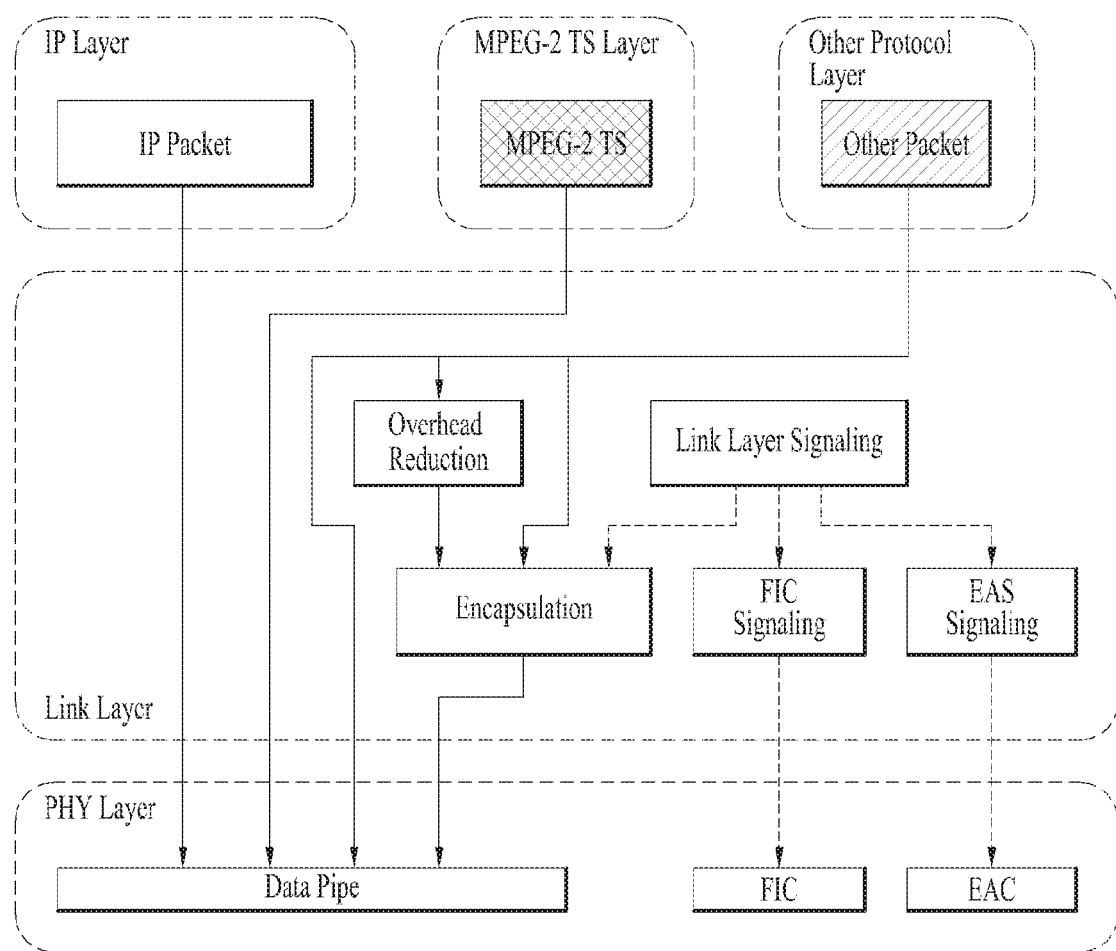
FIG. 20 illustrates operation of a transparent mode from among operation modes of the link layer according to an embodiment of the present invention.

FIG. 20 illustrates operation of the transparent mode from among the operation modes of the link layer according to an embodiment of the present invention.

In the transparent mode, data can be delivered to the physical layer without being processed according to functions supported by the link layer or processed according to only some of the functions and then delivered to the physical layer. That is, packets delivered from an upper layer can be sent to the physical layer without passing through overhead reduction and/or encapsulation in the transparent mode. Other packets may be pass through overhead reduction and/or encapsulation in the transparent mode as necessary. The transparent mode may be called a bypass mode.

According to an embodiment, some packets can be processed in the normal mode and some packets can be processed in the transparent mode on the basis of characteristics of packets and system operation.

Packets to which the transparent mode is applicable may be packets of types well known to the system. When the corresponding packets can be processed in the physical layer, the transparent mode can be used. For example, in the case of a known TS or IP packet, the packet can pass through overhead reduction and input formatting processes in the physical layer and thus the transparent mode can be used in the link layer stage. When the transparent mode is applied and the packet is process through input formatting in the physical layer, the aforementioned operation such as TS header compression can be performed in the physical layer. When a normal mode is applied, a processed link layer packet can be processed by being handled as a GS packet in the physical layer.

Even in the transparent mode, a link layer signaling module may be provided when it is necessary to support transmission of signaling information. The link layer signaling module can transmit and manage signaling information, as described above. Singling information can be encapsulated and transmitted through a DP and FIC and EAS signaling information having separated transmission paths can be respectively transmitted through an FIC channel and an EAC channel.

In the transparent mode, whether information corresponds to signaling information can be indicated through a method of using a fixed IP address and port number, for example. In this case, the signaling information may be filtered to configure a link layer packet and then the link layer packet may be transmitted through the physical layer.

Figure 21:
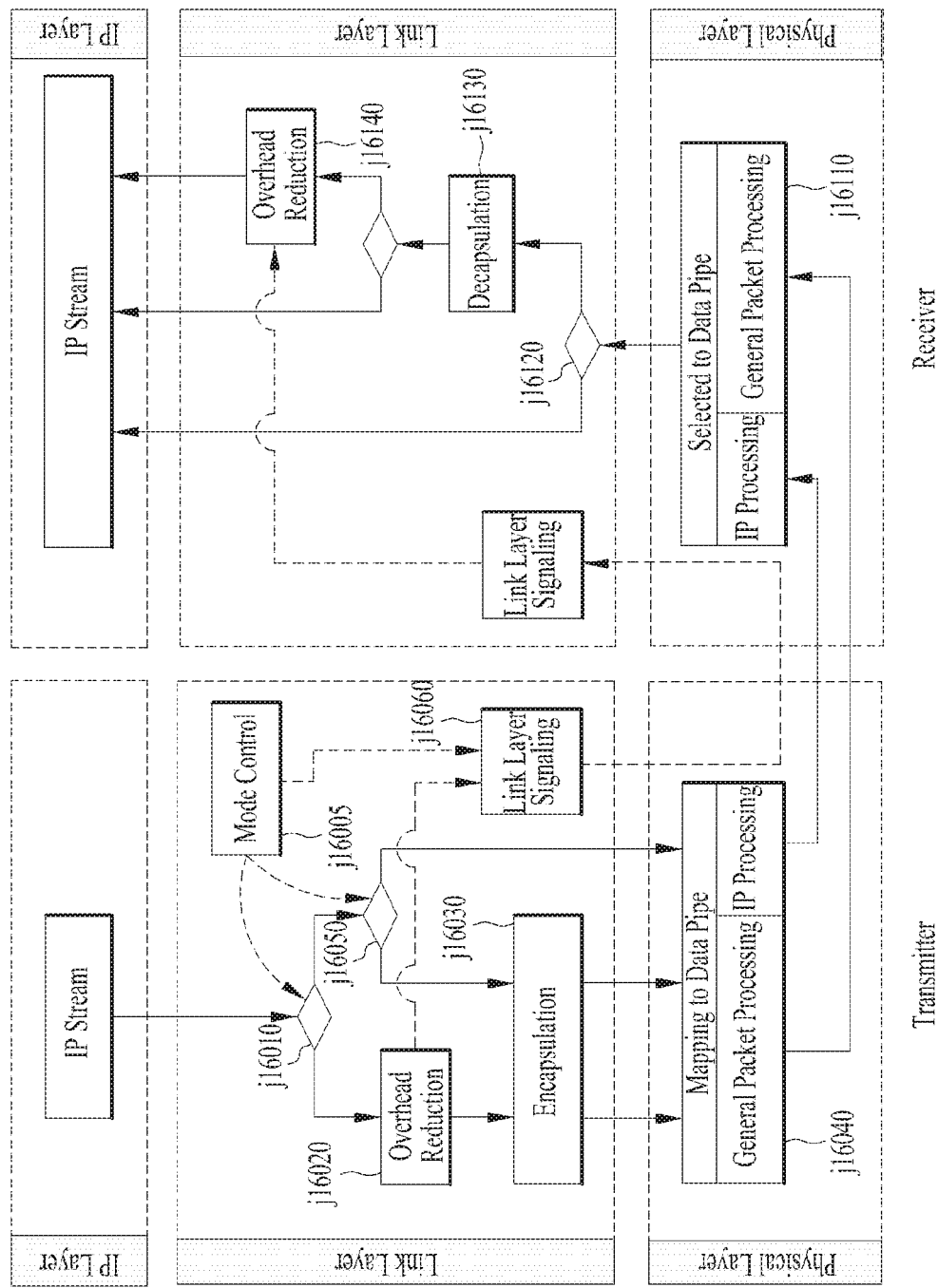
FIG. 21 illustrates a process of controlling operation modes of a transmitter and/or a receiver in the link layer according to an embodiment of the present invention.

FIG. 21 illustrates a process of controlling operation modes of the transmitter and/or the receiver in the link layer according to an embodiment of the present invention.

Determination of a link layer operation mode of the transmitter or the receiver can enable more efficient use of a broadcast system and flexible design of the broadcast system. According to the method of controlling link layer modes, proposed by the present invention, link layer modes for efficient operation of a system bandwidth and processing time can be dynamically switched. In addition, when a specific mode needs to be supported or need for a specific mode disappears due to change of the physical layer, this can be easily handled. Furthermore, when a broadcaster providing broadcast services intends to designate a method for transmitting the broadcast services, broadcast systems can easily accept requests of the broadcaster.

The method for controlling link layer operation modes may be implemented such that the method is performed only in the link layer or may be performed through data structure change in the link layer. In this case, independent operations of the network layer and/or the physical layer can be performed without additionally implementing additional functions therein. It is possible to control link layer modes proposed by the present invention with signaling or system internal parameters without modifying the system to adapt to the structure of the physical layer. A specific mode may operate only when processing of corresponding input is supported in the physical layer.

The figure shows a flow through which the transmitter/receiver processes signals and/or data in the IP layer, link layer and physical layer.

A functional block (which can be implemented as hardware and/or software) for mode control may be added to the link layer to manage parameters and/or signaling information for determining whether to process a packet. The link layer can determine whether to execute a corresponding function in a packet stream processing procedure using information stored in the mode control functional block.

Operation of the transmitted will now be described first.

When an IP stream is input to the link layer, the transmitter determines whether to perform overhead reduction j16020 using mode control parameters j16005 (j16010). The mode control parameters can be generated in the transmitter by a service provider. The mode control parameters will be described in detail later.

When overhead reduction j16020 is performed, information about overhead reduction is generated and included in link layer signaling information j16060. The link layer signaling information j16060 may include all or some mode control parameters. The link layer signaling information j16060 may be delivered in the form of a link layer signaling packet. While the link layer signaling packet can be mapped to a DP and delivered to the receiver, the link layer signaling packet may be transmitted to the receiver through a predetermined region of a broadcast signal without being mapped to a DP.

The packet stream that has passed through overhead reduction j16020 is encapsulated j16030 and applied to a DP of the physical layer (J16040). When the packet stream has not passed through overhead reduction, the transmitter determines whether to perform encapsulation j16050 on the packet stream.

The packet stream that has passed through encapsulation j16030 is applied to the DP of the physical layer (j16040). Here, operation for general packet (link layer packet) processing is performed in the physical layer. When the IP stream has not passed through overhead reduction and encapsulation, the IP stream is directly delivered to the physical layer. Then, operation for processing the IP stream is performed in the physical layer. When the IP stream is directly transmitted to the physical layer, parameters can be provided such that operation is performed only when the physical layer supports IP packet input. That is, mode control parameter values can be controlled such that operation of directly transmitting an IP packet to the physical layer is not performed when the physical layer does not support IP packet processing.

The transmitter transmits the broadcast signal that has passed through the aforementioned process to the receiver.

Operation of the receiver will now be described.

When a specific DP is selected according to channel change by a user and a packet stream is received through the DP in the receiver (j16110), the receiver can check a mode in which the corresponding packet has been generated when transmitted using the header of the packet stream and/or signaling information (S16120). When the mode is confirmed for the DP, the corresponding IP packet is transmitted to the upper layer through decapsulation j16130 and overhead reduction j16140 in the link layer. Overhead reduction j16140 may include overhead recovery.

FIG. 22 illustrates operation in the link layer and format of a packet transmitted to the physical layer on the basis of flag values according to an embodiment of the present invention.

To determine an operation mode of the link layer, the aforementioned signaling method can be used. Signaling information related to the method can be directly transmitted to the receiver. In this case, the aforementioned signaling data or link layer signaling packet may include mode control related information which will be described later.

There may be a method of indirectly signaling an operation mode of the link layer to the receiver in consideration of complexity of the receiver.

The following two flags can be considered for operation mode control.

Header compression flag (HCF): this is a flag setting whether to apply header compression in the link layer and can be assigned values indicating "enable" and "disable".

Encapsulation flag (EF): this is a flag setting whether to apply encapsulation in the link layer and can be assigned values indicating "enable" and "disable". However, the EF can be subordinated to the HCF when encapsulation needs to be essentially performed according to header compression scheme.

A value mapped to each flag can be provided in the range including representation of "enable" and "disable" according to system configuration and the number of bits allocated per flag can be changed. For example, the value "enable" can be mapped to 1 and the value "disable" can be mapped to 0.

The figure shows whether header compression and encapsulation are performed and a packet format transferred to the physical layer according to header compression and encapsulation on the basis of HCF and EF values. That is, according to one embodiment of the present invention, the receiver can recognize the format of a packet input to the physical layer from information about the HCF and the EF.

Figure 23:
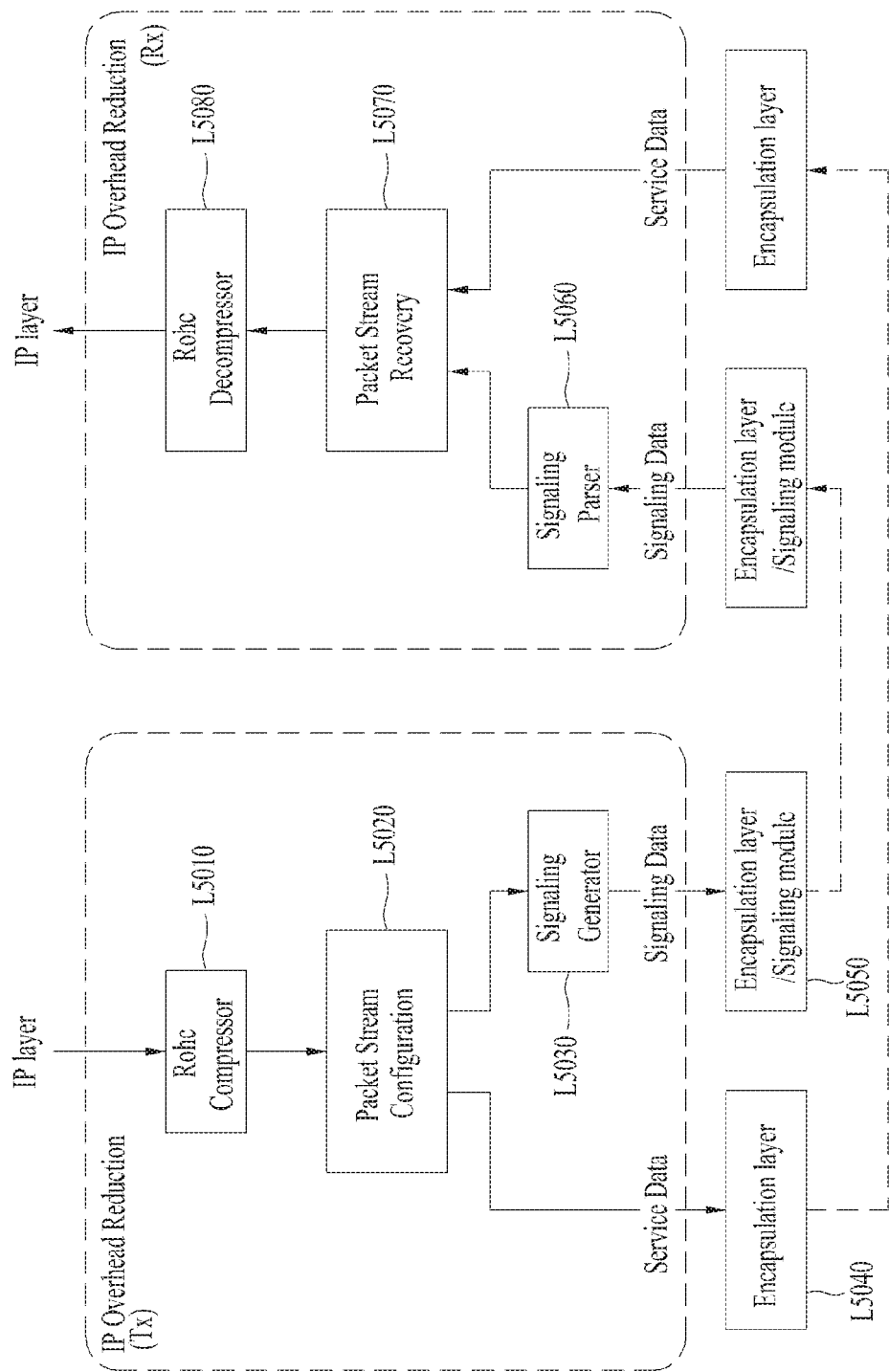
FIG. 23 illustrates an IP overhead reduction process in a transmitter/receiver according to an embodiment of the present invention.

FIG. 23 illustrates an IP overhead reduction process in the transmitter/receiver according to an embodiment of the present invention.

According to an embodiment of the present invention, when an IP stream enters the overhead reduction process, an RoHC compressor L5010 can perform header compression on the IP stream. RoHC can be used as a header compression algorithm in an embodiment of the present invention. The packet stream that has passed through RoHC can be reconfigured according to an RoHC packet format in a packet stream configuration process L5020, and the reconfigured RoHC packet stream can be delivered to an encapsulation layer L5040 and then transmitted to the receiver through the physical layer. RoHC context information and/or signaling information generated during packet stream reconfiguration can be made into data in a transmittable form through a signaling generator L5030 and the data can be delivered to an encapsulation layer or signaling module S5050 according to transmission form.

According to an embodiment of the present invention, the receiver can receive a stream with respect to service data and a signaling channel or signaling data transmitted through a separate DP. A signaling parser L5060 can receive the signaling data, parses the signaling data into RoHC context information and/or signaling information and transmit the parsed information to a packet stream recovery unit L5070. The receiver can recover the packet stream reconfigured in the transmitter in a format that can be decompressed by an RoHC decompressor L5080 using the RoHC context information and/or the signaling information included in the signaling data, through the packet stream recovery unit L5070. The RoHC decompressor L5080 can convert the recovered RoHC packet stream into an IP stream, and the IP stream can be delivered to an upper layer through the IP layer.

FIG. 24 illustrates RoHC profiles according to an embodiment of the present invention.

According to an embodiment of the present invention, RoHC can be used for header compression for an upper packet in the link layer, as described above. An RoHC framework can operate in the unidirectional mode, as described in RFC 3095, in consideration of characteristics of broadcast networks. The RoHC framework defines a plurality of header compression profiles. Each profile indicates a specific protocol combination and a profile identifier identifying each profile can be allocated by the Internet assigned numbers authority. Some of the profiles shown in FIG. 24 can be used in the broadcast system according to embodiments of the present invention.

Figure 25:
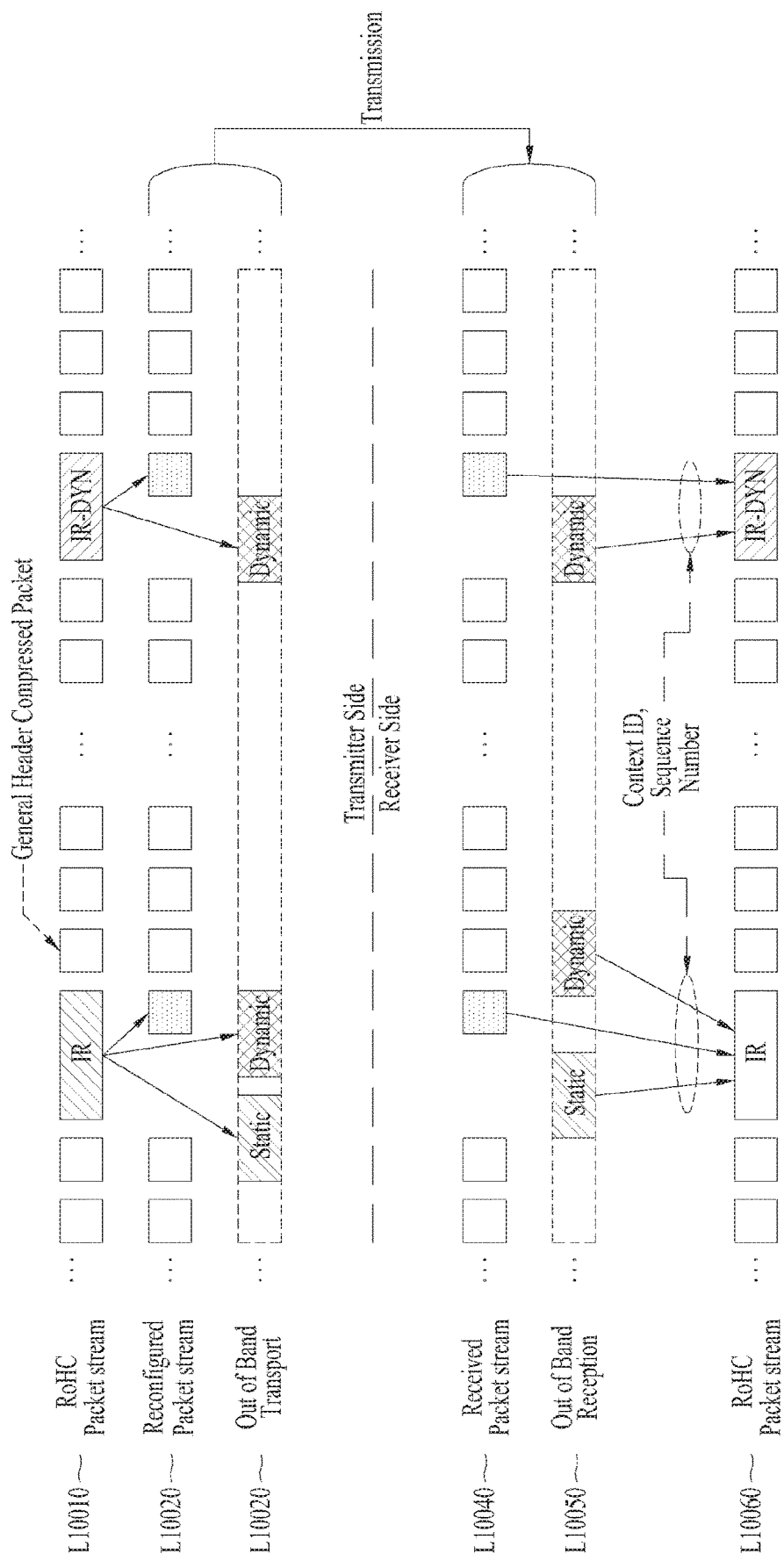
FIG. 25 illustrates processes of configuring and recovering an RoHC packet stream with respect to configuration mode #1 according to an embodiment of the present invention.

FIG. 25 illustrates processes of configuring and recovering an RoHC packet stream with respect to configuration mode #1 according to an embodiment of the present invention.

A description will be given of an RoHC packet stream configuration process in a transmitter according to an embodiment of the present invention.

The transmitter according to an embodiment can detect IR packets and IR-DYN packets from an RoHC packet stream L10010 on the basis of RoHC header information. Then the transmitter can generate general header compressed packets using sequence numbers included in the IR packets and the IR-DYN packets. The general header compressed packets can be randomly generated since the general header compressed packets include sequence number (SN) information irrespective of the type thereof. Here, the SN corresponds to information that is basically present in the RTP. In the case of the UDP, the transmitter can generate and use the SN. The transmitter can replace the JR packets or the IR-DYN packets with the generated general header compressed packets, extract a static chain and a dynamic chain from the IR packets and extract a dynamic chain from the IR-DYN packets. The extracted static chain and dynamic chain can be transported through out-of-band L10030. The transmitter can replace IR headers and IR-DYN headers with headers of general header compressed packets and extract static chains and/or dynamic chains, for all RoHC packet streams, according to the aforementioned process. A reconfigured packet stream L10020 can be transmitted through a data pipe and the extracted static chain and dynamic chain can be transported through out-of-band L10030.

A description will be given of a process of recovering an RoHC packet stream in a receiver according to an embodiment of the present invention.

The receiver according to an embodiment of the present invention can select a data pipe corresponding to a packet stream to be received using signaling information. Then, the receiver can receive the packet stream transmitted through the data pipe (S10040) and detect a static chain and a dynamic chain corresponding to the packet stream. Here, the static chain and/or the dynamic chain can be received through out-of-band (S10050). Subsequently, the receiver can detect general header compressed packets having the same SN as that of the static chain or the dynamic chain from the packet stream transmitted through the data pipe, using SNs of the detected static chain and the dynamic chain. The receiver can configure IR packets and/or IR-DYN packets by combining the detected general header compressed packets with the static chain and/or the dynamic chain. The configured IR packets and/or the IR-DYN packets can be transmitted to an RoHC decompressor. In addition, the receiver can configure an RoHC packet stream L10060 including the IR packets, the IR-DYN packets and/or the general header compressed packets. The configured RoHC packet stream can be transmitted to the RoHC decompressor. The receiver according to an embodiment of the present invention can recover the RoHC packet stream using the static chain, the dynamic chain, SNs and/or context IDs of the IR packets and the IR-DYN packets.

Figure 26:
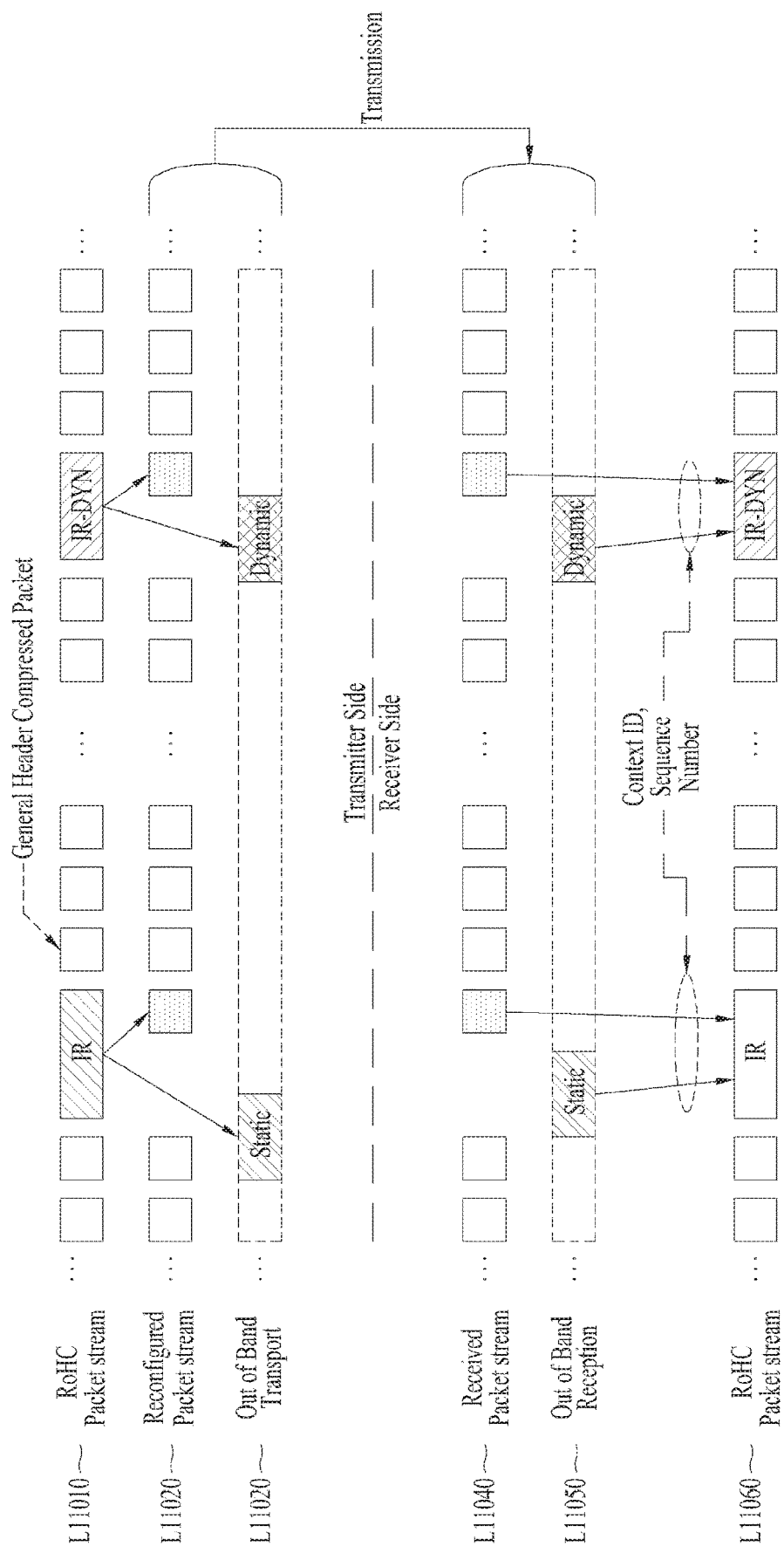
FIG. 26 illustrates processes of configuring and recovering an RoHC packet stream with respect to configuration mode #2 according to an embodiment of the present invention.

FIG. 26 illustrates processes of configuring and recovering an RoHC packet stream with respect to configuration mode #2 according to an embodiment of the present invention.

A description will be given of an RoHC packet stream configuration process in a transmitter according to an embodiment of the present invention.

The transmitter according to an embodiment can detect IR packets and IR-DYN packets from an RoHC packet stream L11010 on the basis of RoHC header information. Then the transmitter can generate general header compressed packets using sequence numbers included in the IR packets and the IR-DYN packets. The general header compressed packets can be randomly generated since the general header compressed packets include sequence number (SN) information irrespective of the type thereof. Here, the SN corresponds to information that is basically present in the RTP. In the case of the UDP, the transmitter can generate and use the SN. The transmitter can replace the IR packets or the IR-DYN packets with the generated general header compressed packets, extract a static chain from the IR packets and extract a dynamic chain from the IR-DYN packets. The extracted static chain and dynamic chain can be transported through out-of-band L11030. The transmitter can replace JR headers and IR-DYN headers with headers of general header compressed packets and extract static chains and/or dynamic chains, for all RoHC packet streams, according to the aforementioned process. A reconfigured packet stream L11020 can be transmitted through a data pipe and the extracted static chain and dynamic chain can be transported through out-of-band L11030.

A description will be given of a process of recovering an RoHC packet stream in a receiver according to an embodiment of the present invention.

The receiver according to an embodiment of the present invention can select a data pipe corresponding to a packet stream to be received using signaling information. Then, the receiver can receive the packet stream transmitted through the data pipe (S11040) and detect a static chain and a dynamic chain corresponding to the packet stream. Here, the static chain and/or the dynamic chain can be received through out-of-band (S11050). Subsequently, the receiver can detect general header compressed packets having the same SN as that of the static chain or the dynamic chain from the packet stream transmitted through the data pipe, using SNs of the detected static chain and the dynamic chain. The receiver can configure IR packets and/or IR-DYN packets by combining the detected general header compressed packets with the static chain and/or the dynamic chain. The configured IR packets and/or the IR-DYN packets can be transmitted to an RoHC decompressor. In addition, the receiver can configure an RoHC packet stream L11060 including the IR packets, the IR-DYN packets and/or the general header compressed packets. The configured RoHC packet stream can be transmitted to the RoHC decompressor. The receiver according to an embodiment of the present invention can recover the RoHC packet stream using the static chain, the dynamic chain, SNs and/or context IDs of the IR packets and the IR-DYN packets.

Figure 27:
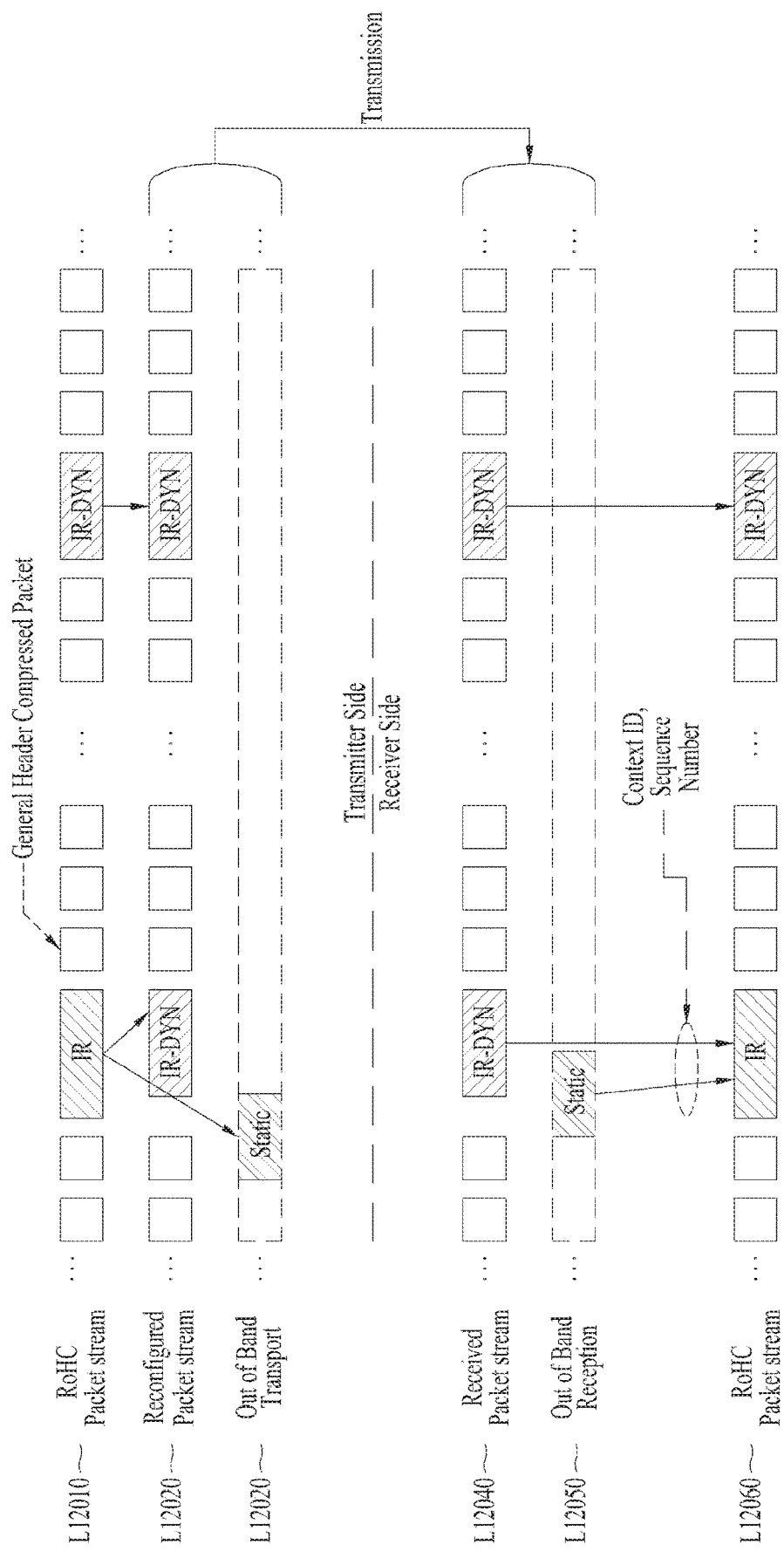
FIG. 27 illustrates processes of configuring and recovering an RoHC packet stream with respect to configuration mode #3 according to an embodiment of the present invention.

FIG. 27 illustrates processes of configuring and recovering an RoHC packet stream with respect to configuration mode #2 according to an embodiment of the present invention.

A description will be given of an RoHC packet stream configuration process in a transmitter according to an embodiment of the present invention.

The transmitter according to an embodiment can detect IR packets from an RoHC packet stream L12010 on the basis of RoHC header information. Then, the transmitter can extract a static chain from the IR packets and convert the IR packets into IR-DYN packets using parts of the IR packets other than the extracted static chain. The transmitter can replace headers of IR packets with headers of IR-DYN packets and extract static chains, for all RoHC packet streams, according to the aforementioned process. A reconfigured packet stream L12020 can be transmitted through a data pipe and the extracted static chain can be transported through out-of-band L12030.

A description will be given of a process of recovering an RoHC packet stream in a receiver according to an embodiment of the present invention.

The receiver according to an embodiment of the present invention can select a data pipe corresponding to a packet stream to be received using signaling information. Then, the receiver can receive the packet stream transmitted through the data pipe (S12040) and detect a static chain corresponding to the packet stream. Here, the static chain can be received through out-of-band (S12050). Subsequently, the receiver can detect IR-DYN packets from the packet stream transmitted through the data pipe. Then, the receiver can configure IR packets by combining the detected IR-DYN packets with the static chain. The configured IR packets can be transmitted to an RoHC decompressor. In addition, the receiver can configure an RoHC packet stream L12060 including the IR packets, the IR-DYN packets and/or general header compressed packets. The configured RoHC packet stream can be transmitted to the RoHC decompressor. The receiver according to an embodiment of the present invention can recover the RoHC packet stream using the static chain. SNs and/or context IDs of the IR-DYN packets.

FIG. 28 shows combinations of information that can be transported out of band according to an embodiment of the present invention.

According to an embodiment of the present invention, methods for transporting a static chain and/or a dynamic chain, extracted in an RoHC packet stream configuration process, out of band may include a method for transporting a static chain and/or a dynamic chain through signaling and a method for transporting a static chain and/or a dynamic chain through a data pipe through which parameters necessary for system decoding are delivered. In an embodiment of the present invention, the data pipe through which parameters necessary for system decoding are delivered may be called a base data pipe (DP).

As shown in the figure, the static chain and/or the dynamic chain can be transported through signaling or the base DP. In an embodiment of the present invention, transport mode #1, transport mode #2 and transport mode #3 can be used for configuration mode #1 or configuration mode #2 and transport mode #4 and transport mode #5 can be used for configuration mode #3.

According to an embodiment of the present invention, the configuration modes and the transport modes may be switched through additional signaling according to system state, and only one configuration mode and transport mode can be fixed and used according to system design.

As shown in the figure, the static chain and the dynamic chain can be transmitted through signaling and a general header compressed packet can be transmitted through a normal DP in transport mode #1.

Referring to the figure, the static chain can be transmitted through signaling, the dynamic chain can be transmitted through the base DP and the general header compressed packet can be transmitted through a normal DP in transport mode #2.

As shown in the figure, the static chain and the dynamic chain can be transmitted through the base DP and the general header compressed packet can be transmitted through a normal DP in transport mode #3.

Referring to the figure, the static chain can be transmitted through signaling, the dynamic chain can be transmitted through a normal DP and the general header compressed packet can be transmitted through a normal DP in transport mode #4.

As shown in the figure, the static chain can be transmitted through the base DP, the dynamic chain can be transmitted through a normal DP and the general header compressed packet can be transmitted through a normal DP in transport mode #5. Here, the dynamic chain can be transmitted through an IR-DYN packet.

Figure 29:
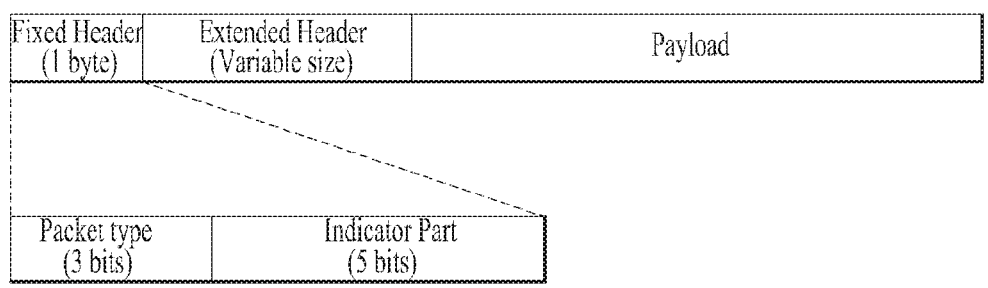
FIG. 29 illustrates a packet transmitted through a data pipe according to an embodiment of the present invention.

FIG. 29 illustrates a packet transmitted through a data pipe according to an embodiment of the present invention.

According to an embodiment of the present invention, it is possible to generate a link layer packet which is compatible irrespective of change of a protocol of an upper layer or a lower layer of the link layer by newly defining a packet structure in the link layer.

The link layer packet according to an embodiment of the present invention can be transmitted through a normal DP and/or the base DP.

The link layer packet can include a fixed header, an extended header and/or a payload.

The fixed header has a fixed size and the extended header has a size variable depending on a configuration of a packet of an upper layer. The payload is a region in which data of the upper layer is transmitted.

A packet header (fixed header or extended header) can include a field indicating the type of the payload of the packet. In the case of the fixed header, first 3 bits of 1 byte correspond to data indicating a packet type of the upper layer and the remaining 5 bits are used as an indicator part. The indicator part can include data indicating a payload configuration method and/or configuration information of the extended header and the configuration of the indicator part can be changed according to packet type.

The figure shows types of packets of the upper layer, included in the payload, according to packet type values.

The payload can carry an IP packet and/or an RoHC packet through a DP and carry a signaling packet through the base DP according to system configuration. Accordingly, even when packets of various types are simultaneously transmitted, a data packet and a signaling packet can be discriminated from each other by assigning packet type values.

A packet type value of 000 indicates that an IP packet of IPv4 is included in the payload.

A packet type value of 001 indicates that an IP packet of IPv6 is included in the payload.

A packet type value of 010 indicates that a compressed IP packet is included in the payload. The compressed IP packet may include a header-compressed IP packet.

A packet type value of 110 indicates that a packet including signaling data is included in the payload.

A packet type value of 111 indicates that a framed packet is included in the payload.

FIG. 30 illustrates a syntax of a link layer packet structure according to an embodiment of the present invention.

FIG. 30 shows the structure of the aforementioned packet transmitted through a data pipe. The link layer packet may have a Packet_Type field.

A field following the Packet_Type field can depend on the value of the Packet_Type field. When the Packet_Type field has a value of 000 or 001, as shown in the figure, the Packet_Type field can be followed by Link_Layer_Packet_Header_for_IP( ), that is, a header structure for IP packets. When the Packet_Type field has a value of 010, Link_Layer_Packet_Header_for_Compressed_IP( ), that is, a header structure for compressed IP packets can follow the Packet_Type field. When the Packet_Type field has a value of 011, the Packet_Type field can be followed by Link_Layer_Packet_Header_for_TS( ), that is, a header structure for TS packets. When the Packet_Type field has a value of 110, Link_Layer_Packet_Header_for_Signaling( ), that is, a header structure for signaling information can follow the Packet_Type field. When the Packet_Type field has a value of 111, the Packet_Type field can be followed by Link_Layer_Packet_Header_for_Framed_Packet( ), that is, a header structure for framed packets. Other values can be reserved for future use. Here, meaning of Packet_Type field values may be changed according to embodiments.

The field following the Packet_Type field can be followed by Link_Layer_Packet_Payload( ) which is a link layer packet payload.

Figure 31:
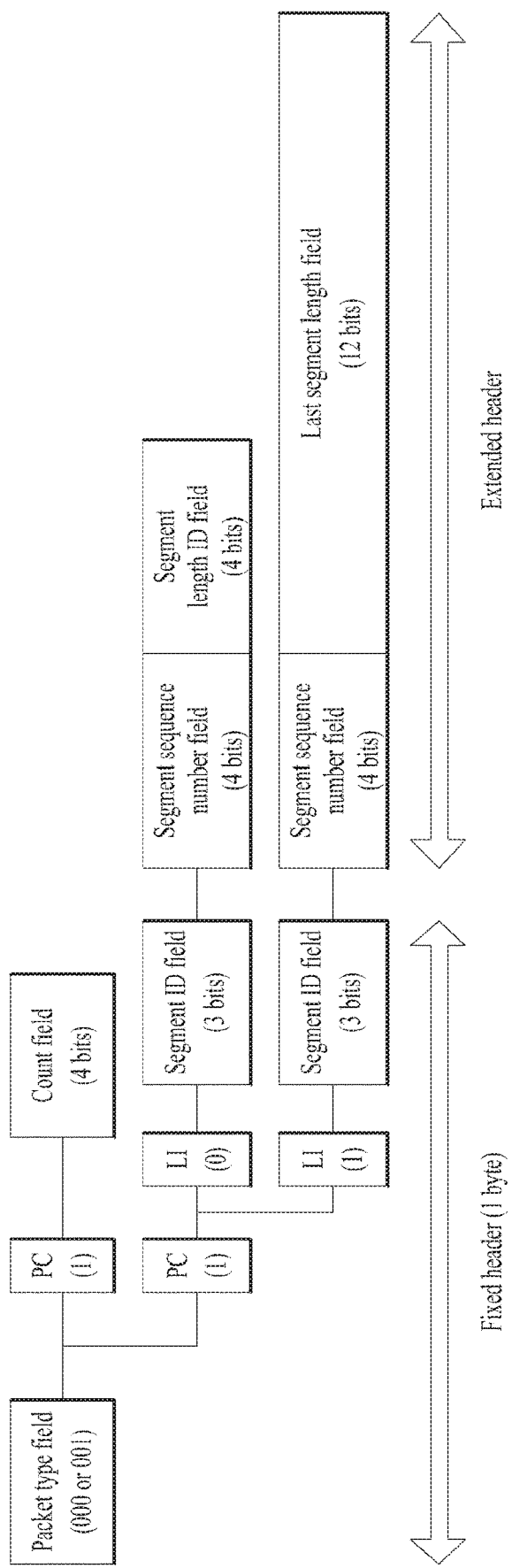
FIG. 31 illustrates a structure of a header of a link layer packet when IP packets are delivered to the link layer according to another embodiment of the present invention.

FIG. 31 illustrates a link layer packet header structure when an IP packet is delivered to the link layer according to another embodiment of the present invention.

In this case, the link layer packet header includes a fixed header and an extended header. The fixed header can have a length of 1 byte and the extended header can have a fixed length of a variable length. The length of each header can be changed according to design.

The fixed header can include a packet type field, a packet configuration (PC) field and/or a count field. According to another embodiment, the fixed header may include a packet type field, a PC field, an LI field and/or a segment ID field.

The extended header can include a segment sequence number field and/or a segment length ID field. According to another embodiment, the extended field may include a segment sequence number field and/or a last segment length field.

The fields of the fixed header will now be described.

The packet type field can indicate the type of a packet input to the link layer, as described above. When an IP packet is input to the link layer, the packet type field can have a value of 000B or 001B.

The PC field can indicate the remaining part of the fixed header, which follows the PC field, and/or the configuration of the extended header. That is, the PC field can indicate the form into which the input IP packet has been processed. Accordingly, the PC field can include information on the length of the extended header.

A PC field value of 0 can indicate that the payload of the link layer packet includes one IP packet or two or more concatenated IP packets. Here, concatenation means that short packets are connected to form a payload.

When the PC field has a value of 0, the PC field can be followed by a 4-bit count field. The count field can indicate the number of concatenated IP packets corresponding to one payload. The number of concatenated IP packets, indicated by the counter field, will be described later.

When the PC field value is 0, the link layer may not include the extended header. However, when the length of the link layer packet needs to be indicated according to an embodiment, a one or two-byte extended header can be added. In this case, the extended header can be used to indicate the length of the link layer packet.

A PC field value of 1 can indicate that the link layer packet payload includes a segmented packet. Here, segmentation of a packet means segmentation of a long IP packet into a plurality of segments. Each segmented piece can be called a segment or a segmented packet. That is, when the PC field value is 1, the link layer packet payload can include one segment.

When the PC field value is 1, the PC field can be followed by a 1-bit last segment indicator (LI) field and a 3-bit segment ID field.

The LI field can indicate whether the corresponding link layer packet includes the last segment from among segments. That is, the corresponding link layer includes the last segment when the LI field has a value of 1 and the corresponding link layer does not include the last segment when the LI field has a value of 0. The LI field can be used when a receiver reconfigures the original IP packet. The LI field may indicate information about the extended header of the link layer packet. That is, the length of the extended header can be 1 byte when the LI field value is 0 and 2 bytes when the LI field value is 1. Details will be described later.

The segment ID field can indicate the ID of a segment included in the corresponding link layer packet. When one IP packet is segmented into segments, the segments may be assigned the same ID. The segment ID enables the receiver to recognize that the segments are components of the same IP packet when reconfiguring the original IP packet. Since the segment ID field has a size of 3 bits, segmentation of 8 IP packets can be simultaneously supported.

When the PC field value is 1, the extended header can be used for information about segmentation. As described above, the extended header can include the segment sequence number field, the segment length ID field and/or the last segment length field.

The fields of the extended header will now be described.

When the aforementioned LI field has a value of 0, that is, when the link layer packet does not include the last segment, the extended header can include the segment sequence number field and/or the segment length ID field.

The segment sequence number field can indicate sequence numbers of segmented packets. Accordingly, link layer packets having segments obtained by segmenting one IP packet have different segment sequence number fields while having the same segment ID field. Since the segment sequence number field has a size of 4 bits, the IP packet can be segmented into a maximum of 16 segments.

The segment length ID field can indicate the length of segments other than the last segment. Segments other than the last segment may have the same length. Accordingly, the length of the segments can be represented using a predetermined length ID. The predetermined length ID can be indicated by the segment length ID field.

Segment lengths can be set according to a packet input size which is determined on the basis of an FEC code rate of the physical layer. That is, segment lengths can be determined according to the packet input size and designated by segment length IDs. To reduce header overhead, the number of segment lengths can be limited to 16.

Segment length ID field values according to segment lengths will be described later.

When the physical layer operates irrespective of segment lengths, a segment length can be obtained by adding a minimum segment length min_len to a product of the corresponding segment length ID and a length unit Len_Unit. Here, the length unit is a basic unit indicating a segment length and the minimum segment length means a minimum value of the segment length. The transmitter and the receiver need to always have the same length unit and the same minimum segment length, and it is desirable that the length unit and the minimum segment length not be changed for efficient system operation. The length unit and the minimum segment length can be determined in consideration of FEC processing capability of the physical layer in the system initialization process.

When the aforementioned LI field has a value of 1, that is, when the link layer packet includes the last segment, the extended header can include the segment sequence number field and/or the last segment length field.

The segment sequence number field has been described above.

The last segment length field can directly indicate the length of the last segment. When one IP packet is segmented into segments having specific lengths, the last segment may have a different length from those of other segments. Accordingly, the last segment length field can directly indicate the length of the last segment. The last segment length field can represent 1 to 4095 bytes. Bytes indicated by the last segment length field may be changed according to embodiments.

FIG. 32 illustrates a syntax of a link layer packet header structure when an IP packet is delivered to the link layer according to another embodiment of the present invention.

The link layer packet header can include the Packet_Type field and the PC field Payload_Config, as described above.

When the PC field has a value of 0, the PC field can be followed by the count field.

When the PC field has a value of 1, the PC field can be followed by a Last_Segment_Indicator field, Segment_ID field and Segment_Sequence_Number field. Here, the configuration of the part following the Last_Segment_Indicator field can be changed according to the value of the Last_Segment_Indicator field. When the Last_Segment_Indicator field is 0, the Segment_Length_ID field can follow the Segment_Sequence_Number field. When the Last_Segment_Indicator field is 1, the Last_Segment_Length field can follow the Segment_Sequence_Number field.

FIG. 33 illustrates indication of field values in a link layer packet header when an IP packet is delivered to the link layer according to another embodiment of the present invention.

As described above, the number of concatenated IP packets can be determined on the basis of a count field value (t61010). While the count field value can directly indicate the number of concatenated IP packets, the count field value is meaningless when 0 packets are concatenated. Accordingly, the count field can indicate that as many IP packets as the value obtained by adding 1 to the count field value have been concatenated. That is, a count field value of 0010 can indicate that 3 IP packets have been concatenated and a count field value of 0111 can indicate that 8 IP packets have been concatenated as shown in the table t61010.

A count field value of 0000 indicating that one IP packet has been concatenated can represent that the link layer packet payload includes one IP packet without concatenation.

As described above, a segment length can be indicated by a segment length ID field value (t61020).

For example, a segment length ID field value of 0000 can indicate a segment length of 512 bytes. This means that a segment included in the corresponding link layer packet payload is not the last segment and has a length of 512 bytes. Other segments from the same IP packet may also have a length of 512 bytes if the segments are not the last segment.

In the table, the length unit has a value of 256 and the minimum segment length has a value of 512. Accordingly, the minimum segment length is 512 bytes (segment length ID field=0000). Designated segment lengths increase at an interval of 256 bytes.

Figure 34:
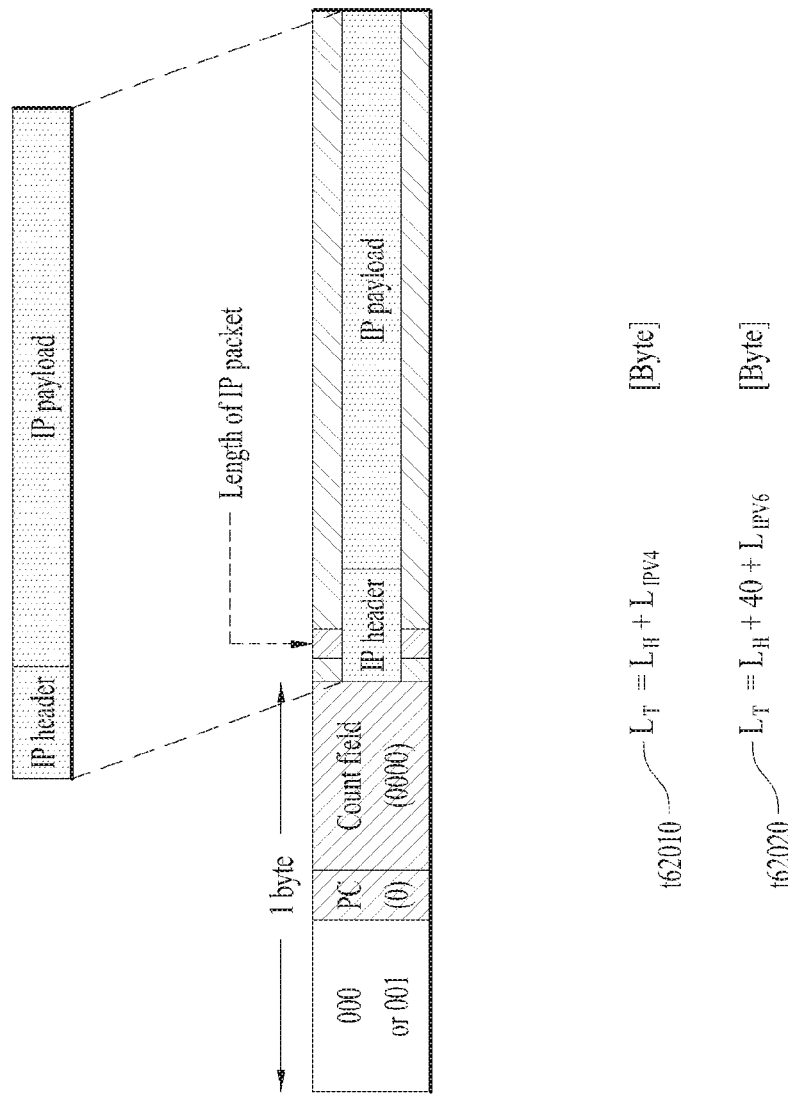
FIG. 34 illustrates a case in which one IP packet is included in a link layer payload, in a link layer packet header structure when IP packets are transmitted to the link layer, according to another embodiment of the present invention.

FIG. 34 illustrates a case in which one IP packet is included in a link layer payload in a link layer packet header structure when IP packets are delivered to the link layer according to another embodiment of the present invention.

A case in which one IP packet is included in the link layer payload, that is, a case in which concatenation or segmentation is not performed may be referred to as encapsulation into a normal packet. In this case, the IP packet is within a processing range of the physical layer.

In the present embodiment, the link layer packet has a 1-byte header. The header length may be changed according to embodiments. The packet type field may have a value of 000 (in the case of IPv4) or 001 (in the case of IPv6). Normal packet encapsulation can be equally applied to IPv4 and IPv6. The PC field value can be 0 since one packet is included in the payload. The count field following the PC field can have a value of 0000 since only one packet is included in the payload.

In the present embodiment, the link layer packet payload can include one whole IP packet.

In the present embodiment, information of the IP packet header can be used to confirm the length of the link layer packet. The IP packet header includes a field indicating the length of the IP packet. This field can be called a length field. The length field may be located at a fixed position in the IP packet. Since the link layer payload includes one whole IP packet, the length field can be located at a position at a distance from the starting point of the link layer packet payload by a predetermined offset. Accordingly, the length of the link layer payload can be recognized using the length field.

The length field can be located at a position at a distance from the starting point of the payload by 4 bytes in the case of IPv4 and at a position at a distance from the starting point of the payload by 2 bytes in the case of IPv6. The length field can have a length of 2 bytes.

In the case of IPv4, when the length field value is $L_{IPv4}$ and the link layer packet header length is $L_H$ (1 byte), the total length of the link layer packet, $L_T$, can be represented by an equation t62010 shown in the figure. Here, the length field value LIPv4 can indicate the length of the IPv4 packet.

In the case of IPv6, when the length field value is $L_{IPv6}$ and the link layer packet header length is $L_H$ (1 byte), the total link layer packet length $L_T$ can be represented by an equation t62020 shown in the figure. Here, since the length field value $L_{IPv6}$ indicates only the length of the IPv6 packet payload, the length (40 bytes) of the fixed header of the IPv6 packet needs to be added to the length field value in order to obtain the length of the link layer packet.

Figure 35:
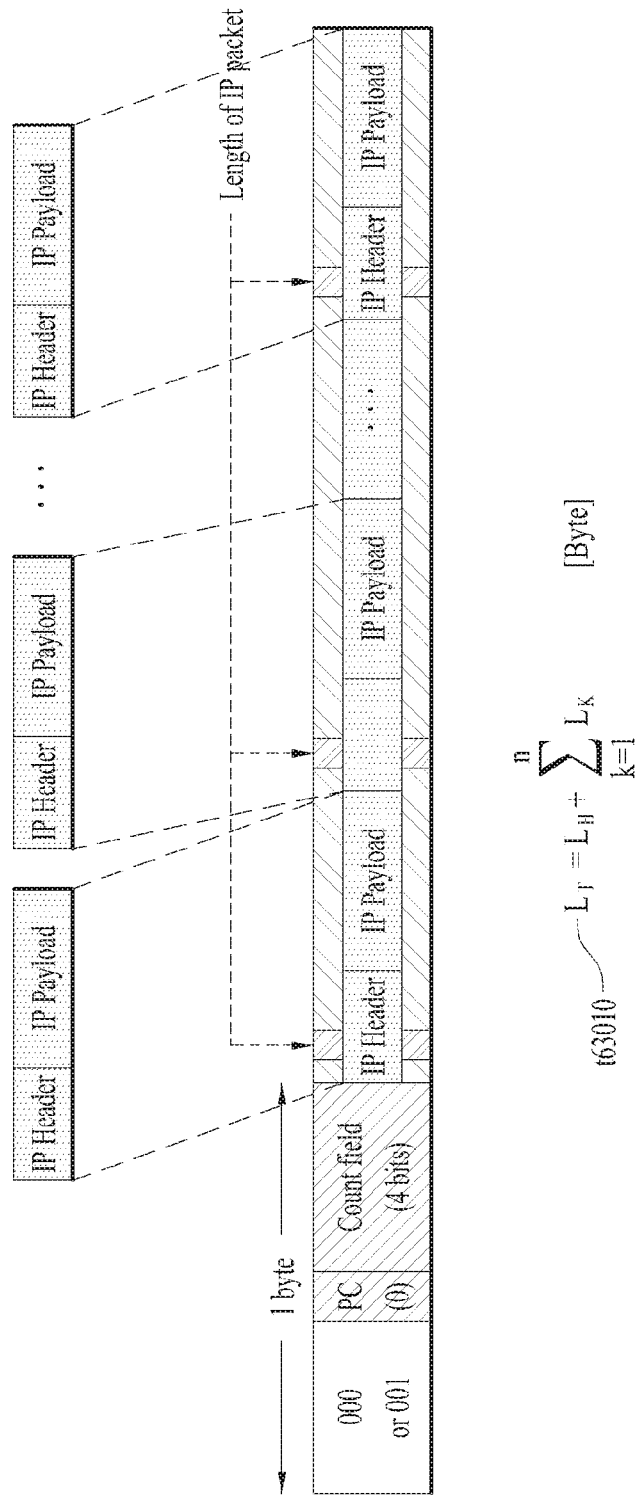
FIG. 35 illustrates a case in which multiple IP packets are concatenated and included in link layer payloads, in a link layer packet header structure when IP packets are transmitted to the link layer, according to another embodiment of the present invention.

FIG. 35 illustrates a case in which multiple IP packets are concatenated and included in a link layer payload in a link layer packet header structure when IP packets are delivered to the link layer according to another embodiment of the present invention.

When input IP packets are not within the processing range of the physical layer, multiple IP packets may be concatenated and encapsulated into a payload of one link layer packet.

In the present embodiment, the link layer packet can have a 1-byte header. The header length may be changed according to embodiments. The packet type field can have a value of 000 (in the case of IPv4) or 001 (in the case of IPv6). The encapsulation process of the present embodiment can be equally applied to IPv4 and IPv6. The PC field value can be 0 since the concatenated IP packets are included in the payload. The count field following the PC field (4 bits) can indicate the number of concatenated IP packets.

In the present embodiment, the link layer packet payload can include multiple IP packets. The multiple IP packets can be sequentially concatenated and included in the link layer packet payload. The concatenation method can be changed according to design.

In the present embodiment, to confirm the length of the link layer packet, information of headers of the concatenated IP packets can be used. As in the aforementioned normal packet encapsulation, the header of each IP packet may have the length field indicating the length of the IP packet. The length field can be located at a fixed position in the corresponding IP packet.

Accordingly, when the header length of the link layer packet is $L_H$ and the length of each IP packet is $L_K$ (K being equal to or greater than 1 and equal to or less than n), the total length of the link layer packet length, $L_T$, can be represented by an equation t63010 shown in the figure. That is, the link layer packet length can be obtained by summing the lengths of the IP packets, respectively indicated by the length fields of the IP packets, and adding the header length of the link layer packet to the sum. $L_K$ can be confirmed by reading the length fields of the headers of the respective IP packets.

Figure 36:
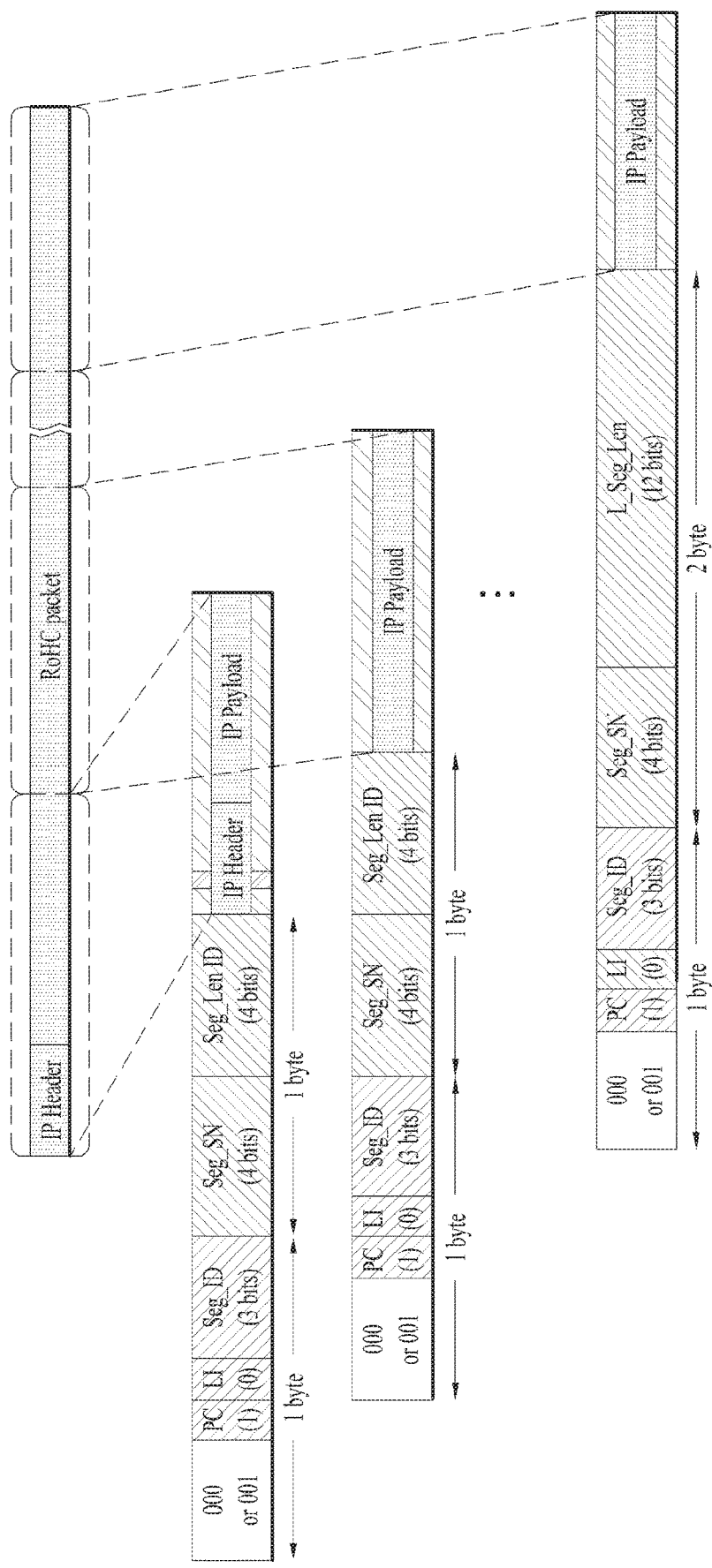
FIG. 36 illustrates a case in which one IP packet is segmented and included in link layer payloads, in a link layer packet header structure when IP packets are transmitted to the link layer, according to another embodiment of the present invention.

FIG. 36 illustrates a case in which one IP packet is segmented and included in a link layer payload in a link layer packet header structure when IP packets are delivered to the link layer according to another embodiment of the present invention.

When input IP packets exceed the processing range of the physical layer, one IP packet may be segmented into a plurality of segments. The segments can be respectively encapsulated in payloads of link layer packets.

In the present embodiment, link layer packets t64010, t64020 and t64030 can have fixed headers and extended headers. The fixed header length and extended header length may be changed according to embodiments. The packet type field value can be 000 (in the case of IPv4) or 001 (in the case of IPv6). The encapsulation process of the present embodiment can be equally applied to IPv4 and IPv6. The PC field value can be 1 since the segments are included in the payloads.

The link layer packets t64010 and t64020 including segments, which are not the last segment, in the payloads thereof can have an LI field value of 0 and the same segment ID field value since the segments are from the same IP packet. The segment sequence number field following the segment ID field can indicate the sequence of the corresponding segment. Here, the segment sequence field value of the first link layer packet t64010 can indicate that the link layer packet has the first segment as a payload. The segment sequence field value of the second link layer packet t64020 can indicate that the link layer packet has the second segment as a payload. The segment length ID field can represent the length of the corresponding segment as a predetermined length ID.

The link layer packet 164030 having the last segment as a payload may have an LI field value of 1. The segment ID field can have the same value as those of other link layer packets since the last segment is also from the same IP packet. The segment sequence number field following the segment ID field can indicate the sequence of the corresponding segment. The last segment length field can directly indicate the length of the last segment included in the link layer packet t64030.

In the present embodiment, to confirm the length of a link layer packet, the segment length ID field or the last segment length field can be used. Since the fields indicate only the length of the payload of the link layer packet, the header length of the link layer packet needs to be added thereto in order to obtain the length of the link layer packet. The header length of the link layer packet can be detected from the LI field, as described above.

Figure 37:
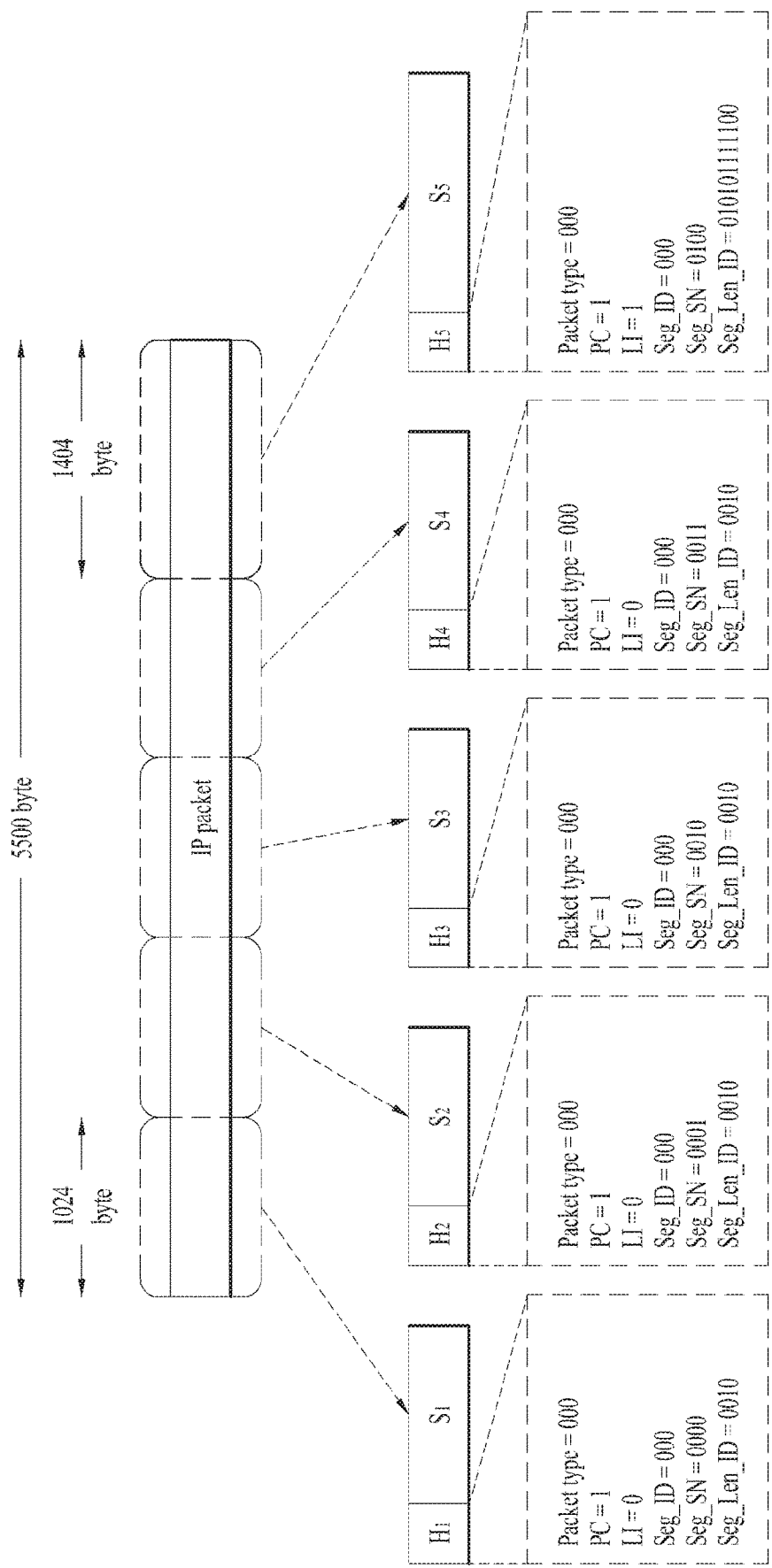
FIG. 37 illustrates link layer packets having segments, in a link layer packet header structure when IP packets are transmitted to the link layer, according to another embodiment of the present invention.

FIG. 37 illustrates link layer packets having segments in a link layer packet header structure when IP packets are transmitted to the link layer according to another embodiment of the present invention.

The present embodiment assumes that a 5500-byte IP packet is input. Since the value obtained by dividing 5500 by 5 is 1100, the IP packet can be segmented into segments each having a length of 1024 bytes closes to 1100. In this case, the last segment can be 1404 bytes (010101111100B). The segments can be respectively referred to as S1, S2, S3, S4 and S5 and headers corresponding thereto can be respectively referred to as H1, H2, H3, H4 and H5. The headers can be respectively added to the segments to generate respective link layer packets.

When the input IP packet is an IPv4 packet, the packet type fields of the headers H1 to H5 can have a value of 000. The PC fields of the headers H1 to H5 can have a value of 1 since the link layer packets have the segments of the packet as payloads.

LI fields of the headers H1 to H4 can have a value of 0 since the corresponding link layer packets do not have the last segment as a payload. The LI field of the header H5 can have a value of 1 since the corresponding link layer packet has the last segment as a payload. The segment ID fields, Seg_ID, of the headers H1 to H5 can have the same value, 000, since the corresponding link layer packets have segments from the same packet as payloads.

The segment sequence number fields, Seg_SN, of the headers H1 to H5 can be sequentially represented as 0000B to 0100B. The segment length ID fields of the headers H1 to H4 can have a value of 0010 corresponding to an ID that is 1024 bytes in length. The segment length ID field of the header H5 can have a value of 000101111100 which indicates 1404 bytes.

Figure 38:
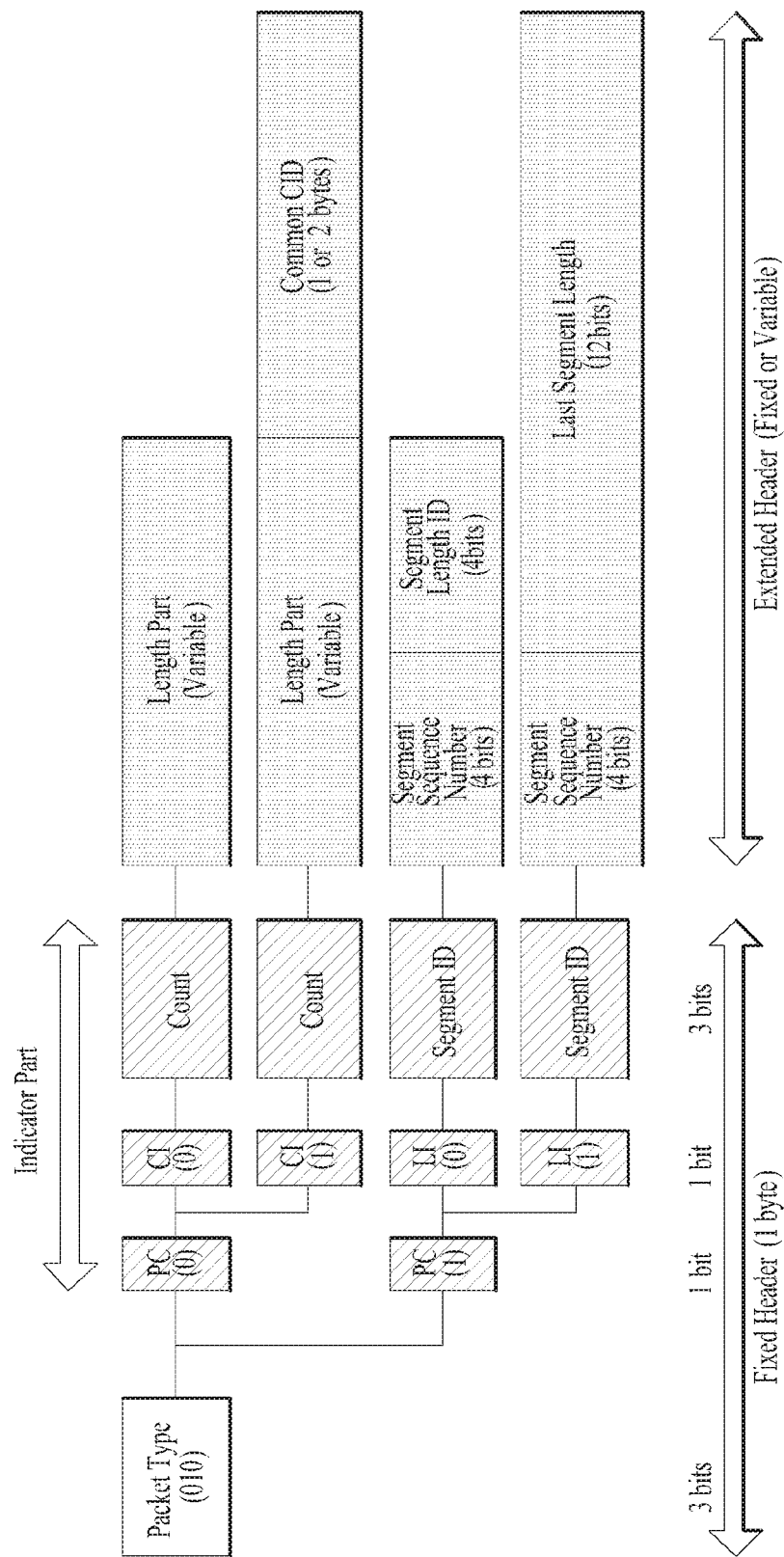
FIG. 38 illustrates a header of a link layer packet for RoHC transmission according to an embodiment of the present invention.

FIG. 38 illustrates a header of a link layer packet for RoHC transmission according to an embodiment of the present invention.

Even in an IP based broadcast environment, an IP packet can be compressed into a link layer packet and transmitted. When an IP based broadcast system streams IP packets, header information of the IP packets can generally remain unchanged. Using this fact, IP packet headers can be compressed.

Robust header compression (RoHC) is mainly used to compress an IP packet header (IP header). The present invention proposes an encapsulation method when RoHC packets are input to the link layer.

When RoHC packets are input to the link layer, the aforementioned packet type element may have a value of $001_B$, which indicates that a packet delivered from an upper layer to the link layer is a compressed IP packet.

When RoHC packets are input, the header of the link layer packet can include a fixed header and/or an extended header like the aforementioned other packets.

The fixed header can include a packet type field and/or a packet configuration (PC) field. The fixed header may have a size of 1 byte. Here, the packet type field can have a value of 010 since the input packet is a compressed IP packet. The extended header can have a fixed size or a variable size according to embodiments.

The PC field of the fixed header can indicate a form into which RoHC packets constituting the link layer packet payload are processed. Information of the remaining part of the fixed header, which follows the PC field, and the extended header can be determined by the value of the PC field. In addition, the PC field can include information on the length of the extended header according to the form into which RoHC packets are processed. The PC field can have a size of 1 bit.

A description will be given of a case in which the PC field has a value of OB.

When the PC field has a value of OB, the link layer packet payload is composed of one RoHC packet or two or more concatenated RoHC packets. Concatenation refers to connecting a plurality of short packets to configure a link layer packet payload.

When the PC field has a value of OB, the PC field can be followed by a 1-bit common context ID indicator (CI) field and a 3-bit count field. Accordingly, common CID information and a length part can be added to the extended header. The length part can indicate the length of an RoHC packet.

The CI field can be set to 1 when RoHC packets constituting the payload of one link layer packet have the same context ID (CID) and set to 0 otherwise. When the CI field has a value of 1, an overhead processing method for a common CID can be applied. The CI field can be 1 bit.

The count field can indicate the number of RoHC packets included in the payload of one link layer packet. That is, when RoHC packets are concatenated, the number of concatenated RoHC packets can be indicated by the count field. The count filed can be 3 bits. Accordingly, a maximum of 8 RoHC packets can be included in the payload of one link layer packet, as shown in the following table. A count field value of 000 indicates that the link layer packet payload is composed of one RoHC packet rather than multiple concatenated RoHC packets.

TABLE 1

| Count (3 bits) | No. of Concatenated RoHC packets |
|---|---|
| 000 | 1 |
| 001 | 2 |
| 010 | 3 |
| 011 | 4 |
| 100 | 5 |
| 101 | 6 |
| 110 | 7 |
| 111 | 8 |

The length part can indicate an RoHC packet length, as described above. The RoHC packet has a header from which length information has been removed, and thus the length field in the RoHC packet header cannot be used. Accordingly, the header of the link layer packet can include the length part in order to enable the receiver to recognize the length of the corresponding RoHC packet.

An IP packet has a maximum of 65535-byte length when an MTU is not determined. Accordingly, 2-byte length information is necessary for the RoHC packet such that a maximum length thereof can be supported. When multiple RoHC packets are concatenated, as many length fields as the number designated by the count field can be added. In this case, the length part includes a plurality of length fields. However, when one RoHC packet is included in the payload, only one length field can be included in the length part. Length fields can be arranged in the same order as that of RoHC packets constituting the link layer packet payload. Each length field can be a value in bytes.

A common CID field is a field through which a common CID is transmitted. The header of the RoHC packet may include a context ID (CID) used to check the relation between compressed headers. The CID can be maintained as the same value in a stable link state. Accordingly, all RoHC packets included in the payload of one link layer packet may include the same CID. In this case, to reduce overhead, it is possible to remove the CID from the headers of concatenated RoHC packets constituting the payload, indicate the CID in the common CID field of the header of the link layer packet and transmit the link layer packet. The receiver can reconfigure the CID of the RoHC packets using the common CID field. When the common CID field is present, the aforementioned CI field needs to have a value of 1.

A description will be given of a case in which the PC field has a value of $I_B$.

A PC field value of $I_B$ indicates that a link layer packet payload is composed of segmented packets of an RoHC packet. Here, a segmented packet refers to a segment from among a plurality of segments obtained by segmenting a long RoHC packet. One segment constitutes a link layer packet payload.

When the PC field has a value of $I_B$, the PC field can be followed by a 1-bit last segment indicator (LI) field and a 3-bit segment ID field. To add information about segmentation, a segment sequence number field, a segment length ID field and a last segment length field may be added to the extended header.

The LI field can be used when an RoHC packet is segmented. An RoHC packet can be segmented into a plurality of segments. An LI field value of 1 can indicate that a segment included in the current link layer packet is the last segment from among segments obtained from one RoHC packet. An LI field value of 0 can indicate that a segment included in the current link layer packet is not the last segment. The LI field can be used when the receiver determines whether all segments have been received when reconfiguring one RoHC packet by combining segments. The LI field can be 1 bit.

The segment ID field Seg_ID can indicate an ID assigned to an RoHC packet when the RoHC packet is segmented. Segments derived from one RoHC packet can have the same segment ID. The receiver can determine whether segments transmitted thereto are components of the same RoHC packet using the segment ID when combining the segments. The segment ID field can be 3 bits. Accordingly, the segment ID field can simultaneously support segmentation of 8 RoHC packets.

The segment sequence number field Seg_SN can be used to check the sequence of segments when an RoHC packet is segmented. That is, link layer packets having segments derived from one RoHC packet as payload thereof may have different segment sequence number fields while having the same sequence ID field. Accordingly, one RoHC packet can be segmented into a maximum of 16 segments.

The segment length ID field Seg_Len_ID can be used to represent the length of each segment. However, the segment length ID field can be used to indicate the length of segments other than the last segment from among a plurality of segments. The length of the last segment can be indicated by the last segment length field which will be described later. When a link layer packet payload does not correspond to the last segment of an RoHC packet, that is, when the LI field is 0, the segment length ID field can be present.

To reduce header overhead, the number of segment lengths can be limited to 16. A packet input size may be determined according to code rate of FEC processed in the physical layer. Segment lengths can be determined according to the packet input size and designated by Seg_Len_ID. When the physical layer operates irrespective of segment lengths, a segment length can be determined as follows.

$$\text{Segment Length} = \text{Seg\_Len\_ID} \times \text{Len\_Unit} + \text{min\_Len} \text{ [bytes]} \quad \text{[Equation 1]}$$

Here, a length unit Len Unit is a basic unit indicating a segment length and min_Len indicates a minimum segment length. The transmitter and the receiver need to have the same Len_Unit and the same min_Len. It is efficient for system operation that Len_Unit and the same min Len are not changed after being determined once. Furthermore, Len_Unit and min_Len can be determined in consideration of FEC processing capability of the physical layer in the system initialization process.

The following table shows segment lengths represented according to Seg_Len_ID values. A length allocated to Seg_Len_ID can be changed according to design. In the present embodiment, Len_Unit is 256 and min_Len is 512.

TABLE 2

| Seg_Len_ID | Segment Length (byte) | Seg_Len_ID | Segment Length (byte) |
|---|---|---|---|
| 0000 | 512 (=min_Len) | 1000 | 2560 |
| 0001 | 768 | 1001 | 2816 |
| 0010 | 1024 | 1010 | 3072 |
| 0011 | 1280 | 1011 | 3328 |
| 0100 | 1536 | 1100 | 3584 |
| 0101 | 1792 | 1101 | 3840 |
| 0110 | 2048 | 1110 | 4096 |
| 0111 | 2304 | 1111 | 4352 |

The last segment length field L_Seg_Len is used when a segment included in a link layer packet payload is the last segment of the corresponding RoHC packet. That is, the last segment length field is used when the LI field has a value of 1. An RoHC packet can be segmented into segments of the same size using Seg_Len_ID. In this case, however, the last segment may not have the size indicated by Seg_Len_ID. Accordingly, the length of the last segment can be directly indicated by the last segment length field. The last segment length field can indicate 1 to 4095 bytes. This can be changed according to embodiments.

FIG. 39 illustrates a syntax of a header of a link layer packet for RoHC packet transmission according to an embodiment of the present invention.

The link layer packet header may include the Packet_Type field and the PC field Payload_Config, which have been described above.

When the PC field has a value of 0, the PC field can be followed by a Common_Context_ID_indication field and a count field. A plurality of length fields can be included in the link layer packet on the basis of a value indicated by the count field. When the CI field is 1, a Common_CID field can be additionally included in the link layer packet header.

When the PC field is 1, the PC field can be followed by a Last_Segment_Indicator field, a Segment_ID field and a Segment_Sequence_Number field. A configuration of the part following the Last_Segment_Indicator field can be changed according to the value of the Last_Segment_Indicator field. When the Last_Segment_Indicator field is 0, the Segment_Sequence_Number field can be followed by the Segment_Length_ID field. When the Last_Segment_Indicator field is 1, the Segment_Sequence_Number field can be followed by the Last_Segment_Length field.

Figure 40:
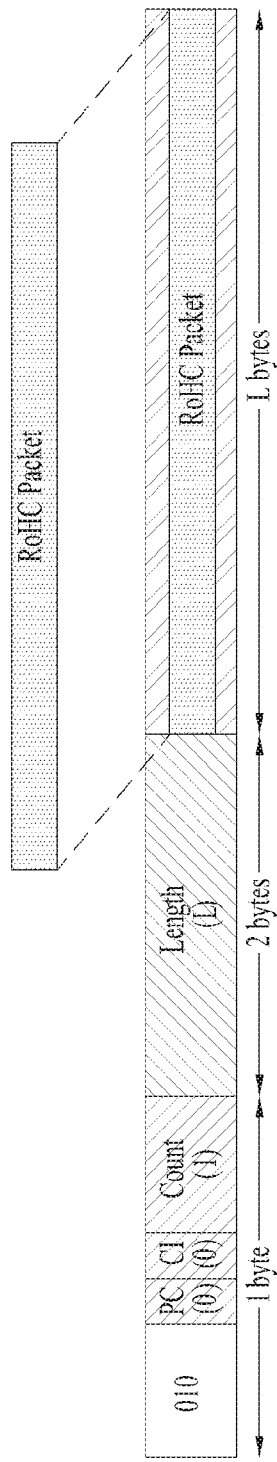
FIG. 40 illustrates a method for transmitting an RoHC packet through a link layer packet according to embodiment #1 of the present invention.

FIG. 40 illustrates a method for transmitting an RoHC packet through a link layer packet according to embodiment #1 of the present invention.

The present embodiment corresponds to a case in which one RoHC packet constitutes a link layer packet payload since the RoHC packet is within a processing range of the physical layer. Here, the RoHC packet may not be concatenated or segmented.

In this case, one RoHC packet can become a link layer packet payload. The packet type field can be $010_B$, the PC field can be $0_B$ and the CI field can be B. The aforementioned count field can be $000_B$ since one RoHC packet constitutes the payload (the number of RoHC packets constituting the payload being 1). The count field can be followed by a 2-byte length field indicating the length of the RoHC packet. In this case, the length part can include only one length field since only one packet constitutes the payload.

In the present embodiment, a 3-byte link layer header can be added. Accordingly, when the length of the RoHC packet, indicated by the length field, is L bytes, the length of the link layer packet is L+3 bytes.

Figure 41:
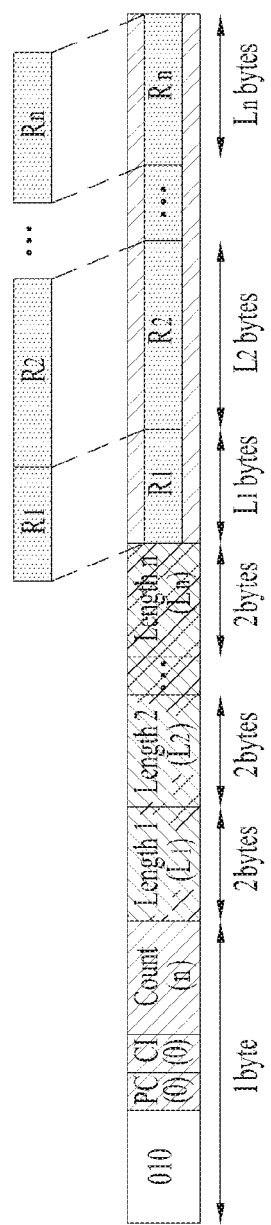
FIG. 41 illustrates a method for transmitting an RoHC packet through a link layer packet according to embodiment #2 of the present invention.

FIG. 41 illustrates a method for transmitting an RoHC packet through a link layer packet according to embodiment #2 of the present invention.

The present embodiment corresponds to a case in which an RoHC packet does not exceed the processing range of the physical layer and thus multiple RoHC packets are concatenated and included in a payload of a link layer packet.

In this case, the PC field and the CI field have same values as those in a case in which one RoHC packet is included in a link layer packet payload. The CI field is followed by the count field. The count field can have a value in the range of $001_B$ to $111_B$ on the basis of the number of RoHC packets included in the payload, as described above.

The count field can be followed by as many 2-byte length fields as the number indicated by the count field. Each length field can indicate the length of each RoHC packet.

The length fields can be called a length part.

When the count field indicates n, RoHC packets $R_1, R_2, \ldots, R_n$ respectively having lengths $L_1, L_2, \ldots, L_n$ can be concatenated in the link layer packet payload.

The extended header can have a length of 2n bytes. The total length of the link layer packet, $L_T$, can be represented by the following equation.

$$L_T = 1 + 2n + \sum_{k=1}^{n} L_k \text{ [bytes]} \quad \text{[Equation 2]}$$

Figure 42:
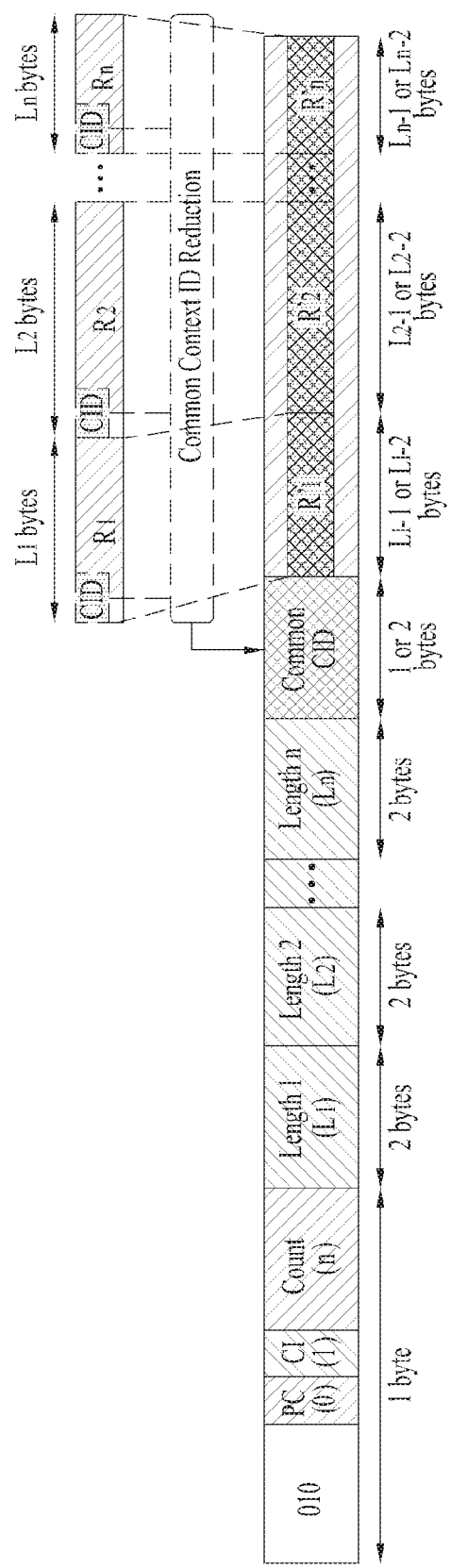
FIG. 42 illustrates a method for transmitting an RoHC packet through a link layer packet according to embodiment #3 of the present invention.

FIG. 42 illustrates a method for transmitting an RoHC packet through a link layer packet according to embodiment #3 of the present invention.

The present embodiment corresponds to a case in which RoHC packets are concatenated to constitute a payload of a link layer packet and the RoHC packets have the same CID.

When the RoHC packets have the same CID, even if the CID is indicated only once through the link layer packet and transmitted to the receiver, the receiver can recover the original RoHC packets and headers thereof. Accordingly, a common CID can be extracted from the RoHC packets and transmitted, reducing overhead.

In this case, the aforementioned CI field becomes 1, which represents that processing for the same CID has been performed. The RoHC packets having the same CID are indicated by [R1, R2, R3, . . . Rn]. The same CID is referred to as a common CID. Packets other than CIDs in RoHC packet headers are referred to as R'k (k being 1, 2, . . . , n).

The link layer packet payload can include R'k (k being 1, 2, . . . , n). A common CID field can be added to the end of the extended header of the link layer packet. The common CID field may be a field for common CID transmission. The common CID field may be transmitted as a part of the extended header or a part of the link layer packet payload. It is possible to rearrange the common CID field in a part in which the position of the common CID field can be identified according to system operation.

The size of the common CID field can depend on RoHC packet configuration.

When the RoHC packet configuration is a small CID configuration, the CID of an RoHC packet can be 4 bits. However, when the CID is extracted from the RoHC packet and rearranged, the entire add-CID octet can be processed. That is, the common CID field can have a length of 1 byte. Alternatively, it is possible to extract a 1-byte add-CID octet from the RoHC packet, allocate only a 4-bit CID to the common CID field and reserve the remaining 4 bits for future use.

When the RoHC packet configuration is a large CID configuration, the CID of an RoHC packet can be 1 byte or 2 bytes. The CID size is determined in the RoHC initialization process. The common CID field can have a length of 1 byte or 2 bytes depending on the CID size.

In the present embodiment, the link layer packet payload can be calculated as follows. n RoHC packets $R_1, R_2, \ldots R_n$ having the same CID are respectively referred to as $L_1, L_2, \ldots, L^n$. When the length of the link layer packet header is $L_H$, the length of the common CID field is $L_{CID}$ and the total length of the link layer packet is $L_T$, $L_H$ is calculated as follows.

$$L_N = 1 + 2n + L_{CID} \text{ bytes} \qquad \text{[Equation 3]}$$

$L_T$ can be calculated as follows.

$$L_T = L_H + \sum_{k=1}^{n}(L_k - L_{CID}) \text{ bytes} \qquad \text{[Equation 4]}$$

As described above, $L_{CID}$ can be determined according to CID configuration of RoHC. That is, $L_{CID}$ can be 1 byte in the case of a small CID configuration and 1 byte or 2 bytes in the case of a large CID configuration.

Figure 43:
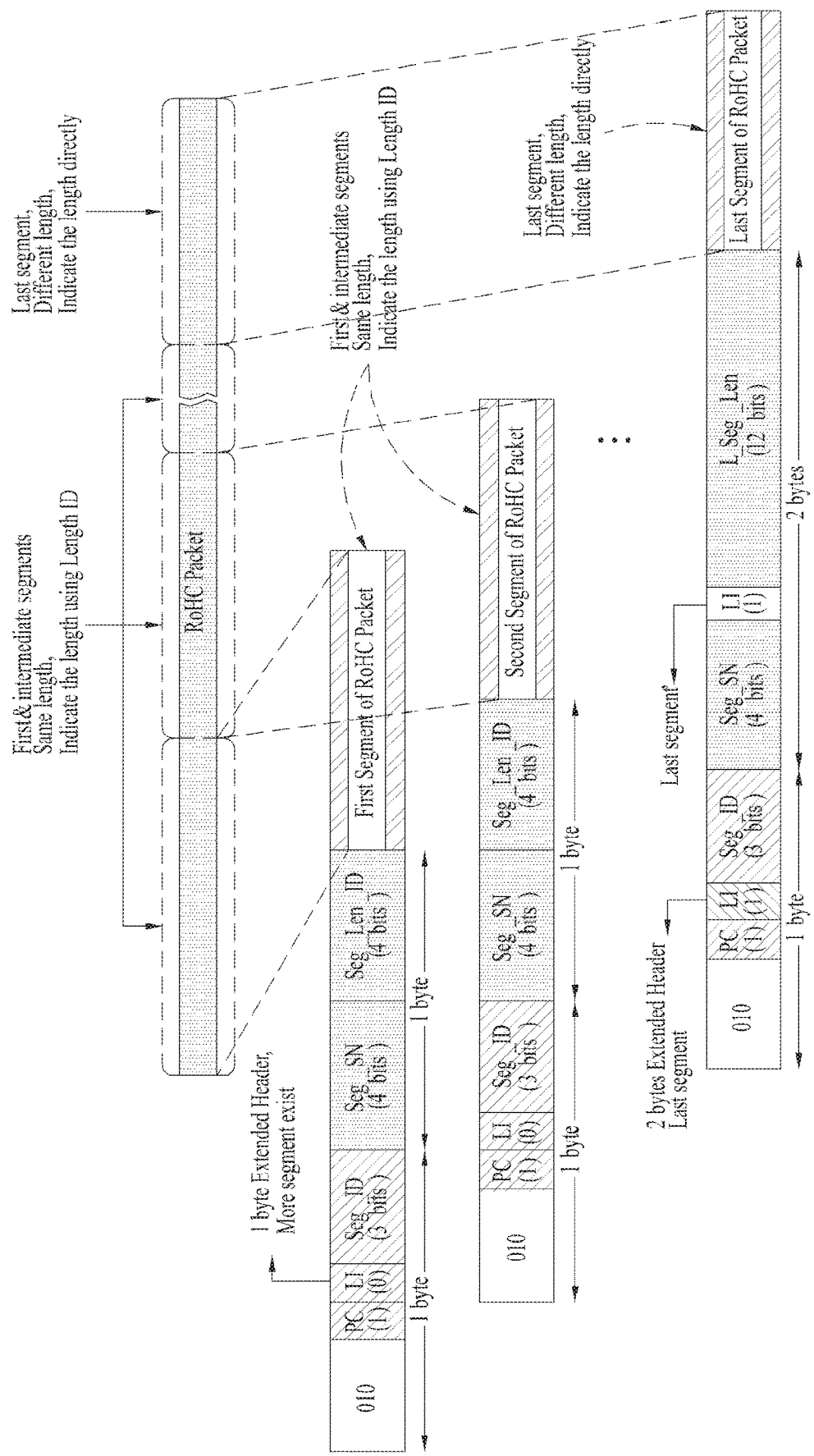
FIG. 43 illustrates a method for transmitting an RoHC packet through a link layer packet according to embodiment #4 of the present invention.

FIG. 43 illustrates a method for transmitting an RoHC packet through a link layer packet according to embodiment #4 of the present invention.

The present embodiment corresponds to a case in which an input RoHC packet exceeds the processing range of the physical layer and thus the RoHC packet is segmented and the segments of the RoHC packet are respectively encapsulated into link layer packet payloads.

To indicate that the link layer packet payloads are composed of segmented RoHC packets, the PC field can be $I_B$. The LI field becomes $I_B$ only in a link layer packet having the last segment of the RoHC packet as a payload and becomes OB for the remaining segments. The LI field also indicates information about the extended header of the corresponding link layer packet. That is, a 1-byte extended header can be added when the LI field is OB and a 2-byte extended header can be added when the LI field is $I_B$.

The link layer packets need to have the same Seg_ID value in order to indicate that the segments have been derived from the same RoHC packet. To indicate the order of segments for normal RoHC packet reconfiguration in the receiver, a sequentially increasing Seg_SN value can be included in corresponding headers.

When the RoHC packet is segmented, a segment length can be determined, as described above, and segmentation can be performed. A Seg_Len_ID value corresponding to the segment length can be included in the corresponding headers. The length of the last segment can be directly included in a 12-bit L_Seg_Len field, as described above.

Length information indicated using the Seg_Len_ID and L_Seg_Len fields represents only information about a segment, that is, a payload of a link layer packet. Accordingly, the total length of the link layer packet can be calculated by adding the header length of the link layer packet, which can be detected from the LI field, to the length of the link layer packet payload.

When the receiver reconfigures the segments of the RoHC packet, it is necessary to check integrity of the reconfigured RoHC packet. To this end, a CRC can be added to the end of the RoHC packet in a segmentation process. Since the CRC is generally added to the end of the RoHC packet, the CRC can be included in the segment after segmentation.

Figure 44:
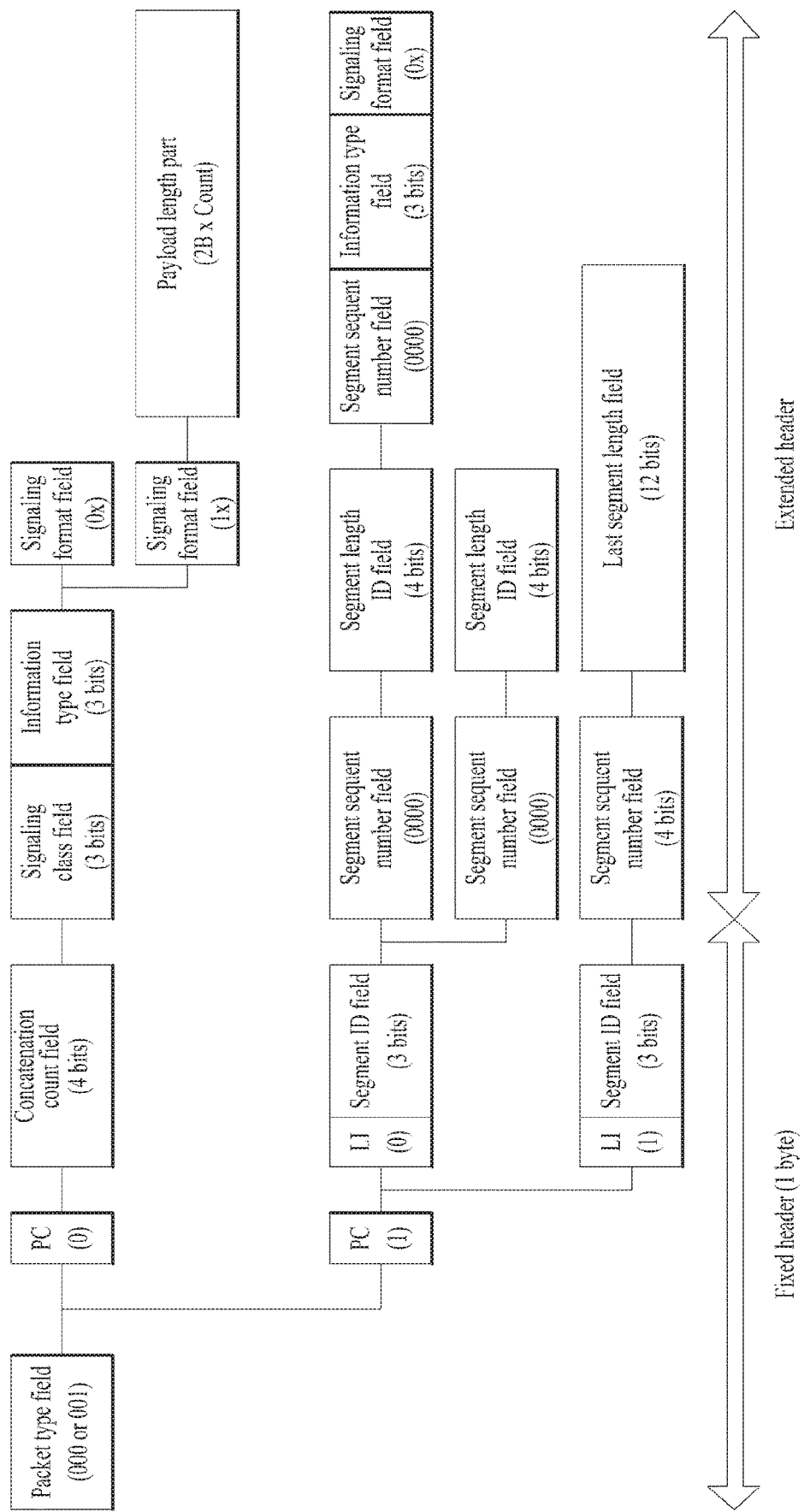
FIG. 44 illustrates a structure of a link layer packet when signaling information is transmitted to the link layer according to another embodiment of the present invention.

FIG. 44 illustrates a link layer packet structure when signaling information is delivered to the link layer according to another embodiment of the present invention.

In this case, the header of the link layer packet can include a fixed header and an extended header. The fixed header can have a length of 1 byte and the extended header can have a fixed length or a variable length. The length of each header can be changed according to design.

The fixed header can include a packet type field, a PC field and/or a concatenation count field. According to another embodiment, the fixed header may include the packet type field, the PC field, an LI field and/or a segment ID field.

The extended header can include a signaling class field, an information type field and/or a signaling format field. According to another embodiment, the extended header may further include a payload length part. According to another embodiment, the extended header may include a segment sequence number field, a segment length ID field, the signaling class field, the information type field and/or the signaling format field. According to another embodiment, the extended header may include the segment sequence number field and/or the segment length ID field. According to another embodiment, the extended header may include the segment sequence number field and/or a last segment length field.

The fields of the fixed header will now be described.

The packet type field can indicate the type of a packet input to the link layer, as described above. When signaling information is input to the link layer, the packet type field can be 110B.

The PC field, the LI field, the segment ID field, the segment sequence number field, the segment length ID field and the last segment field are as described above. The concatenation count field is as described above.

Description will be given of the fields of the extended header.

When the PC field is 0, the extended header can include the signaling class field, the information type field and/or the signaling format field. The extended header may further include a length part according to the value of the signaling format field.

The signaling class field can indicate the type of signaling information included in the link layer packet. Signaling information that can be indicated by the signaling class field can include fast information channel (FIC) information, header compression information and the like. The signaling information that can be indicated by the signaling class field will be described later.

The information type field can indicate details of signaling information of the type indicated by the signaling class field. Indication of the information type field can be separately defined according to the value of the signaling class field.

The signaling format field can indicate a format of signaling information included in the link layer packet. Formats that can be indicated by the signaling format field may include a section table, a descriptor, XML and the like. The formats that can be indicated by the signaling format field will be described later.

A payload length part can indicate the length of signaling information included in the payload of the link layer packet payload. The payload length part may be a set of length fields respectively indicating lengths of concatenated signaling information. While each length field may have a size of 2 bytes, the size can be changed according to system configuration. The total length of the payload length part can be represented by the sum of the respective length fields. A padding bit for byte arrangement can be added to the payload length part according to an embodiment. In this case, the total length of the payload length part can increase by the padding bit.

Presence or absence of the payload length part can be determined by the signaling format field value. When signaling information has a length value thereof, such as the section table and descriptor, an additional length field may not be needed. However, signaling information having no length value may require an additional length field. In the case of signaling information having no length value, the payload length part can be present. In this case, the payload length part can include as many length fields as the number of count fields.

When the PC field is 1 and the LI field is 1, the extended header can include the segment sequence number field and/or the last segment length field. When the PC field is 1 and the LI field is 0, the extended header can include the segment sequence number field and/or the segment length ID field.

The segment sequence number field, the last segment length field and the segment length ID field are as described above.

When the PC field is 1, the LI field is 1 and the payload of the corresponding link layer packet corresponds to the first segment, the extended header of the link layer packet can further include additional information. The additional information can include the signaling class field, the information type field and/or the signaling format field. The signaling class field, the information type field and the signaling format field are as described above.

FIG. 45 illustrates a syntax of a link layer packet structure when signaling information is delivered to the link layer according to another embodiment of the present invention.

The link layer packet header can include the Packet_Type field and the PC field Payload_Config, as described above.

When the PC field is 0, the PC field can be followed by a Count field, a Signaling_Class field, an Information_Type field and a Signaling_Format field. When the Signaling_Format field is 1× (10 or 11), a plurality of length fields can be included in the link layer packet header on the basis of a value indicated by the count field.

When the PC field is 1, the PC field can be followed by a Last_Segment_Indicator field, a Segment_ID field and a Segment_Sequence_Number field. Here, a configuration of a part following the Last_Segment_Indicator field can be changed according to the value of the Last_Segment_Indicator field.

When the Last_Segment_Indicator field is 0, the Segment_Sequence_Number field can be followed by the Segment_Length_ID field. When the Segment_Sequence_Number field is 0000, the Segment_Sequence_Number field can be followed by the Signaling_Class field, the Information Type field and the Signaling_Format field.

When the Last_Segment_Indicator field is 1, the Segment_Sequence_Number field can be followed by the Last_Segment_Length field.

Figure 46:
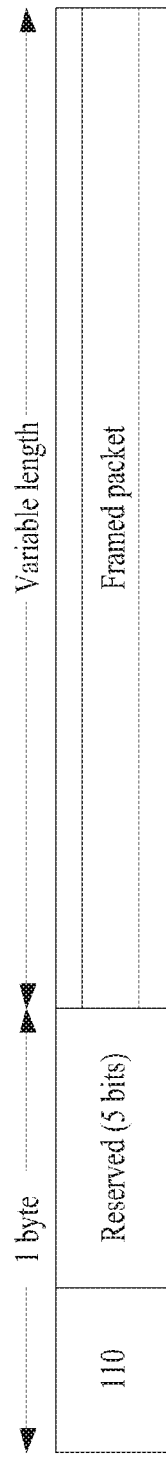
FIG. 46 illustrates a structure of a link layer packet for framed packet transmission according to an embodiment of the present invention.

FIG. 46 illustrates a structure of a link layer packet for framed packet transmission according to an embodiment of the present invention.

Packets used in normal networks, other than the IP packet and MPEG-2 TS packet, can be transmitted through a link layer packet. In this case, the packet type element of the header of the link layer packet can have a value of 111B to indicate that the payload of the link layer packet includes a framed packet.

FIG. 47 illustrates a syntax of a structure of a link layer packet for framed packet transmission according to an embodiment of the present invention.

The link layer packet header can include the Packet_Type field, as described above. The link layer packet header can include 5 bits reserved for future use after the Packet_Type field. A framed packet indicated by framed_packet( ) can follow the reserved bits.

FIG. 48 illustrates a syntax of a framed packet according to an embodiment of the present invention.

The syntax of the framed packet can include an Ethernet_type field, a length field, and/or a packet( ) field. The Ethernet_type field, which is 16 bits, can indicate the type of a packet in the packet( ) field according to IANA registry. Here, only registered values can be used. The length field, which is 16 bits, can set the total length of the packet structure in bytes. The packet( ) field having a variable length can include a network packet.

FIG. 49 illustrates a syntax of a fast information channel (FIC) according to an embodiment of the present invention.

Information included in the FIC can be transmitted in the form of a fast information table (FIT).

Information included in the FIT can be transmitted in the form of XML and/or a section table.

The FIC can include FIT_data_version information, num_broadcast information, broadcast_id information, delivery- _system_id information, base_DP_id information, base_DP_version information, num_service information, service_id information, service_category information, service_hidden_flag information, SP_indicator information, num_component information, component_id information, DP_id information and/or RoHC_init descriptor information.

The FIT_data_version information can indicate version information about a syntax and semantics included in the fast information table. The receiver can determine whether to process signaling included in the fast information table using the FIT_data_version information. The receiver can determine whether to update prestored information of the FIC using the FIT_data_version information.

The num_broadcast information can indicate the number of broadcasting stations which transmit broadcast services and/or content through corresponding frequencies or transmitted transport frames.

The broadcast_id information can indicate identifies of broadcasting stations which transmit broadcast services and/or content through corresponding frequencies or transmitted transport frames. A broadcasting station transmitting MPEG-2 TS based data may have a broadcast_id identical to a transport_stream_id of an MPEG-2 TS.

The delivery_system_id information can indicate an identifier of a broadcast transmission system which performs processing using the same transmission parameter on a broadcast network.

The base_DP_id information indicates a base DP in a broadcast signal. The base DP can refer to a DP conveying service signaling including program specific information (PSI)/system information (SI) and/or overhead reduction of a broadcasting station corresponding to the broadcast_id. Otherwise, the base DP can refer to a representative DP which can be used to decode components constituting broadcast services in the corresponding broadcasting station.

The base_DP_version information can indicate version information about data transmitted through the base DP. For example, when service signaling such as PSI/IS through the base DP, the value of the base_DP_version information can increase by 1 if service signaling changes.

The num_service information can indicate the number of broadcast services transmitted by the broadcasting station corresponding to the broadcast_id in the corresponding frequency or transport frame.

The service_id information can be used as an identifier of a broadcast service.

The service_category information can indicate a broadcast service category. A service_category information value of 0x01 can indicate Basic TV, a service category information value of 0x02 can indicate Basic Radio, a service_category information value of 0x03 can indicate RI service, a service_category information value of 0x08 can indicate Service Guide, and a service_category information value of 0x09 can indicate Emergency Alerting.

The service_hidden_flag information can indicate whether the corresponding broadcast service is hidden. When the broadcast service is hidden, the broadcast service is a test service or a service autonomously used in the corresponding system and thus a broadcast receiver can ignore the service or hide the same in a service list.

The SP_indicator information can indicate whether service protection is applied to one or more components in the corresponding broadcast service.

The num_component information can indicate the number of components constituting the corresponding broadcast service.

The component_id information can be used as an identifier for identifying the corresponding component in the broadcast service.

The DP_id information can be used as an identifier indicating a DP through which the corresponding component is transmitted.

The RoHC_init_descriptor can include information related to overhead reduction and/or header recovery. The RoHC_init_descriptor can include information for identifying a header compression method used at a transmitting end.

Figure 50:
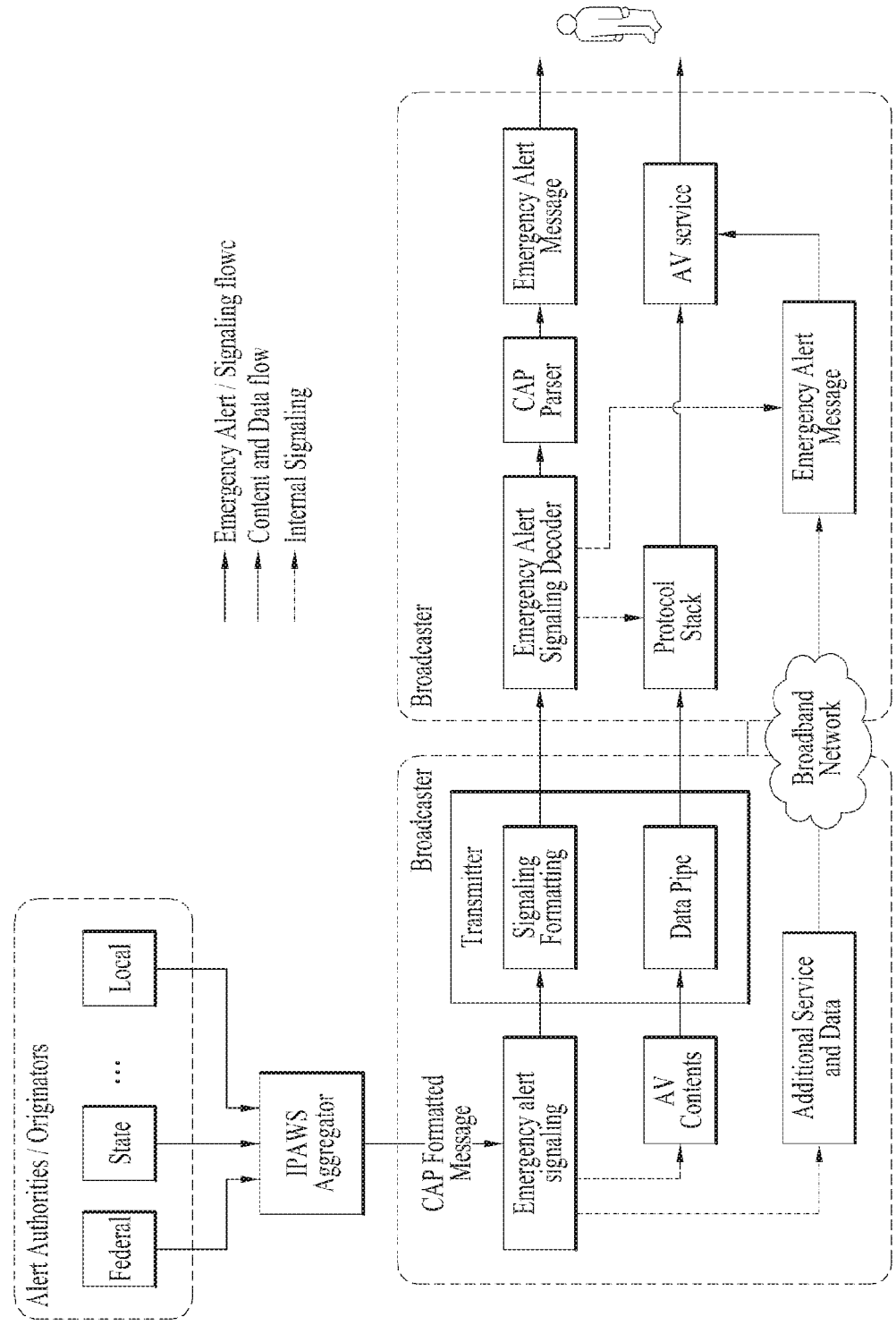
FIG. 50 illustrates a broadcast system which issues an emergency alert according to an embodiment of the present invention.

FIG. 50 illustrates a broadcast system issuing an emergency alert according to an embodiment of the present invention.

Upon reception of information related to an emergency alert from an alert authority/originator, a broadcasting station (transmitter) converts the information related to the emergency alert into emergency alert signaling in a format adapted to a broadcast system or generates emergency alert signaling including the information related to the emergency alert. In this case, the emergency alert signaling may include a common alerting protocol (CAP) message. The broadcasting station can transmit the emergency alert signaling to a receiver. Here, the broadcasting station can transmit the emergency alert signaling through a path through which normal broadcast data is delivered. Otherwise, the broadcasting station may transmit the emergency alert signaling through a path different from the path through which normal broadcast data is delivered. The emergency alert signaling may be generated in the form of an emergency alert table (EAT) which will be described later.

The receiver receives the emergency alert signaling. An emergency alert signaling decoder can parse the emergency alert signaling to obtain the CAP message. The receiver generates an emergency alert message using information of the CAP message and displays the emergency alert message.

FIG. 51 illustrates a syntax of an emergency alert table (EAT) according to an embodiment of the present invention.

Information related to an emergency alert can be transmitted through an EAC. The EAC corresponds to the aforementioned dedicated channel.

The EAT according to an embodiment of the present invention may include EAT_protocol_version information, automatic_tuning_flag information, num_EAS_messages information, EAS_message_id information, EAS_IP_version_flag information, EAS_message_transfer type information, EAS_message_encoding_type information, EAS_NRT_flag information. EAS_message_length information. EAS_message_byte information, IP_address information, UDP_port_num information, DP_id information, automatic_tuning_channel_number information, automatic_tuning_DP_id information, automatic_tuning_service_id information and/or EAS_NRT_service_id information.

The EAT_protocol_version information indicates a protocol version corresponding to the received EAT.

The automatic_tuning_flag information indicates whether the receiver automatically performs channel tuning.

The num_EAS_messages information indicates the number of messages included in the EAT.

The EAS_message_id information identifies each EAS message.

The EAS_IP_version_flag information indicates IPv4 when the EAS_IP_version_flag information has a value of 0 and indicates IPv6 when the EAS_IP_version_flag information has a value of 1.

The EAS_message_transfer_type information indicates an EAS message transfer type.

The EAS_message_transfer_type information indicates "not specified" when the EAS_message_transfer_type information is 000, indicates "no alert message (only AV content)" when the EAS_message_transfer_type information is 001 and indicates that the corresponding EAT includes an EAS message when the AS_message_transfer_type information is 010. To this end, a length field and a field with respect to the corresponding EAS message are added. When the EAS_message_transfer_type information is 011, this information indicates that the corresponding EAS message is transmitted through a data pipe. The EAS can be transmitted in the form of an IP datagram within the data pipe. To this end. IP address information. UDP port information and DP information of a physical layer to which the EAS message is transmitted may be added.

The EAS_message_encoding_type information indicates information about encoding type of an emergency alert message. For example, an EAS_message_encoding_type information value of 000 can indicate "not specified", an EAS_message_encoding_type information value of 001 can indicate "no encoding", an EAS_message_encoding_type information value of 010 can indicate DEFLATE algorithm (RFC1951) and EAS_message_encoding_type information values of 011 to 111 can be reserved for other encoding types.

The EAS_NRT_flag information indicates presence or absence of NRT content and/or NRT data related to a received message. An EAS_NRT_flag information value of 0 indicates absence of NRT content and/or NRT data related to a received emergency message, whereas and an EAS_NRT_flag information value of 1 indicates presence of NRT content and/or NRT data related to the received emergency message.

The EAS_message_length information indicates the length of an EAS message.

The EAS_message_byte information includes content of the EAS message.

The IP_address information indicates the IP address of an IP packet carrying the EAS message.

The UDP_port_num information indicates the number of a UDP port through which the EAS message is transmitted.

The DP_id information identifies a data pipe through which the EAS message is transmitted.

The automatic_tuning_channel_number information includes information about the number of a channel to be tuned to.

The automatic_tuning_DP_id information identifies a data pipe through which corresponding content is transmitted.

The automatic_tuning_service_id information identifies a service to which the corresponding content belongs.

The EAS_NRT_service_id information identifies an NRT service corresponding to a case in which NRT content and data related to a received emergency alert message are transmitted, that is, when the EAS_NRT_flag is enabled.

FIG. 52 illustrates a method for identifying information related to header compression, which is included in a payload of a link layer packet according to an embodiment of the present invention.

When header compression is performed on a packet delivered from the link layer to an upper layer, as described above, necessary information needs to be generated in a signaling form and transmitted to the receiver such that the receiver can recover the header of the packet. Such information can be referred to as header compression signaling information.

The header compression signaling information can be included in a payload of a link layer packet. In this case, the transmitter can embed identification information for identifying the type of the header compression signaling information, which is included in the payload of the link layer packet, in the header of the link layer packet or a transmission parameter (signaling information of the physical layer) of the physical layer and transmit the link layer packet header or the transmission parameter including the identification information to the receiver.

According to an embodiment, the identification information can indicate that initialization information is included in the payload of the link layer packet when the value thereof is 000 and indicate that a configuration parameter is included in the payload of the link layer packet when the value thereof is 001. In addition, the identification information can indicate that static chain information is included in the payload of the link layer packet when the value thereof is 010 and indicate that dynamic chain information is included in the payload of the link layer packet when the value thereof is 011.

Here, the header compression signaling information may be called context information. According to an embodiment, the static chain information or the dynamic chain information may be called context information or both the static chain information and the dynamic chain information may be called context information.

FIG. 53 illustrates initialization information according to an embodiment of the present invention.

Initialization information included in a payload of a link layer packet may include num_RoHC_channel information, max_cid information, large_cids information, num_profiles information, profile( ) element, num_IP_stream information and/or IP_address ( ) element.

The num_RoHC_channel information indicates the number of RoHC channels.

The max_cid information is used to indicate a maximum CID value to a decompressor.

The large_cid information has a Boolean value and indicates whether a short CID (0~15) or embedded CID (0~16383) is used for a CID configuration. Accordingly, bytes representing a CID are determined.

The num_profiles information indicates the number of RoHC profiles.

The profile( ) element includes information about a header compression protocol in RoHC. In RoHC, a stream can be compressed and recovered only when the compressor and the decompressor have the same profile.

The num_IP_stream information indicates the number of IP streams.

The IP_address ( ) element includes the IP address of a header-compressed IP packet.

FIG. 54 illustrates a configuration parameter according to an embodiment of the present invention.

A configuration parameter included in a link layer packet payload may include RoHC_channel_id information, num_context information, context_id information, context_profile information, packet_configuration_mode information and/or context_transmission_mode information.

The RoHC_channel_id information identifies an RoHC channel.

The num_context information indicates the number of RoHC contexts.

The context_id information identifies an RoHC context. The context_id information can indicate a context to which the following RoHC related field corresponds. The context_id information can correspond to a context identifier (CID).

The context_profile information includes information about a header compression protocol in RoHC. In RoHC, a stream can be compressed and recovered only when the compressor and the decompressor have the same profile.

The packet_configuration_mode information identifies a packet configuration mode. Packet configuration modes have been described above.

The context_transmission_mode information identifies a context transmission mode.

Context transmission modes have been described above. A context can be transmitted through a path through which normal broadcast data is delivered or a path allocated for signaling information transmission.

FIG. 55 illustrates static chain information according to an embodiment of the present invention.

Static chain information included in a link layer packet payload may include context_id information, context_profile information, static_chain_length information, static_chain ( ) element, dynamic_chain_incl information, dynamic_chain_length information and/or a dynamic_chain ( ) element.

The context_id information identifies an RoHC context. The context_id information can indicate a context to which the following RoHC related field corresponds. The context_id information can correspond to a context identifier (CID).

The context_profile information includes information about a header compression protocol in RoHC. In RoHC, a stream can be compressed and recovered only when the compressor and the decompressor have the same profile.

The static_chain_length information indicates the length of the static_chain ( ) element.

The static_chain ( ) element includes information belonging to a static chain extracted from an upper layer packet during RoHC header compression.

The dynamic_chain_incl information indicates whether dynamic chain information is included.

The dynamic_chain_length information indicates the length of the dynamic chain ( ) element.

The dynamic_chain ( ) element includes information belonging to a dynamic chain extracted from the upper layer packet during RoHC header compression.

FIG. 56 illustrates dynamic chain information according to an embodiment of the present invention.

Dynamic chain information included in a link layer packet payload may include context_id information, context_profile information, dynamic_chain_length information and/or a dynamic_chain ( ) element.

The context_id information identifies an RoHC context. The context_id information can indicate a context to which the following RoHC related field corresponds. The context_id information can correspond to a context identifier (CID).

The context_profile information includes information about a header compression protocol in RoHC. In RoHC, a stream can be compressed and recovered only when the compressor and the decompressor have the same profile.

The dynamic_chain_length information indicates the length of the dynamic_chain ( ) element.

The dynamic_chain ( ) element includes information belonging to a dynamic chain extracted from an upper layer packet during RoHC header compression.

Figure 57:
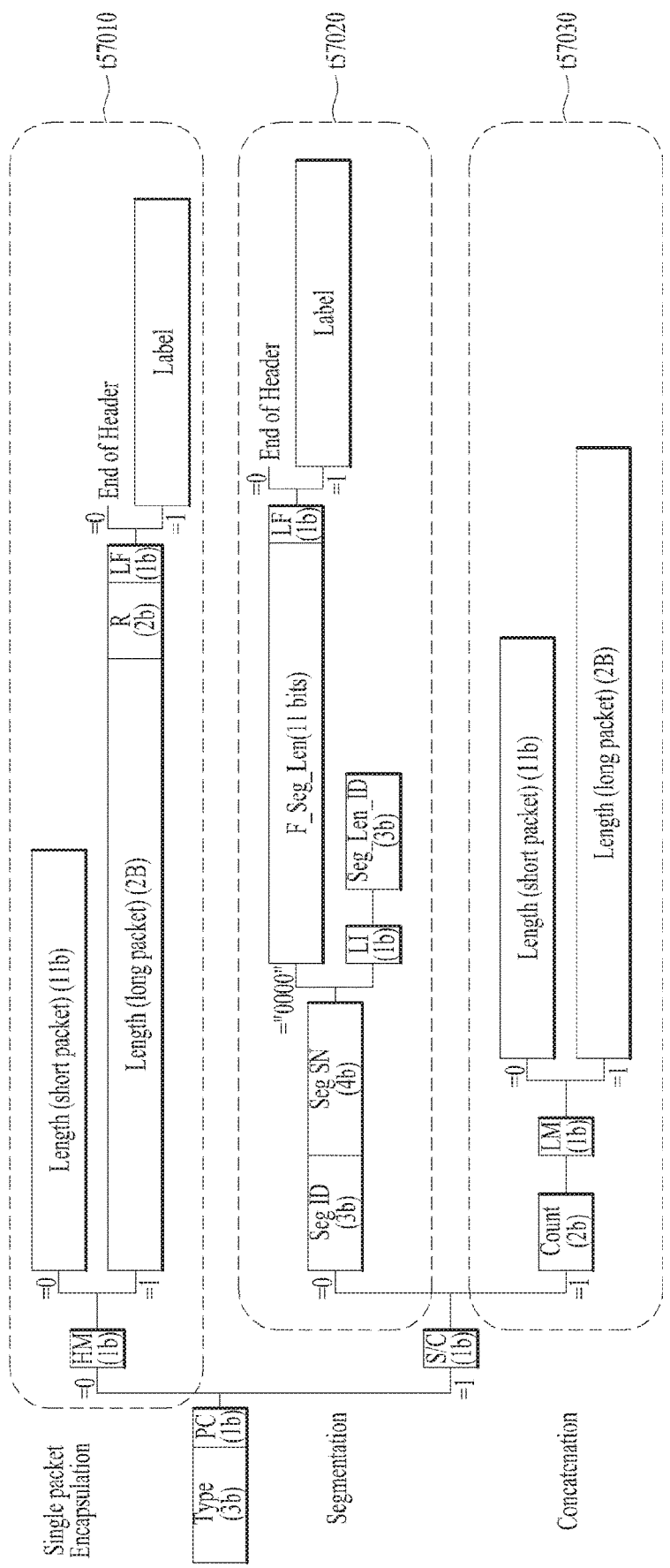
FIG. 57 illustrates a structure of a header of a link layer packet according to another embodiment of the present invention.

FIG. 57 illustrates header structures of a link layer packet according to other embodiments of the present invention.

Firstly, embodiment t57010 in which a single whole input packet is included and encapsulated in a link layer packet is described. This can be called single packet encapsulation, as described above.

In this case (t57010), the header of the link layer packet can start with the aforementioned Packet_Type field followed by the PC field. Here, the Packet_Type field can indicate the type of the input packet included in the link layer packet, as described above. The PC field can indicate a payload configuration of the link layer packet, as described above. The PC field can indicate whether a single whole packet is included in the payload or packets are concatenated and included in the payload or a packet is segmented and included in the payload according to the value thereof. In one embodiment, a PC field value of 0 indicates that a single whole input packet is included in the payload of the link layer packet. A PC field value of 1 indicates that segmented or concatenated input packets are included in the payload of the link layer packet.

The PC field can be followed by an HM field. The HM field can indicate a header mode of the link layer packet, as described above. That is, the HM field can indicate whether the single input packet included in the link layer packet is a short packet or a long packet, as described above. Accordingly, the header structure following the HM field can be changed.

When the input packet is a short packet, that is, when the HM field has a value of 0, an 11-bit length field can be present. This length field can indicate the length of the payload of the link layer packet.

When the input packet is a long packet, that is, when the HM field has a value of 1, the 11-bit length field can be followed by a 5-bit additional length field. The 2-byte length field can indicate the length of the link layer payload. Here, the length field can be divided into a base header corresponding to the 11-bit length field and an additional header corresponding to the remaining 5-bit length field. The two length fields can be followed by a 2-bit reserved field and an LF field. The reserved field corresponds to bits reserved for future use. The LF field is a flag indicating whether a label field follows the LF field. The label field is a kind of sub stream label and can be used to filter a specific upper layer packet stream at a link layer level, like a sub stream ID. An upper layer packet stream and sub stream label information can be mapped according to mapping information. The LF field can correspond to the aforementioned SIF field. The label field can correspond to the aforementioned SID field. Here, the label field may be called an optional header. The label field may have a size of 3 bytes according to an embodiment.

Secondly, an embodiment t57020 in which one segment of an input packet is included and encapsulated in the link layer packet is described. Here, the segment may be generated by segmenting one input packet. This case can be referred to as segmentation as described above.

The link layer header can start with the Packet_Type field and the PC field. The PC field can be followed by an S/C field. The S/C field can indicate whether the link layer payload includes concatenated input packets or segments of a packet, as described above. The link layer header structure can be changed according to whether the link layer payload includes concatenated input packets or segments of a packet.

When the S/C field is 0, that is, when the link layer payload includes segments of a packet, the S/C field can be sequentially followed by a segment ID field and a segment sequence number field. When the link layer packet includes segments other than the first segment, an LI field and/or the segment length ID field can be sequentially located. When the link layer packet includes the first segment, a first segment length field and/or an LF field can be located. That is, the link layer header including the first segment may not include the LI field. Here, the first segment length field can directly indicate the length of the first segment included in the link layer packet. The LF field may or may not be followed by the label field according to the value thereof, as described above. Other fields are as described above.

Thirdly, an embodiment t57030 in which multiple input packets are concatenated and encapsulated in the link layer packet is described. This case can be called concatenation.

The link layer header can start with the Packet_Type field and the PC field. The PC field can be followed by the S/C field as in the segmentation case. The S/C field can be followed by the aforementioned count field and a length mode (LM) field. The count field may be a 2-bit field and indicate that 2, 3, 4 and 5 input packets are concatenated when having values of 00, 01, 10 and 11, respectively. Otherwise, a 3-bit count field may be used, as described above.

The LM field can indicate whether short input packets are concatenated and encapsulated or long input packets are concatenated and encapsulated. When short input packets are concatenated, the LM field has a value of 0 and as many 11-bit length fields as the number of input packets may follow the LM field. When long input packets are concatenated, the LM field has a value of 1 and as many 2-byte length fields as the number of input packets may follow the LM field. Here, an input packet shorter than 2048 bytes can be classified as a short input packet and an input packet equal to or longer than 2048 bytes can be classified as a long input packet.

Short input packets and long input packets may be mixed and concatenated according to an embodiment. In this case, 11-bit length fields for the short input fields and 2-byte length fields for the long input packets can be mixed and located. These length fields can be positioned in the header in the same order as the input packets corresponding thereto.

Some fields may be omitted from the aforementioned link layer packet header structure according to an embodiment. In addition, some fields may be changed or added and the order thereof may be changed.

FIG. 58 illustrates a syntax of the link layer packet header structure according to another embodiment of the present invention.

The syntax indicates the aforementioned link layer packet header structure according to another embodiment of the present invention. As described above, the Packet_Type field and the PC field can be commonly positioned in the header structure.

When the PC field is 0, the header mode field is present. When the header mode field is 0, a 1-bit length field can be provided. When the header mode field is 1, a 2-byte length field, an LF field and reserved bits can be sequentially positioned. The label field may be additionally present according to the value of the LF field.

When the PC field is 1, the S/C field follows the PC field. When the S/C field is 0, the segment ID field and the segment sequence number field can follow the S/C field. When the segment sequence number field is 0000, that is, the first segment is included in the link layer packet, the first segment length field and the LF field can be positioned after the segment sequence number field. The label field may be additionally present according to the value of the LF field.

When the segment sequence number field has a value other than 0000, the LI field and the segment length ID field can follow the same.

When the S/C field is 1, the count field and the LM field can follow the S/C field. As many length fields as the number indicated by the count field can be present. An 11-bit length field can be provided for a short input packet and a 2-byte length field can be provided for a long input packet.

Padding bits can be positioned in the remaining part.

Some fields may be omitted from the aforementioned link layer packet header structure according to an embodiment. In addition, some fields may be changed or added and the order thereof may be changed.

Figure 59:
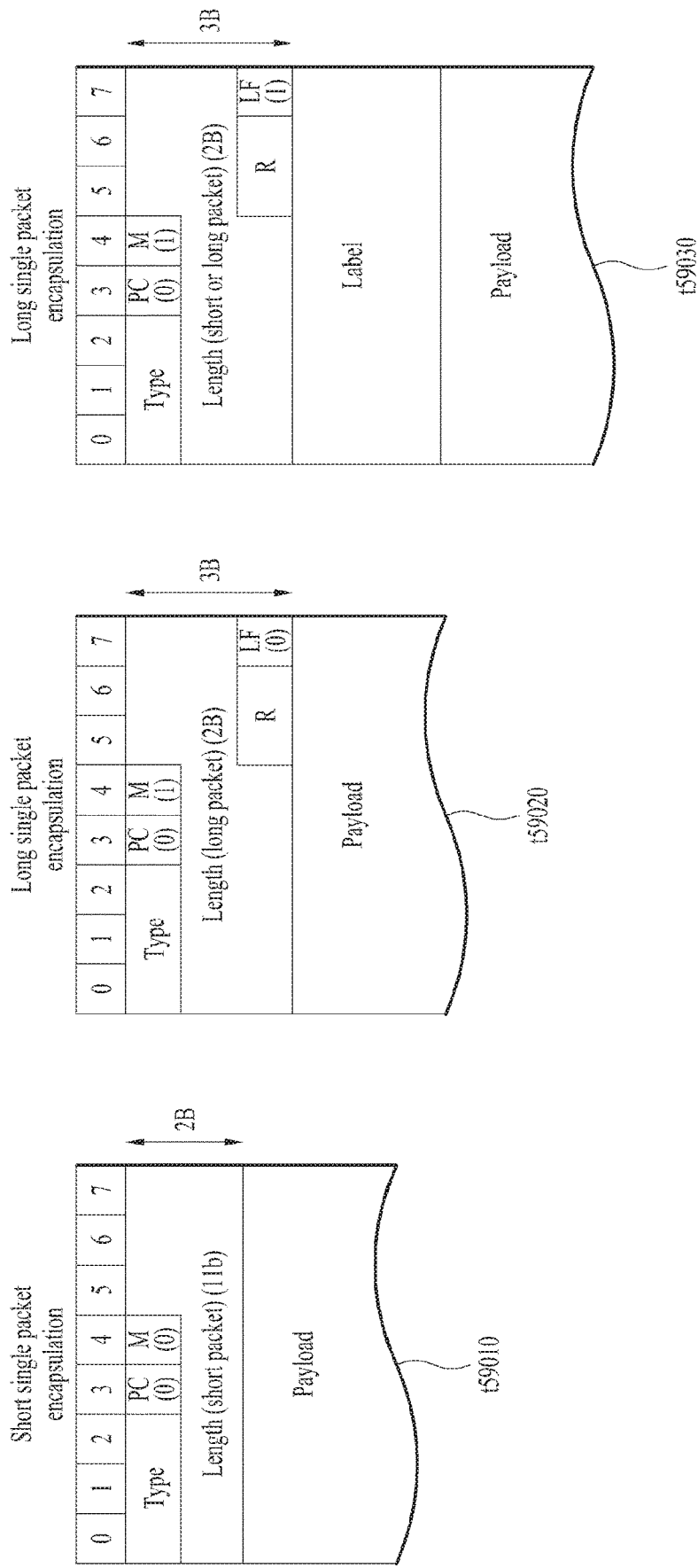
FIG. 59 illustrates a case in which one whole input packet is included in a link layer payload in a link layer packet header structure according to another embodiment of the present invention.

FIG. 59 illustrates a case in which a single whole input packet is included in a link layer payload, in the link layer packet header structure according to another embodiment of the present invention.

A first embodiment t59010 corresponds to short single packet insulation. As described above, the Packet_Type field, the PC field and the HM field, which are sequentially positioned, are followed by an 11-bit length field. The link layer packet can have a total header length of 2 bytes and the header can be followed by a link layer payload. Here, the PC field and the HM field can respectively have values of 0 and 0.

A second embodiment t59020 corresponds to long single packet encapsulation. As described above, the Packet_Type field, the PC field and the HM field, which are sequentially positioned, are followed by a 2-byte length field. The 2-byte length field may include an 11-bit length field and an additional 5-bit length field, as described above. These length fields may refer to an LSB part and an MSB part. The length field can be followed by reserved bits and the LF field. The link layer packet can have a total header length of 3 bytes and the header can be followed by a link layer payload. Here, the PC field, the HM field and the LF field can respectively have values of 0, 1 and 0.

A third embodiment t59030 corresponds to a case in which a long single packet is encapsulated and the label field is additionally included in the header structure. While the third embodiment corresponds to the aforementioned long single packet encapsulation case, the LF field is 1 and can be followed by the label field.

Figure 60:
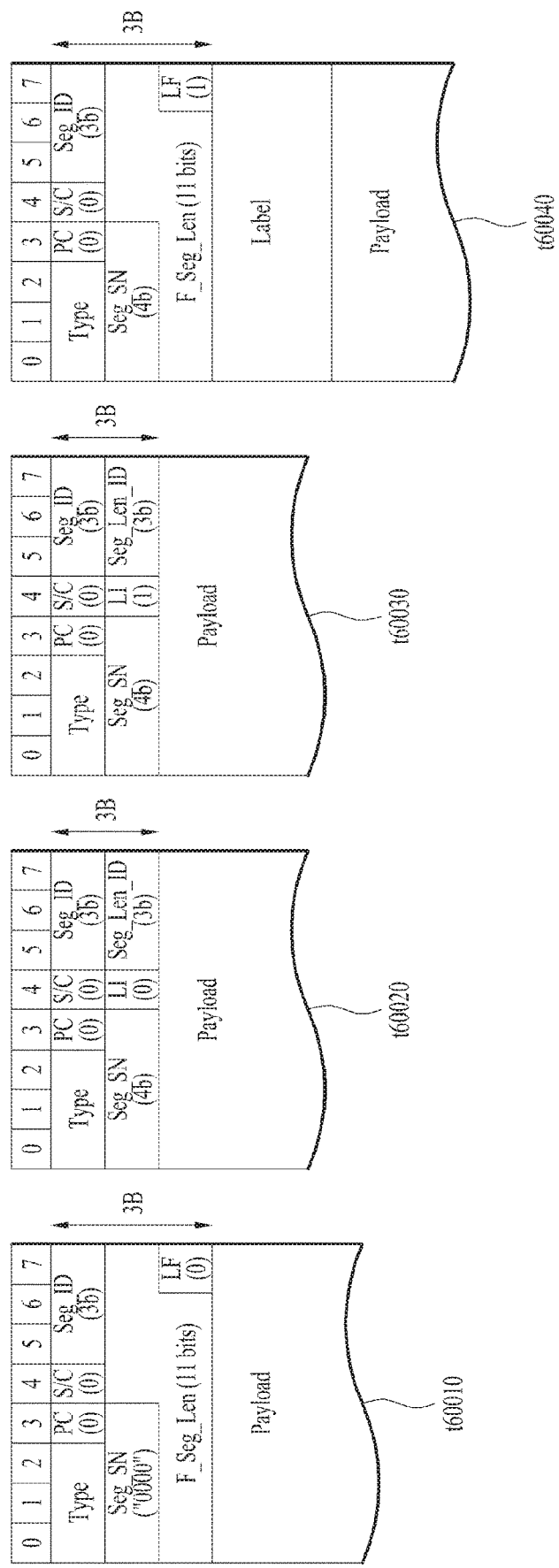
FIG. 60 illustrates a case in which one segment of an input packet is included in a link layer payload in a link layer packet header structure according to another embodiment of the present invention.

FIG. 60 illustrates a case in which one segment obtained by segmenting an input packet is included in a link layer payload in the link layer packet header structure according to another embodiment of the present invention.

A first embodiment t60010 corresponds to a link layer packet structure including the first segment from among segments of the input packet. As described above, the Packet_Type field, the PC field and the S/C field, which are sequentially positioned, are followed by the length ID field and the segment sequence number field. Here, the PC field, the S/C field and the segment sequence number field can be 0, 0 and 0000, respectively. The first segment length field can be positioned in the header structure since the first segment is included in the link layer packet. The first segment length field can directly indicate the length of the first segment, as described above. The first segment length field can be followed by the LF field.

A second embodiment t60020 corresponds to a link layer packet structure including a segment other than the first or last segment from among the segments of the input packet. As described above, the Packet_Type field, the PC field and the S/C field, which are sequentially positioned, can be followed by the length ID field and the segment sequence number field. Here, the PC field and the S/C field can be 0 and 0, respectively. The LI field is positioned in the header structure since the first segment is not included in the link layer packet, and the LI field can be 0 since the last segment is not included in the link layer packet. The segment length ID field can follow the LI field.

A third embodiment t60030 corresponds to a link layer packet structure including the last segment from among the segments of the input packet. As described above, the Packet_Type field, the PC field and the S/C field, which are sequentially positioned, can be followed by the length ID field and the segment sequence number field. Here, the PC field and the S/C field can be 0 and 0, respectively. The LI field is positioned in the header structure since the first segment is not included in the link layer packet, and the LI field can be 1 since the last segment is included in the link layer packet. The segment length ID field can follow the LI field.

A fourth embodiment t60040 corresponds to a link layer packet structure in which the first segment from among the segments of the input packet and the LF field is 1. While the fourth embodiment corresponds to the first embodiment, the label field may be added according to the value of the LF field.

FIG. 61 is a table showing a case in which one segment of an input packet is included in a link layer payload in the link layer packet header structure according to another embodiment of the present invention.

It is assumed that one input packet is segmented into 8 segments. All link layer packets including the segments have the same Packet_Type field value since the segments have been derived from one input packet. The PC field and the S/C field are 1 and 0, respectively, as described above. The link layer packets have the same segment ID field value since the segments have been derived from one input packet. The segment sequence number field can indicate the order of the segments. A 3-bit segment sequence number field may be used according to an embodiment.

A link layer packet having the first segment includes the first segment length field so as to indicate the length of the payload thereof. In this case, the LI field and the segment length ID field may not be present.

Link layer packets having segments other than the first segment can include the LI field and the segment length ID field without having the length field which directly indicates the payload length. The segment length ID field can select one of the aforementioned designated length IDs and indicate the length of the corresponding segment according to the selected value. The LI field can be 0 when the corresponding segment is not the last segment and 1 when the corresponding segment is the last segment.

Figure 62:
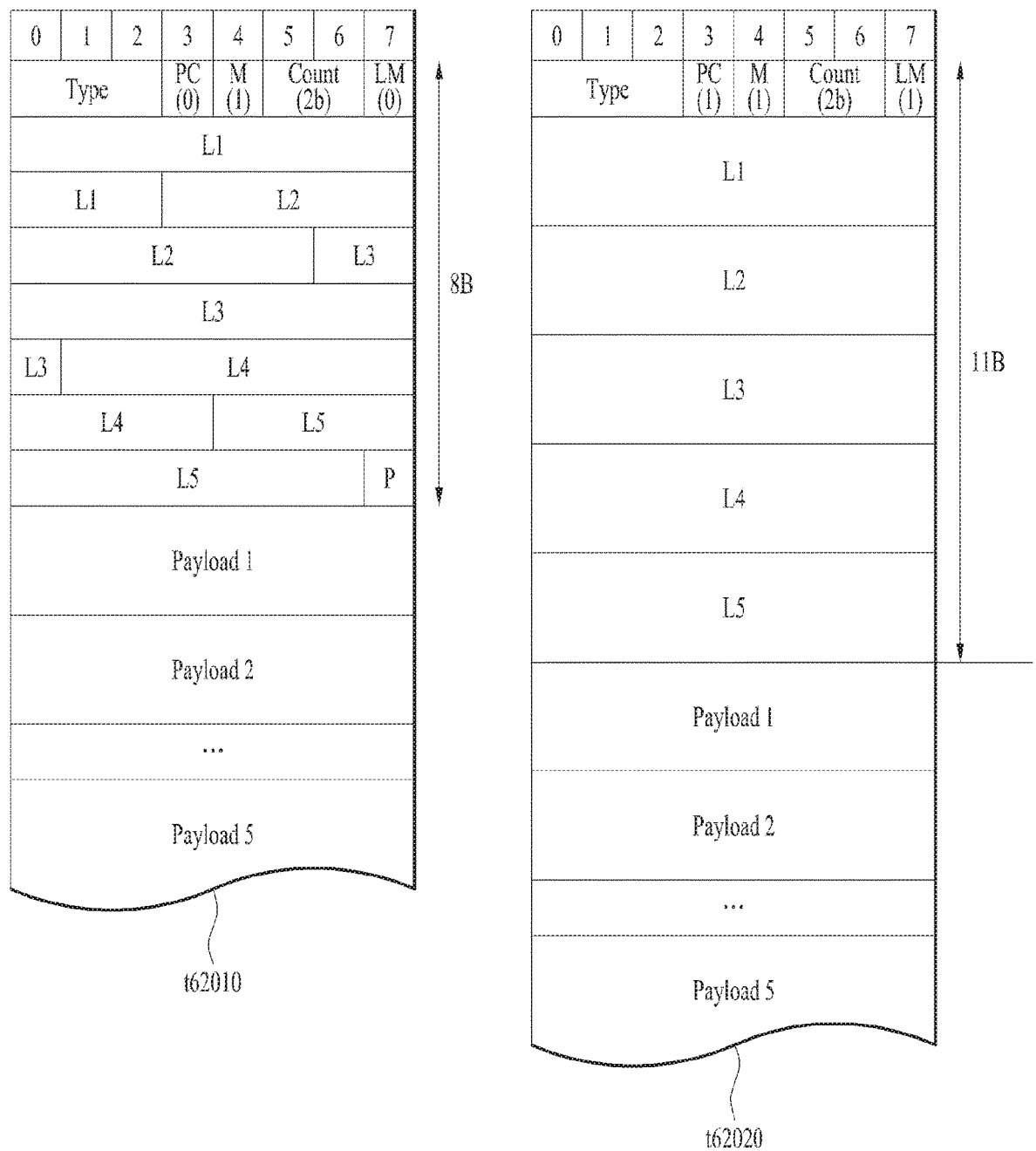
FIG. 62 illustrates a case in which multiple input packets are concatenated and included in link layer payloads in a link layer packet header structure according to another embodiment of the present invention.

FIG. 62 illustrates a case in which multiple input packets are concatenated and included in link layer payloads in the link layer packet header structure according to another embodiment of the present invention.

A first embodiment t62010 illustrates a case in which short input packets are concatenated and included in link layer payloads. The Packet_Type field, the PC field and the S/C field are sequentially positioned and followed by the count field and the LM field. The PC field, the S/C field and the LM field can be 1, 1 and 0, respectively, according to the aforementioned definition.

11-bit length fields can be sequentially positioned following the aforementioned fields. The length fields respectively indicating the lengths of the concatenated short input packets can be arranged in the same order as the input packets corresponding thereto. After the last length field, the remaining part can be filled with padding bits P corresponding to 8 bits. Subsequently, the concatenated input packets can be arranged.

A second embodiment t62020 illustrates a case in which long input packets are concatenated and included in link layer payloads. The Packet_Type field, the PC field and the S/C field are sequentially positioned and followed by the count field and the LM field. The PC field, the S/C field and the LM field can be 1, 1 and 1, respectively, according to the aforementioned definition.

2-bytes length fields can be sequentially positioned following the aforementioned fields. The length fields respectively indicating the lengths of the concatenated long input packets can be arranged in the same order as the input packets corresponding thereto. Subsequently, the concatenated input packets can be arranged.

Figure 63:
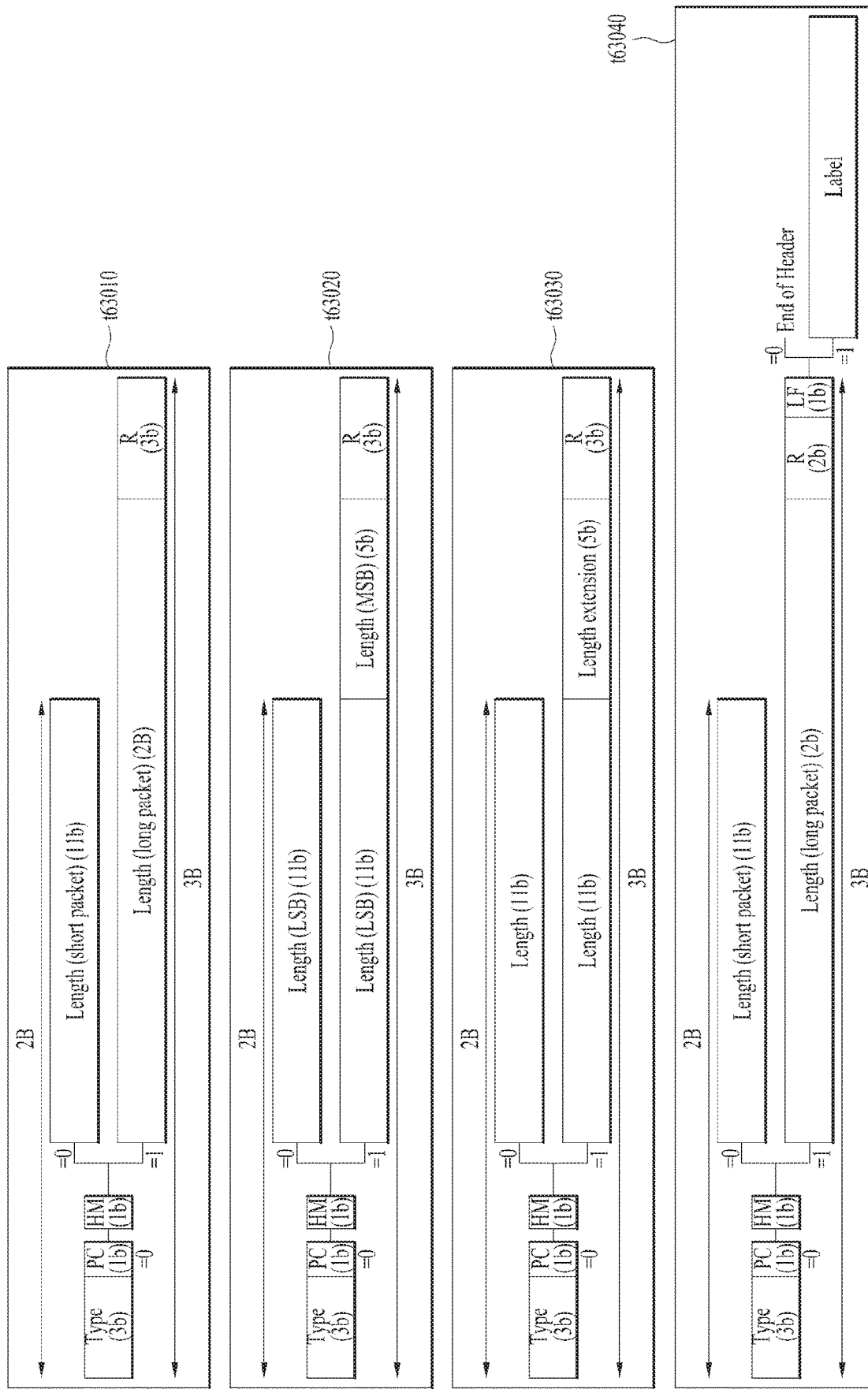
FIG. 63 illustrates a case in which one whole input packet is included in a link layer payload in a link layer packet header structure according to another embodiment of the present invention.

FIG. 63 illustrates a case in which a single whole input packet is included in a link layer payload in the link layer packet header structure according to another embodiment of the present invention.

First and second embodiments t63010 and t63020 can correspond to the aforementioned link layer packet header structure with respect to single packet encapsulation. However, a 2-byte length field is included in the header structure in the first embodiment and an 11-bit additional length field is included in the header structure in the second embodiment, for a case in which a long input packet is included in the link layer packet. In this case, the length fields can respectively refer to an LSB part and an MSB part which indicate lengths. The 2-byte length field can be followed by reserved bits. The last bit can be used as the LF field, as described above.

A third embodiment t63030 is similar to the aforementioned link layer packet header structure with respect to single packet encapsulation. The link layer packet header structure when a short input packet is included in the link layer packet payload corresponds to the aforementioned link layer packet header structure with respect to single packet encapsulation. When a long input packet is included in the link layer payload, a length extension field can replace the 5-bit additional length field.

The length extension field indicates extension of a length field. The number of bits occupied by the length extension field can be changed according to packet structure. It is assumed that the length extension field is 2 bits in the present embodiment for convenience of description. For example, when the length extension field is not used, that is, when HM=0, this indicates that a short input packet is encapsulated, and the 11-bit length field can indicate a payload length in the range of 0 to 2047 bytes. When the length extension field is used, the value of the length extension field can function as an offset in indication of the payload length. When the length extension field is 00, the 11-bit length field indicates a payload in the range of 2048 to 4095 bytes. When the length extension field is 01, 10 and 11, the 11-bit length field respectively indicates payload lengths in the ranges of 4096 to 6143 bytes, 6144 to 8191 bytes and 8192 to 10239 bytes. For example, when the 11-bit length field has a value indicating a "1-byte payload length" and the length extension field is 00, this indicates a payload length of 2049 bytes. If the 11-bit length field has a value indicating a "1-byte payload length" and the length extension field is 01, this indicates a payload length of 4097 bytes. In this manner, the payload length can be indicated even in the case of long single packet encapsulation.

A fourth embodiment t63040 corresponds to the aforementioned link layer header structure with respect to single packet encapsulation. The 2-byte length field can be replaced by the 11-bit length field and the additional 5-bit length field. In this case, the length fields can respectively refer to an LSB part and an MSB part. The label field may be added according to the value of the LF field value. The position of the label field can be changed according to embodiments.

FIG. 64 is a table showing header lengths in the link layer packet header structure according to another embodiment of the present invention.

When a short single input packet is encapsulated, the PC field and the HM field can have a value of 0. The total header length can be 2 bytes according to the 11-bit length field. In the table, x indicates that the corresponding bit can be any value. For example, the 11-bit length field is represented by 11 xs (xxxxxxxxxxx) since the 11-bit length field is determined by the payload length and thus is irrelevant to the header length.

When a long single input packet is encapsulated, the PC field and the HM field can respectively have values of 0 and 1. Subsequently, the 11-bit length field and the 5-bit additional length field are added and thus the total header length can be 3 bytes.

In a segmentation case, the PC field and the S/C field of each link layer packet can be 1 and 0, respectively. A link layer packet including the first segment can have a segment sequence number field of 0000. In the present embodiment, the LF field can be 0. In this case, the total header length can be 3 bytes. A link layer packet including a segment other than the first segment can have a 4-bit segment sequence number field followed by an LI field. In this case, the total header length can be 2 bytes.

When short input packets are concatenated, the PC field and the S/C field can be 1. The count field can indicate that n packets have been encapsulated. In this case, the LM field can be 0. The total header length can be represented by (I n/8+1) bytes since n 11-bit length fields are used and 1 byte is used for the front part of the header. However, P padding bits may need to be added for byte alignment. In this case, the header length can be represented by ((11n+P)/8+1) bytes.

When long input packets are concatenated, the PC field and the S/C field can be 1. The count field can indicate that n packets have been encapsulated. In this case, the LM field can be 1. The total header length can be represented by (2n+1) bytes since n 2-byte length fields are used and 1 byte is used for the front part of the header.

Figure 65:
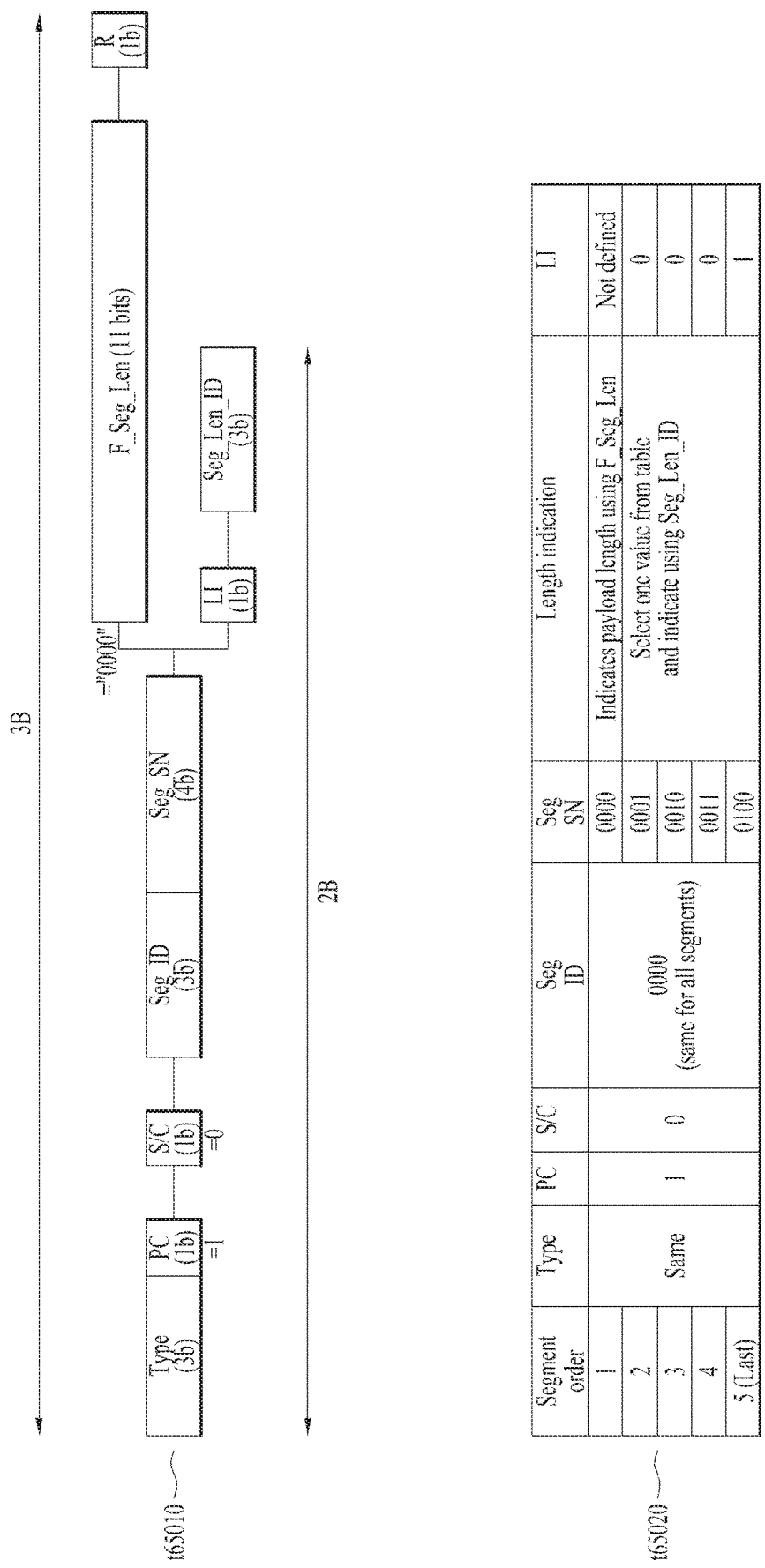
FIG. 65 illustrates a case in which one segment of an input packet is included in a link layer payload in a link layer packet header structure according to another embodiment of the present invention.

FIG. 65 illustrates a case in which one segment of an input packet is included in a link layer payload in the link layer packet header structure according to another embodiment of the present invention.

The illustrated embodiment t65010 corresponds to the aforementioned link layer packet header structure with respect to segmentation according to another embodiment of the present invention. The Packet_Type field, the PC field and the S/C field are sequentially arranged and followed by the segment ID field and the segment sequence number field. The PC field and the S/C field can be 1 and 0, respectively. When the link layer packet has the first segment, the link layer packet can include the first segment length field. 1 bit following the first segment length field may be a reserved bit or may be assigned to the LF field, as described above. When the link layer packet has a segment other than the first segment, the link layer packet can include the LI field and the segment length ID field.

In table t65020 showing the above embodiment, the Packet_Type field can have the same value, the PC field can be 1 and the S/C field can be 0, for a total of 5 segments. The segment ID field can have the same value. The segment sequence number field can indicate sequence numbers of the segments. In the case of the first segment, the first segment length field indicates the length thereof and the LI field may not be present. In the case of a segment other than the first segment, the length is indicated using the segment length ID field and the LI field can be 0 or 1 according to whether or not the segment is the last segment.

Figure 66:
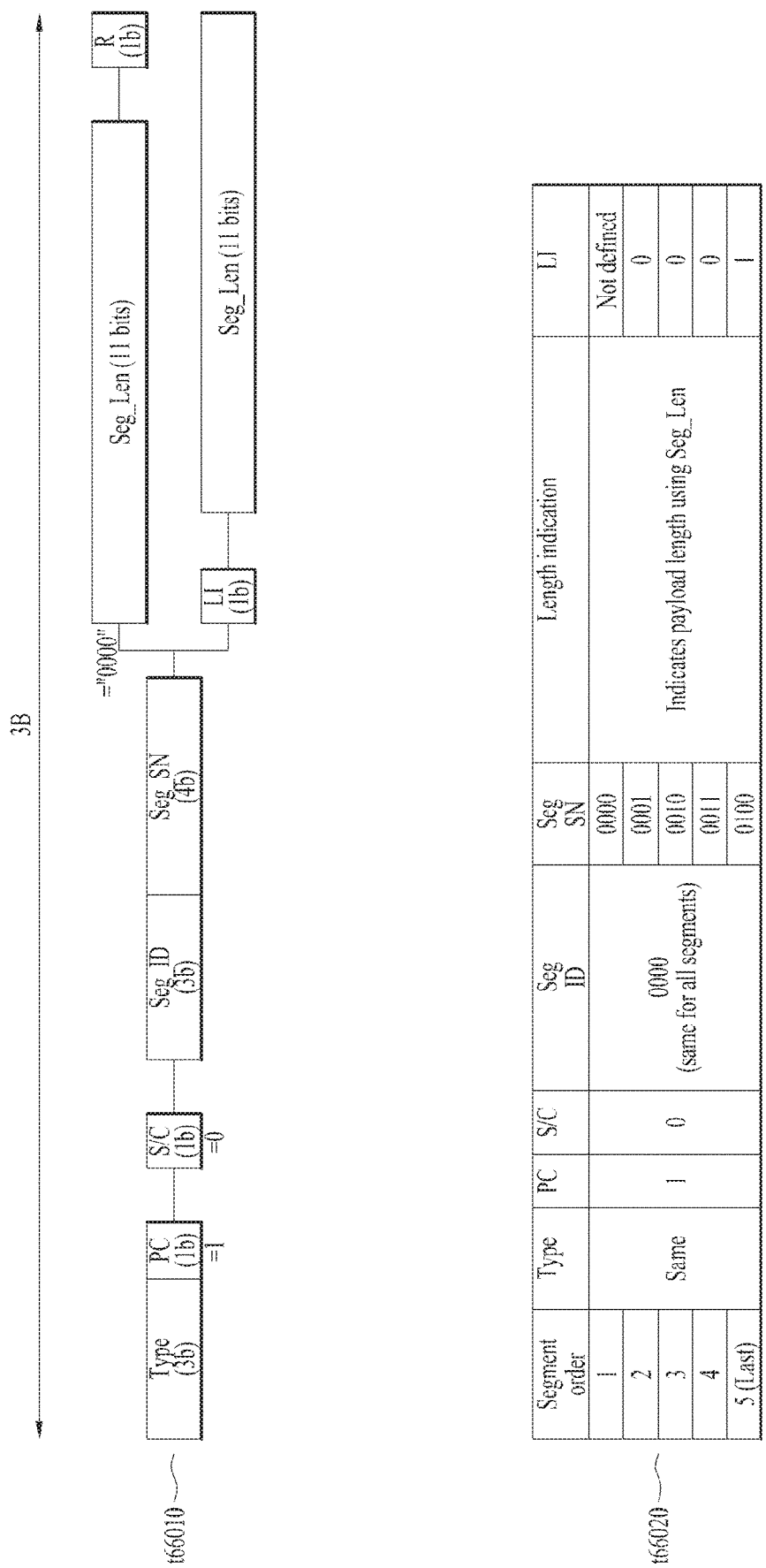
FIG. 66 illustrates a case in which one segment of an input packet is included in a link layer payload in a link layer packet header structure according to another embodiment of the present invention.

FIG. 66 illustrates a case in which one segment of an input packet is included in a link layer payload in the link layer packet header structure according to another embodiment of the present invention.

The illustrated embodiment t66010 is similar to the aforementioned link layer packet header structure with respect to segmentation according to another embodiment of the present invention. However, the header structure can be changed in the case of link layer packets having segments other than the first segment. In this case, the LI field can be followed by the segment length field instead of the segment length ID field. The segment length field can directly indicate the length of the segment included in the corresponding link layer packet. According to an embodiment, the segment length field may have a length of 11 bits. In this case, the first segment length field may be called a segment length field.

In table t66020 showing the above embodiment, the Packet_Type field can have the same value, the PC field can be 1 and the S/C field can be 0, for a total of 5 segments. The segment ID field can have the same value. The segment sequence number field can indicate sequence numbers of the segments. The length of the link layer payload can be indicated by the segment length field irrespective of whether the corresponding segment is the first segment. The LI field is not present when the corresponding link layer packet includes the first segment, whereas the LI field is present when the corresponding link layer packet includes a segment other than the first segment. The LI field can be 0 or 1 according to whether or not the corresponding segment is the last segment.

Figure 67:
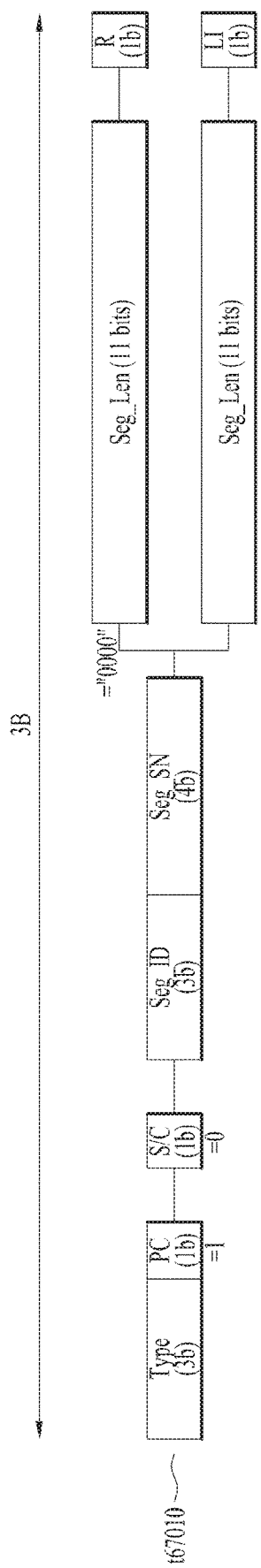
FIG. 67 illustrates a case in which one segment of an input packet is included in a link layer payload in a link layer packet header structure according to another embodiment of the present invention.

FIG. 67 illustrates a case in which one segment of an input packet is included in a link layer payload in the link layer packet header structure according to another embodiment of the present invention.

The illustrated embodiment t67010 is similar to the aforementioned link layer packet header structure with respect to segmentation according to another embodiment of the present invention. However, the header structure can be changed in the case of link layer packets having segments other than the first segment. In this case, the LI field can follow the segment length field. The segment length field is as described above, and the first segment length field may also be called a segment length field.

In table t67020 showing the above embodiment, the Packet_Type field can have the same value, the PC field can be 1 and the S/C field can be 0, for a total of 5 segments. The segment ID field can have the same value. The segment sequence number field can indicate sequence numbers of the segments. The length of the link layer payload can be indicated by the segment length field irrespective of whether the corresponding segment is the first segment. The LI field is not present when the corresponding link layer packet includes the first segment, whereas the LI field is present when the corresponding link layer packet includes a segment other than the first segment. The LI field can be 0 or 1 according to whether or not the corresponding segment is the last segment.

Figure 68:
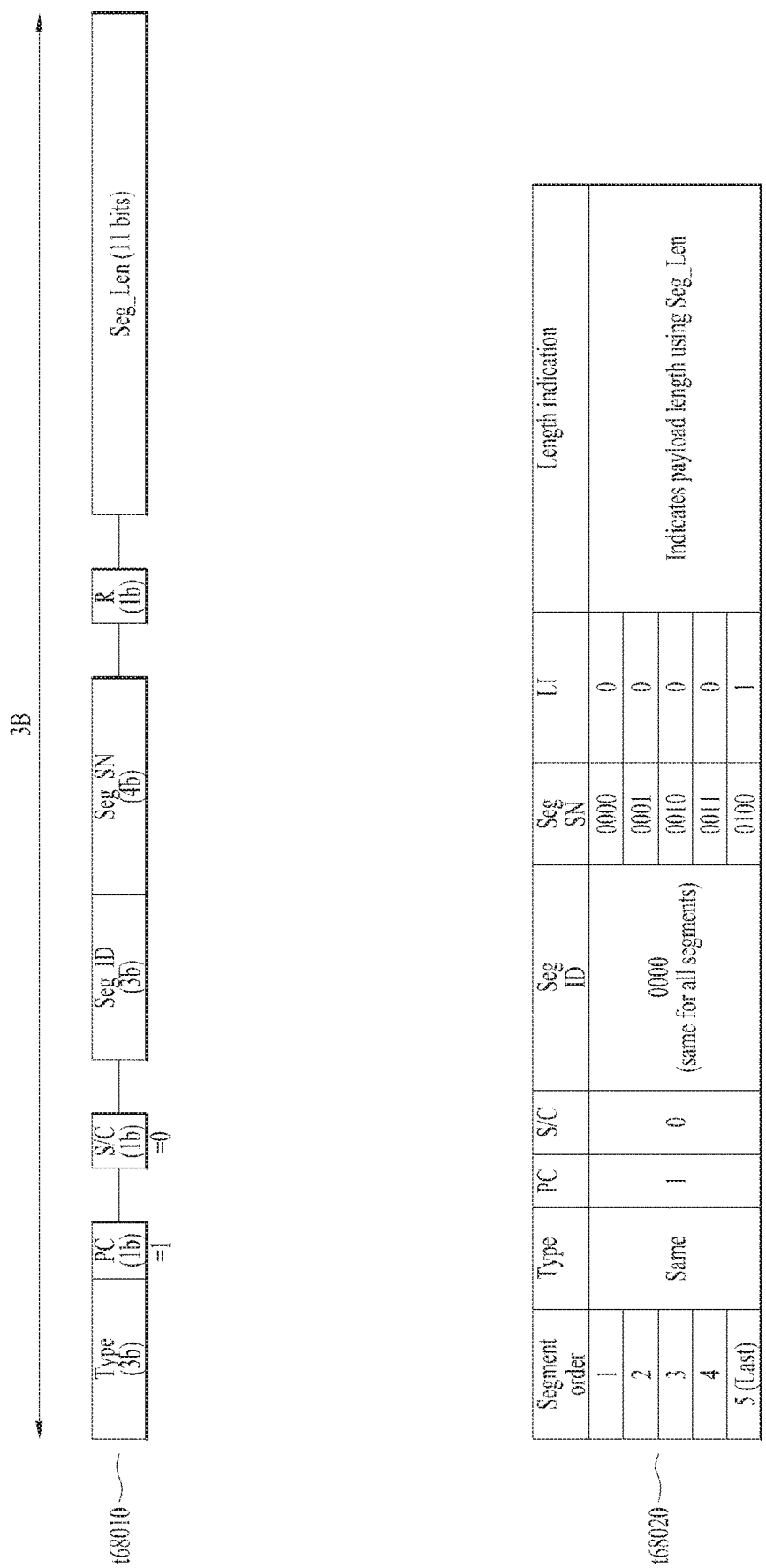
FIG. 68 illustrates a case in which one segment of an input packet is included in a link layer payload in a link layer packet header structure according to another embodiment of the present invention.

FIG. 68 illustrates a case in which one segment of an input packet is included in a link layer payload in the link layer packet header structure according to another embodiment of the present invention.

The illustrated embodiment t68010 is similar to the aforementioned link layer packet header structure with respect to segmentation according to another embodiment of the present invention. In this case, however, a common header structure can be used irrespective of whether the corresponding segment is the first segment. The Packet_Type field to the segment sequence number fields have the same structures as the above-described structures. The segment sequence number field can be followed by the LI field irrespective of whether or not the corresponding segment is the first segment, and the LI field can be followed by the segment length field which indicates the payload length of the corresponding link layer packet. The segment length field is as described above. In the present embodiment, the segment ID field can be omitted and the segment length field can follow the S/C field. The LI field can be followed by the aforementioned SIF field.

In table t68020 showing the above embodiment, the Packet_Type field can have the same value, the PC field can be 1 and the S/C field can be 0, for a total of 5 segments. The segment ID field can have the same value. The segment sequence number field can indicate sequence numbers of the segments. The LI field is present irrespective of whether or not the corresponding segment is the first segment. The LI field can be 0 or 1 according to whether or not the corresponding segment is the last segment. The length of the link layer payload can be indicated by the segment length field irrespective of whether the corresponding segment is the first segment.

Figure 69:
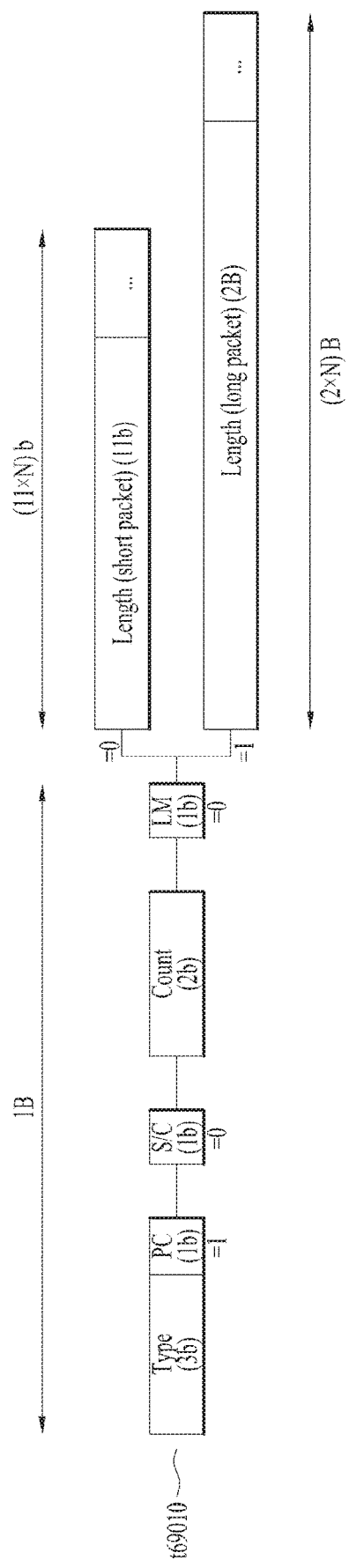
FIG. 69 illustrates a case in which multiple input packets are concatenated and included in a link layer payload in a link layer packet header structure according to another embodiment of the present invention.

FIG. 69 illustrates a case in which multiple input packets are concatenated and included in a link layer payload in the link layer packet header structure according to another embodiment of the present invention.

The illustrated embodiment t69010 may correspond to the aforementioned link layer packet header structure with respect to concatenation according to another embodiment of the present invention. The Packet_Type field, the PC field and the S/C field can be sequentially arranged and followed by the count field and the LM field. The PC field and the S/C field can be 1. When short packets are concatenated and encapsulated, as many 11-bit length fields as the number of concatenated packets can be present according to the value of the LM field. When long packets are concatenated and encapsulated, as many 2-byte length fields as the number of concatenated packets can be present.

The present embodiment can be represented by table t69020 on the basis of the number of concatenated input packets. When the link layer packet has the first segment, the link layer packet can include the first segment length field. 1 bit following the first segment length field may be a reserved bit or may be assigned to the LF field, as described above. When the link layer packet has a segment other than the first segment, the link layer packet can include the LI field and the segment length ID field. A count field value of 00 indicates that 2 input packets have been concatenated. In this case, 2 length fields, that is, 22 bits are used, and 2 padding bits can be used for byte alignments. Accordingly, the total header length can be 4 bytes and a header portion per input packet can be 2 bytes.

Count field values of 01, 10 and 11 respectively indicate that 3, 4 and 5 input packets have been concatenated. In this case, 3, 4 and 5 length fields, that is, 33, 44 and 55 bits are respectively used for the respective cases and 7, 4 and 1 padding bits can be used for byte alignment in the respective cases. Accordingly, the total header lengths can be 6, 7 and 8 bytes and a header portion per input packet can be 2.0, 1.75 and 1.60 bytes in the respective cases.

Figure 70:
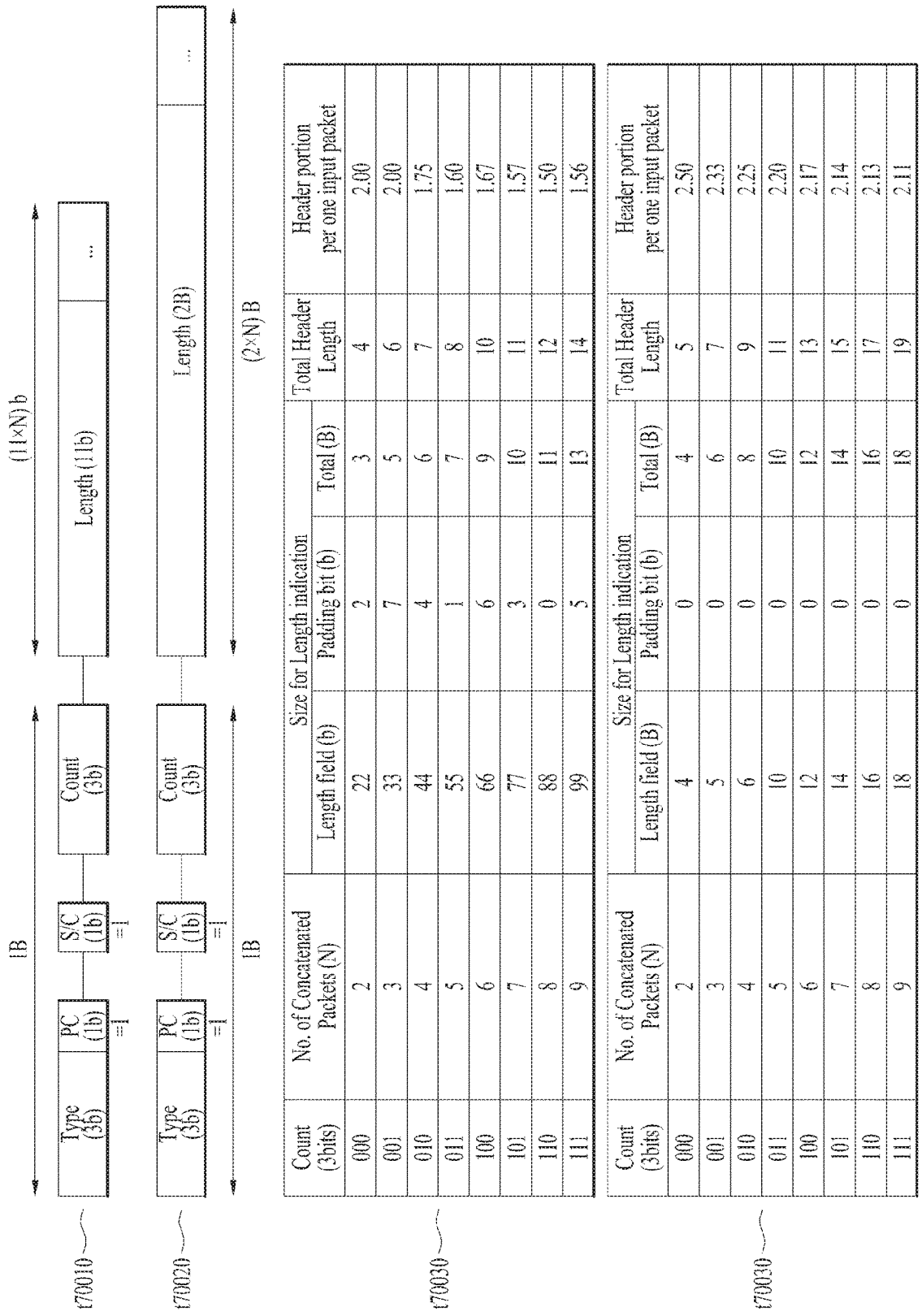
FIG. 70 illustrates a case in which multiple input packets are concatenated and included in a link layer payload in a link layer packet header structure according to another embodiment of the present invention.

FIG. 70 illustrates a case in which multiple input packets are concatenated and included in a link layer payload in the link layer packet header structure according to another embodiment of the present invention.

The illustrated embodiments t70010 and t70020 may correspond to the aforementioned link layer packet header structure with respect to concatenation according to another embodiment of the present invention. In this case, however, the LM field can be omitted from the aforementioned header structure. The Packet_Type field, the PC field and the S/C field can be sequentially arranged and followed by the count field. The PC field and the S/C field can be 1.

In the illustrated embodiment t70010, as many 11-bit length fields as the number of concatenated packets can be present. Here, the length of a short input packet, which can be represented by 11 bits, is indicated by the 11-bit length field. In the case of an input packet longer than 11 bits, the aforementioned single packet encapsulation or segment can be used instead of concatenation. The link layer header structure of the present embodiment can be used when whether concatenation or single packet encapsulation/segmentation is used has been designated on the basis of the size that can be represented by 11 bits.

In the illustrated embodiment t70020, as many 2-byte length fields as the number of concatenated packets can be present. The link layer header structure of the present embodiment supports concatenation for all packets having lengths which can be represented by 2 bytes.

The above embodiments can be represented by tables 70030 and t70040 on the basis of the number of concatenated input packets. Description of the tables has been given above.

In table t70030 with respect to the embodiment t70010, when the count field is 000, for example, 2 input packets have been concatenated, 2 length fields, that is, 22 bits are used, and 2 padding bits are used for byte alignment. Accordingly, the total header length can be 4 bytes and a header portion per input packet can be 2 bytes. When the count field is 001, 3 input packets have been concatenated, 3 length fields, that is, 33 bits are used, and 7 padding bits are used for byte alignment. Accordingly, the total header length can be 6 bytes and a header portion per input packet can be 2 bytes.

In table t70040 with respect to embodiment t70020, when the count field is 000, for example, 2 input packets have been concatenated, and 2 length fields, that is, 4 bytes can be used. Accordingly, the total header length can be 5 bytes and a header portion per input packet can be 2.50 bytes. When the count field is 001, 3 input packets have been concatenated, and 3 length fields, that is, 6 bytes can be used. Accordingly, the total header length can be 7 bytes and a header portion per input packet can be 2.33 bytes. In this case, padding bits may not be needed.

Figure 71:
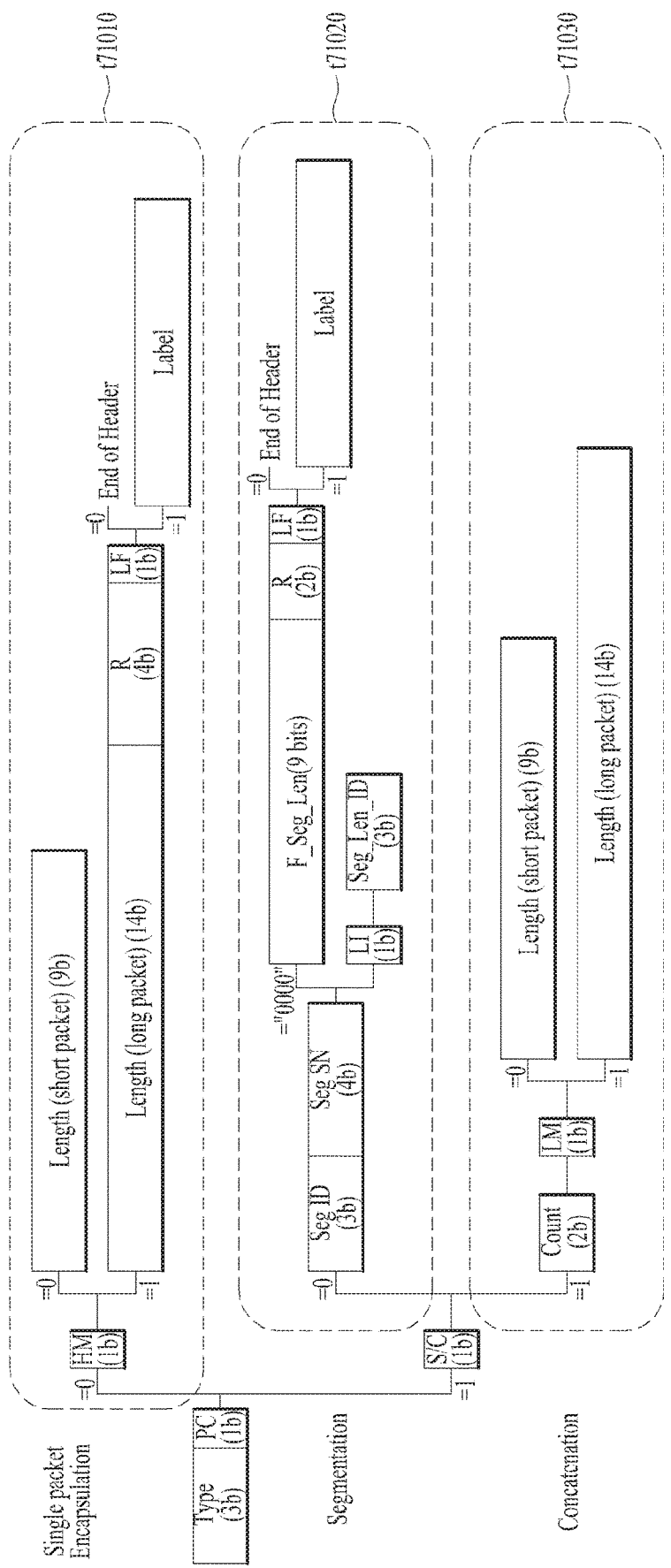
FIG. 71 illustrates a link layer packet structure when word based length indication is used in a link layer packet header structure according to another embodiment of the present invention.

FIG. 71 illustrates a link layer packet structure when word based length indication is used according to another embodiment of the present invention.

When a packet of an upper layer is generated on a word basis, a length field can indicate a length on a word basis instead of a byte basis. That is, when an input packet has a length of 4 bytes, the link layer header can be further optimized because the sizes of the aforementioned length fields can be reduced when a length is indicated on a word basis.

When a length is indicated on a word basis, the link layer header structure is similar to the aforementioned link layer packet header structure according to another embodiment of the present invention. The positions, configurations and operations of the respective fields are as described above. However, the sizes of the fields are reduced.

In single packet encapsulation (t71010), the field indicating the payload length can be reduced by 2 bits. That is, the 11-bit length field can be reduced to 9 bits and 2 bits can be reserved for future use. In addition, when a long input packet is used, the 16-bit length field can be reduced to 14 bits. That is, bits corresponding to the length field used as an MSB can be reduced. An input packet length of up to 2044 bytes (511 words) can be indicated using a 9-bit length field and an input packet length of up to 64 kbytes (65532 bytes, 16383 words) can be indicated using a 14-bit length field. The 2 bits can be reserved for future use. The reserved bits may be used as an indicator (HEF field) indicating presence or absence of the aforementioned optional header.

In the case of segmentation or concatenation (t71020 and t71030), the length fields can be optimized similarly. The 11-bit segment length field and the first segment length field can be reduced to 9 bits. In addition, the 11-bit length fields and 2-byte length fields indicating the lengths of segments can be reduced to 9 bits and 14 bits, respectively. In this case, padding bits may be added for byte alignment.

This optimization method can be applied to all link layer packet structures described in the present invention.

FIG. 72 is a table showing a link layer packet header structure when word based length indication is used according to another embodiment of the present invention on the basis of the number of input packets.

The first table t72010 shows a case in which short input packets are concatenated. When the count field is 00, 2 input packets have been concatenated, 2 length fields, that is, 18 bits, can be used and 6 padding bits can be used for byte alignment. Accordingly, the total header length can be 4 bytes and a header portion per input packet can be 2.0 bytes.

Count field values of 01, 10 and 11 respectively indicate that 3, 4 and 5 input packets have been concatenated. In this case, 3, 4 and 5 length fields, that is, 27, 36 and 45 bits can be used and 5, 4 and 3 padding bits can be used for byte alignment for the respective cases. Accordingly, the total header length can be 5, 6 and 7 bytes and a header portion per input packet can be 1.67, 1.50 and 1.40 bytes in the respective cases.

The second table t72020 shows a case in which long input packets are concatenated. When the count field is 00, 2 input packets have been concatenated, 2 length fields, that is, 28 bits, can be used and 4 padding bits can be used for byte alignment. Accordingly, the total header length can be 5 bytes and a header portion per input packet can be 2.50 bytes. When word based length indication is used, padding bits may be needed even when long input packets are concatenated.

Count field values of 01, 10 and 11 respectively indicate that 3, 4 and 5 input packets have been concatenated. In this case, 3, 4 and 5 length fields, that is, 42, 56 and 70 bits can be used and 6, 0 and 2 padding bits can be used for byte alignment for the respective cases. Accordingly, the total header length can be 7, 8 and 10 bytes and a header portion per input packet can be 2.33, 2.00 and 2.00 bytes in the respective cases.

Figure 73:
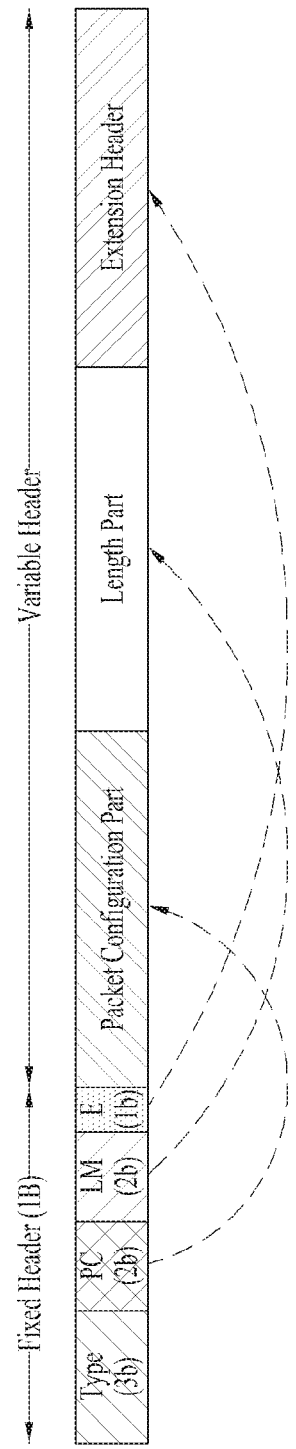
FIG. 73 illustrates a structure of a link layer packet according to the present invention.

FIG. 73 illustrates a structure of a link layer packet according to the present invention.

A link layer packet according to an embodiment of the present invention may include a fixed header and/or a variable header.

The fixed header may include a type element, a PC element, an LM element and/or an E element.

The variable header may include a packet configuration part, a length part and/or an extension header.

The type element includes information indicating protocol type of an input packet. Here, the input packet refers to a packet processed in a higher layer of the link layer. The type element will be described in detail later.

The PC element identifies a packet configuration. The PC element may include information indicating a format into which an input packet is processed in the link layer. The PC element may include information indicating a form in which the input packet is included in a link layer packet payload.

For example, a PC element value of "00" may indicate that a single input packet is included in a link layer packet. In this case, the packet configuration part may not be included in the link layer packet.

For example, a PC element value of "01" may indicate that a single input packet is divided into one or more segments and one segment is included in one link layer packet. In this case, the packet configuration part may be included in the link layer packet and may follow the fixed header. Here, the packet configuration part may include information regarding segmentation of the input packet. The information regarding segmentation has been described above.

For example, a PC element value of "10" may indicate that one or more input packets are included in a single link layer packet. In this case, the packet configuration part may be included in the link layer packet and may follow the fixed header. Here, the packet configuration part may include information related to concatenation of the input packets. The information related to concatenation has been described above.

For example, a PC element value of "11" may be reserved to indicate a packet configuration in a different format.

The length mode (LM) element represents a method of indicating the length of a link layer packet (or link layer packet payload). The LM element may indicate a format of information included in the length part.

For example, an LM element value of "00" may indicate that the length part does not include a field indicating the length of a link layer packet (or link layer packet payload). When a receiver can extract length information from the link layer packet payload or the link layer packet payload has a fixed length, the LM element may be "00".

For example, an LM element value of "01" may indicate that the field indicating the length of a link layer packet (or link layer packet payload) is included in the length part in the form of a length ID. The length ID may indicate the length of the link layer packet payload, which will be described in more detail later.

For example, an LM element value of "10" may indicate that the field indicating the length of a link layer packet (or link layer packet payload) is included in the length part in the form of a short packet length. The short packet length may be used to indicate a short length.

For example, the field indicating a length in the form of a short packet length may be assigned 11 bits. In this case, the field may indicate lengths of up to 2,047 bytes.

For example, an LM element value of "11" may indicate that the field indicating the length of a link layer packet (or link layer packet payload) is included in the length part in the form of a long packet length. The long packet length may be used to indicate a long length. For example, the field indicating a length in the form of a long packet length may be assigned 2 bytes. In this case, the field may indicate lengths of up to 65,535 bytes.

The E element indicates whether an extension header is present in a link layer packet.

For example, an E element value of "0" may indicate that an additional extension header is not present.

For example, an E element value of "1" may indicate that an extension header is present after the variable header according to the value of the fixed header. The configuration of the extension header may depend on packet usage form.

As to the link layer packet header structure, a broadcast system (or receiver) may acquire information about the packet configuration part, which can be included in the variable header, through the PC element, obtain information about the length part, which can be included in the variable header, through the LM element and acquire information about the extension header, which can be included in the variable header, through the E element. Accordingly, the receiver can be aware of the structure of the header included in the link layer packet by acquiring only the fixed header, and thus a link layer packet processing speed can be improved.

FIG. 74 illustrates definition of a Type element and a Length ID field depending on values thereof according to an embodiment of the present invention.

As shown in (a), the Type element may indicate a protocol to which an input packet conforms or the type of the input packet according to the value thereof.

As shown in (b), the Length ID field may indicate the length of a link layer packet according to the value thereof. When a length is indicated using the Length ID field, various lengths may be indicated even when fewer bits are allocated to the Length ID field. Accordingly, various link layer packet lengths may be indicated using the Length ID field although the length of the link layer packet header is reduced.

Figure 75:
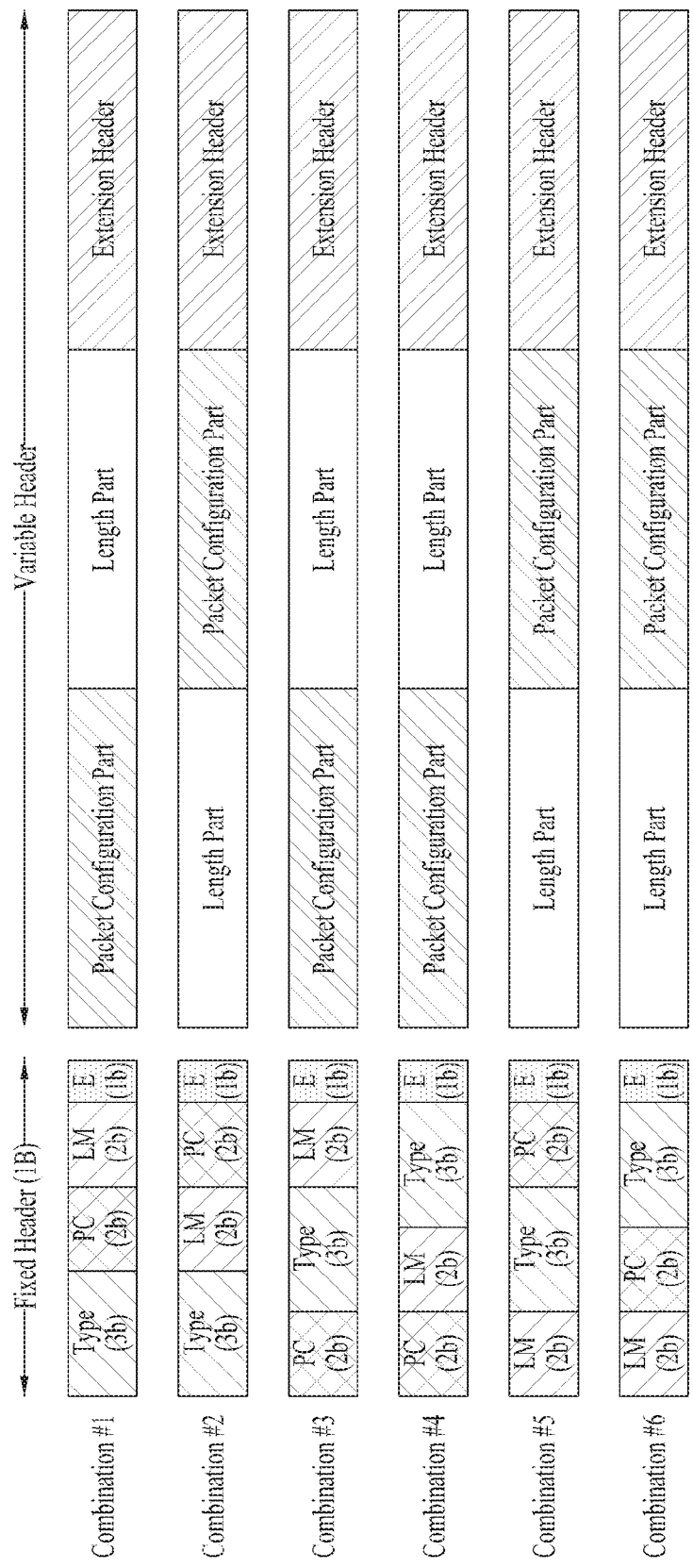
FIG. 75 illustrates various combinations of a fixed header and/or a variable header according to an embodiment of the present invention.

FIG. 75 illustrates various combinations of the fixed header and/or the variable header according to an embodiment of the present invention.

The aforementioned elements (or fields) that can be included in the fixed header may be included in the fixed header according to Combination #1 to Combination #7, as shown in the figure.

The packet configuration part, the order of the length part and/or the extension header that can be included in the variable header may be changed according to combinations.

FIG. 76 illustrates a link layer packet header when the PC element is "00" according to an embodiment of the present invention.

When the PC element is "00", the PC element indicates that a single input packet (packet of a higher layer of the link layer) is included in a link layer packet payload, as described above.

In this case, the variable header may not be present or may include the length part. Information in various formats, which indicates a length, may be included in the length part depending on the value of the LM element. Formats of information included in the length part are as described above.

When the length part is present, the length part may have a fixed length. In this case, the size of length indication information included in the length part may depend on the value of the LM element. A region other than the length indication information may be reserved and may include additional signaling information.

Figure 77:
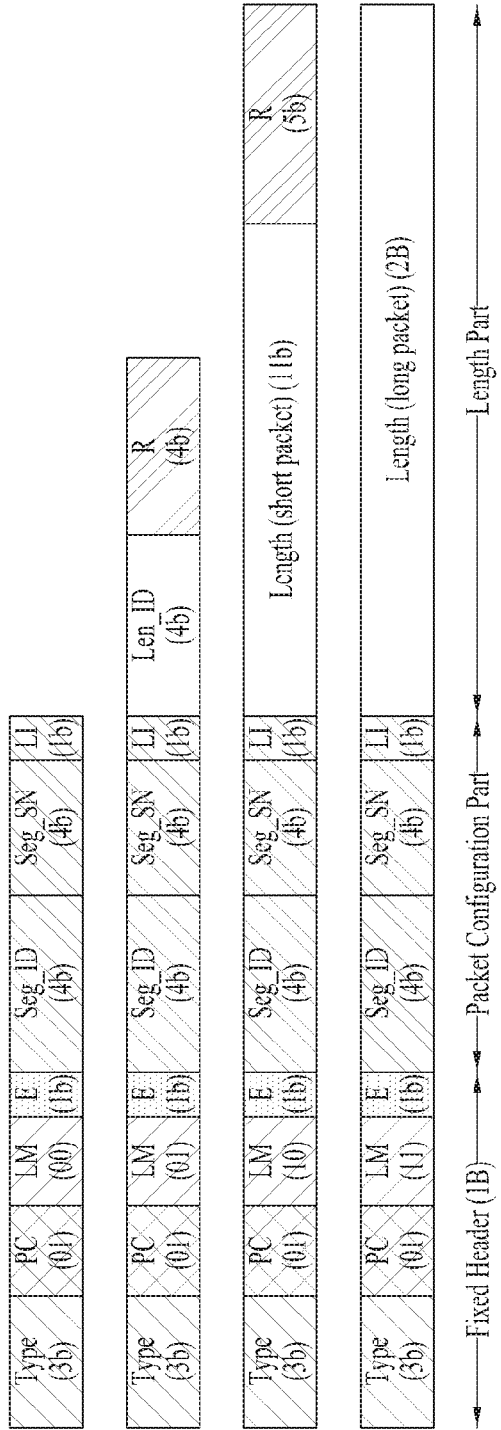
FIG. 77 illustrates a link layer packet header when a PC element value is "01" according to an embodiment of the present invention.

FIG. 77 illustrates a link layer packet header when the PC element is "01" according to an embodiment of the present invention.

When the PC element is "01", the PC element indicates that a single input packet is divided into one or more segments and one segment is included in a link layer packet payload, as described above.

In this case, the variable header may not be present or may include the length part. Information in various formats, which indicates a length, may be included in the length part depending on the value of the LM element. Formats of information included in the length part are as described above.

When the length part is present, the length part may have a fixed length. In this case, the size of length indication information included in the length part may depend on the value of the LM element. A region other than the length indication information may be reserved and may include additional signaling information.

When the PC element is "01", the link layer packet header may include the packet configuration part.

The packet configuration part may include a Seg_ID field, a Seg_SN field and/or an LI field.

The Seg_ID field includes information indicating a specific segment from among segments included in a single input packet.

The Seg_SN field indicates a sequence number of a segment in the single input packet.

The LI field includes information indicating whether a segment is the last segment in the single input packet.

Figure 78:
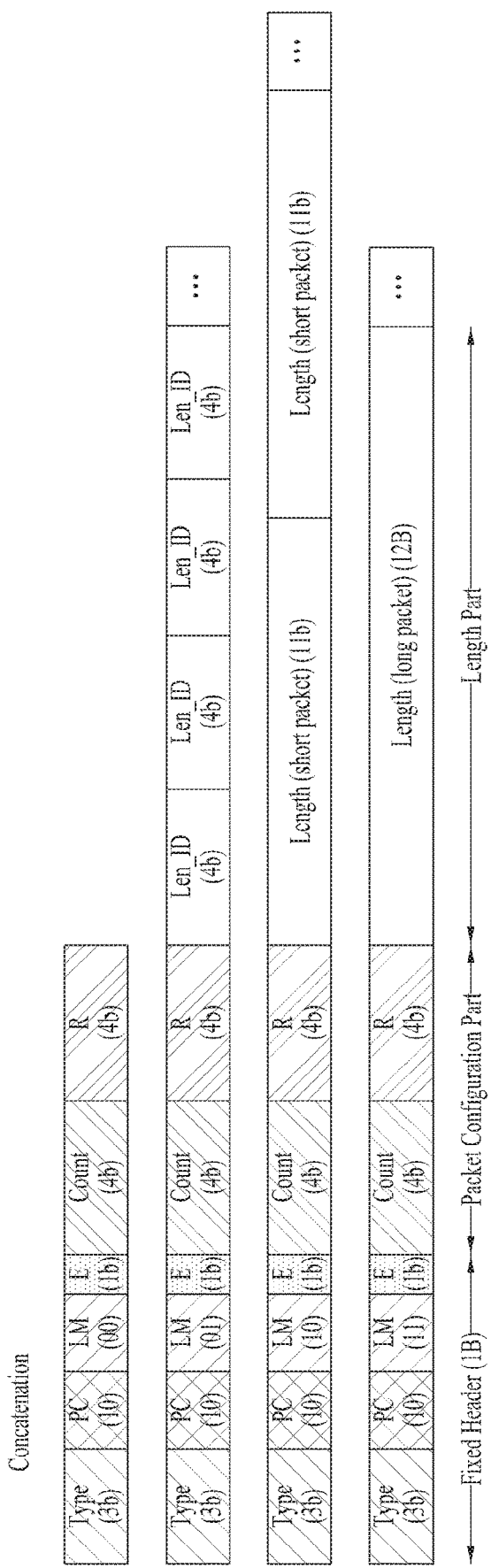
FIG. 78 illustrates a link layer packet header when a PC element value is "10" according to an embodiment of the present invention.

FIG. 78 illustrates a link layer packet header when the PC element is "10" according to an embodiment of the present invention.

When the PC element is "10", the PC element indicates that one or more input packets are included in a link layer packet payload, as described above.

In this case, the packet configuration part may include a count field. The count field may indicate the number of input packets included in the link layer packet payload.

The length part may include length information in various formats. In this case, the length part ma include one or more pieces of length information. That is, a plurality of length information may respectively indicate the lengths of a plurality of input packets included in the link layer packet payload.

When a plurality of length information is included in the length part, the length information order may be determined depending on the order of transmission of the plurality of input packets in the link layer packet payload. That is, the first length information in the length part may indicate the length of the first input packet in the payload, and the n-th length information in the length part may indicate the length of the n-th input packet in the payload.

Figure 79:
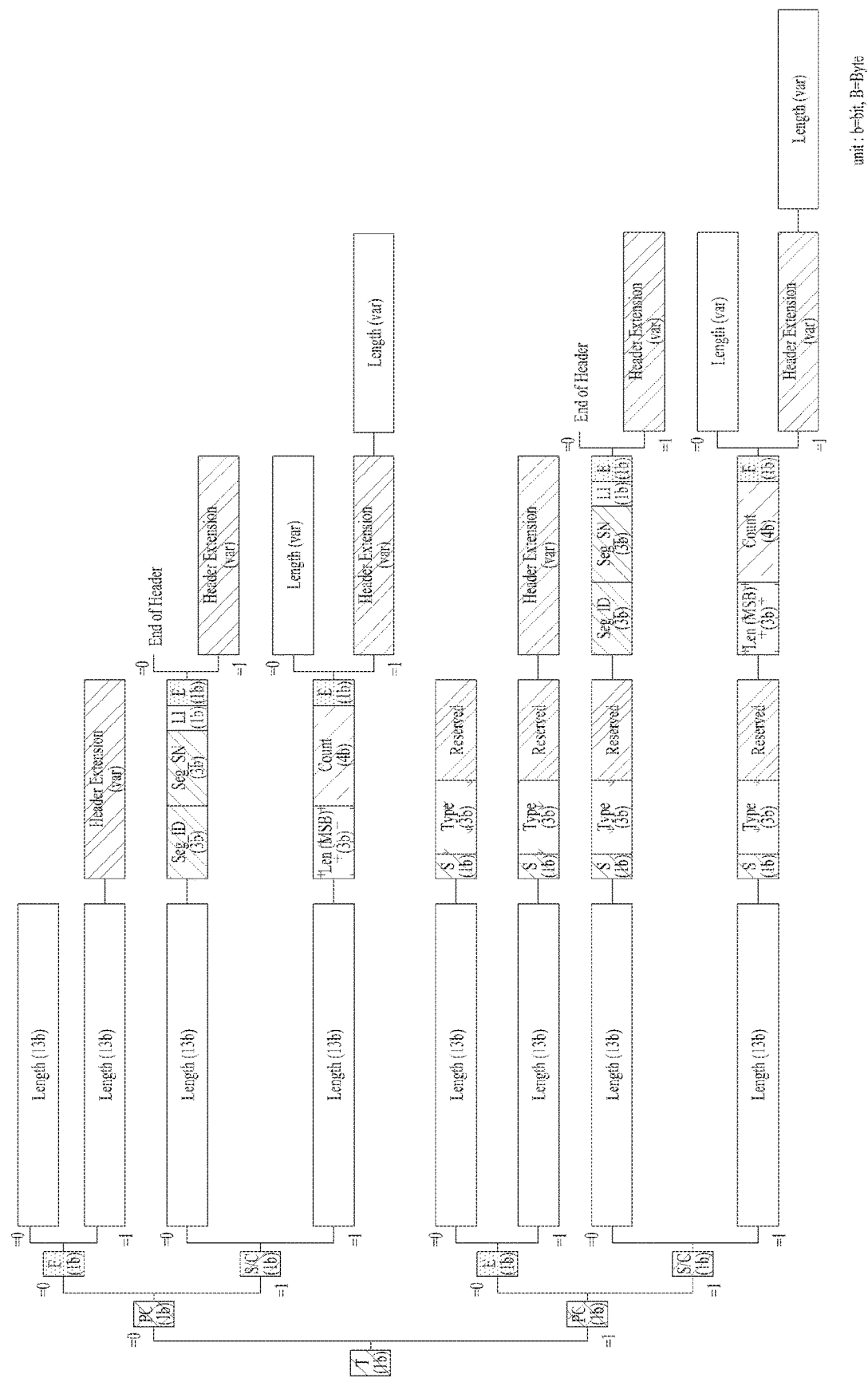
FIG. 79 illustrates a structure of a link layer packet of a first version according to an embodiment of the present invention.

FIG. 79 illustrates a structure of a link layer packet of a first version according to an embodiment of the present invention.

Referring to the figure, various link layer packet header structures are present according to values of elements or fields included in the link layer packet. The elements or fields have been described above.

Figure 80:
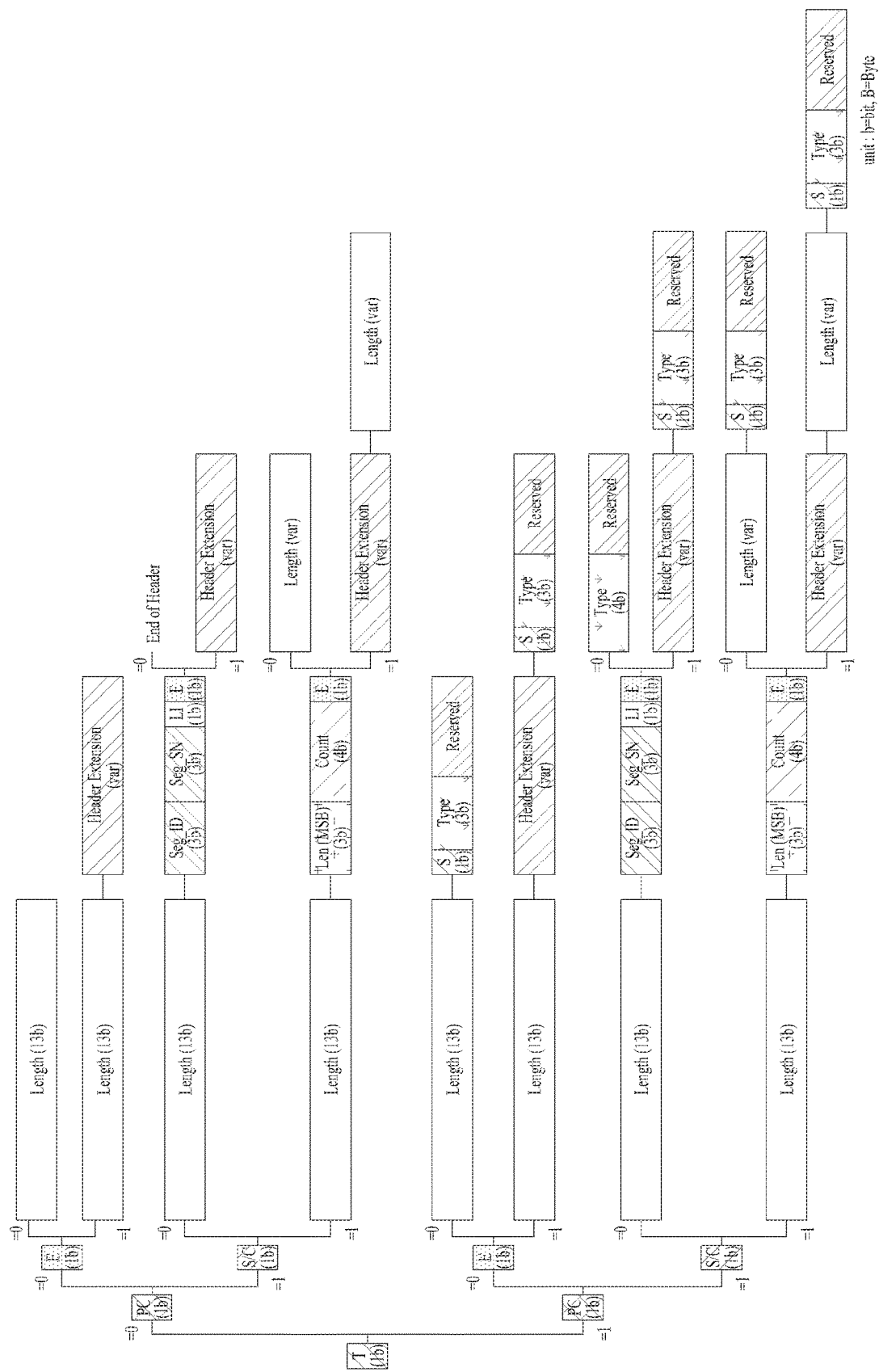
FIG. 80 illustrates a structure of a link layer packet of a second version according to another embodiment of the present invention.

FIG. 80 illustrates a structure of a link layer packet of a second version according to another embodiment of the present invention.

Referring to the figure, various link layer packet header structures are present according to values of elements or fields included in the link layer packet. The elements or fields have been described above.

While various link layer packet (or link layer packet header) structures are illustrated, it may be assumed that the link layer packet of the first version and the link layer packet of the second version have a 2-byte header.

According to the illustrated link layer packet structure, encapsulation of a default protocol occupying most of the packet may be signaled using a minimum indication field.

In addition, according to the illustrated link layer packet structure, since an IP packet length of up to 64 kB (65,535 bytes) can be supported, signaling may be performed such that IP packets of up to 64 kB can be processed in the link layer.

According to the illustrated link layer packet structure, an extension header may be included in a link layer packet such that correct information about packet processing can be provided for all cases. In addition, the link layer packet may include an extension header flag indicating presence of an extension header.

As to all elements and/or fields included in the link layer packet header, the mapping order in the header may be changed. The mapping order may be changed as in the illustrated embodiments.

The illustrated link layer packet of the first version and/or link layer packet of the second version may include a T element, a PC element, an S/C element, an E element, a Length element and/or an S element. Here, "element" and "field" may be used interchangeably.

The T element may indicate whether a packet included in a link layer packet payload conforms to a default protocol. For example, a T element value of "0" may indicate that an input packet included in the payload conforms to the default protocol. In an IP based broadcast system, a packet conforming to the default protocol may correspond to an IP packet. A T element value of "1" may indicate that a packet does not conform to the default protocol. In this case, a protocol to which the input packet conforms may be indicated through an additional field or element.

The PC (Packet Configuration) element indicates a link layer packet payload configuration. For example, a PC element value of "0" may indicate that one packet is included in the payload. In this case, the E element (or field) that indicates presence or absence of an extension header may be included in the header. A PC element value of "1" may indicate that one of segmentation, by which one input packet is divided into a plurality of segments and one of the segments is included in the payload, or concatenation, by which one or more input packets are included in the payload, has been performed. In this case, the header may further include information indicating whether segmentation or concatenation has been performed.

The S/C element may indicate whether segmentation or concatenation of input packets has been performed in the link layer packet payload. For example, an S/C element value of "0" may indicate that segmentation has been performed and an S/C element value of "1" may indicate that concatenation has been performed.

The E element indicates presence or absence of the extension header. For example, an E element value of "O" may indicate absence of the extension header. An E element value of "1" may indicate presence of the extension header. The length of the extension header and the configuration of fields included in the extension header may depend on packet usage.

The length element may indicate the length of the payload. The length element may be assigned 13 bits. In this case, the length element may indicate a length of up to 8,191 bytes.

The S element may indicate the type of data included in the payload. For example, when the S element is "0", a packet included in the payload may correspond to a data packet including broadcast data. In this case, the type of the data packet may be indicated by an additional field or element. When the S element is "1", a packet included in the payload may correspond to a signaling packet including signaling information.

FIG. 81 illustrates combinations for indicating types of packets included in the payload according to an embodiment of the present invention.

According to an embodiment of the present invention, various input packets may be indicated through combinations of the T element. S element and/or Packet Type element (Type element), as shown in the table.

When the T element is "0", an input packet is an IPv4 packet or an IPv6 packet that conforms to IP corresponding to a default protocol. In this case, IP version 4 or 6 may be indicated using the first n bits (e.g., n=4) included in the payload. When the T element is "I", input packet type may be indicated by a combination of the S element and/or Packet Type element which follow the T element.

When the S element is "0", the S element may indicate that the payload includes a data packet containing broadcast data. When the S element is "1", the S element may indicate that the payload includes a signaling packet containing signaling information.

When the S element is "0", the Packet Type element may indicate whether an input packet corresponds to a compressed IP packet (packet to which RoHC has been applied), an MPEG2-TS packet or Extension according to the value thereof. Here, Extension may indicate a different type of packet which is not mentioned above. When the S element is "1", the Packet Type element may indicate signaling type of L2 (Layer 2 or link layer). L2 signaling may indicate inclusion of signaling for channel scan and service acquisition, signaling for emergency alert, signaling for header compression and/or multiple signaling.

FIG. 82 illustrates sizes of data allocated to each element or field to signal segmentation and/or concatenation according to an embodiment of the present invention.

FIG. 82(a) shows the number of bits allocated to each field or element when 11 bits are allocated for length indication and an input packet of up to 64 kB is supported regardless of header overhead.

When input packets are included in a payload of a link layer packet according to segmentation or concatenation, a 2-byte header may be added to the header of the link layer packet for byte alignment.

FIG. 82(b) shows the number of bits allocated to each field or element when 11 bits are allocated for length indication and 1-byte overhead is used. When the 1-byte header is added, the link layer protocol may support an input packet of up to 16 kB.

FIG. 82(c) shows the number of bits allocated to each field or element when 13 bits are allocated for length indication and 1-byte overhead is used. In this case, only a 1-byte header is added to the header of the link layer packet while the link layer protocol supports an input packet of up to 64 kB.

FIG. 83 illustrates link layer packet header structures when a single input packet is included in a link layer packet payload according to an embodiment of the present invention.

When the PC element is "0", the header structure may be changed to the illustrated structures according to values of the T element and/or E element.

In the present embodiment, the extension header has a size of 1 byte if the extension header is present.

Elements or fields included in each header structure have been described above.

Figure 84:
FIG. 84 illustrates link layer packet header structures when segments of an input packet are included in a payload of a link layer packet according to an embodiment of the present invention.

FIG. 84 illustrates link layer packet header structures when segments of an input packet are included in a link layer packet payload according to an embodiment of the present invention.

When the T element is "0", the PC element is "1" and the S/C element is "1", the header structure may be changed to the illustrated structures according to values of the E element.

In the present embodiment, the extension header has a size of 1 byte if the extension header is present.

The present embodiment illustrates header structures when an IP packet is included in a link layer packet.

Elements or fields included in each header structure have been described above.

Figure 85:
FIG. 85 illustrates link layer packet header structures when segments of an input packet are included in a payload of a link layer packet according to an embodiment of the present invention.

FIG. 85 illustrates link layer packet header structures when segments of an input packet are included in a link layer packet payload according to an embodiment of the present invention.

When the T element is "l", the PC element is "1" and the S/C element is "l", the header structure may be changed to the illustrated structures according to values of the E element.

In the present embodiment, the extension header has a size of 1 byte if the extension header is present.

The present embodiment illustrates header structures when an in input packet other than IP packets is included in a link layer packet. The input packet type may be indicated by the S element and/or the Packet Type element (Type element), as described above.

Elements or fields included in each header structure have been described above.

Figure 86:
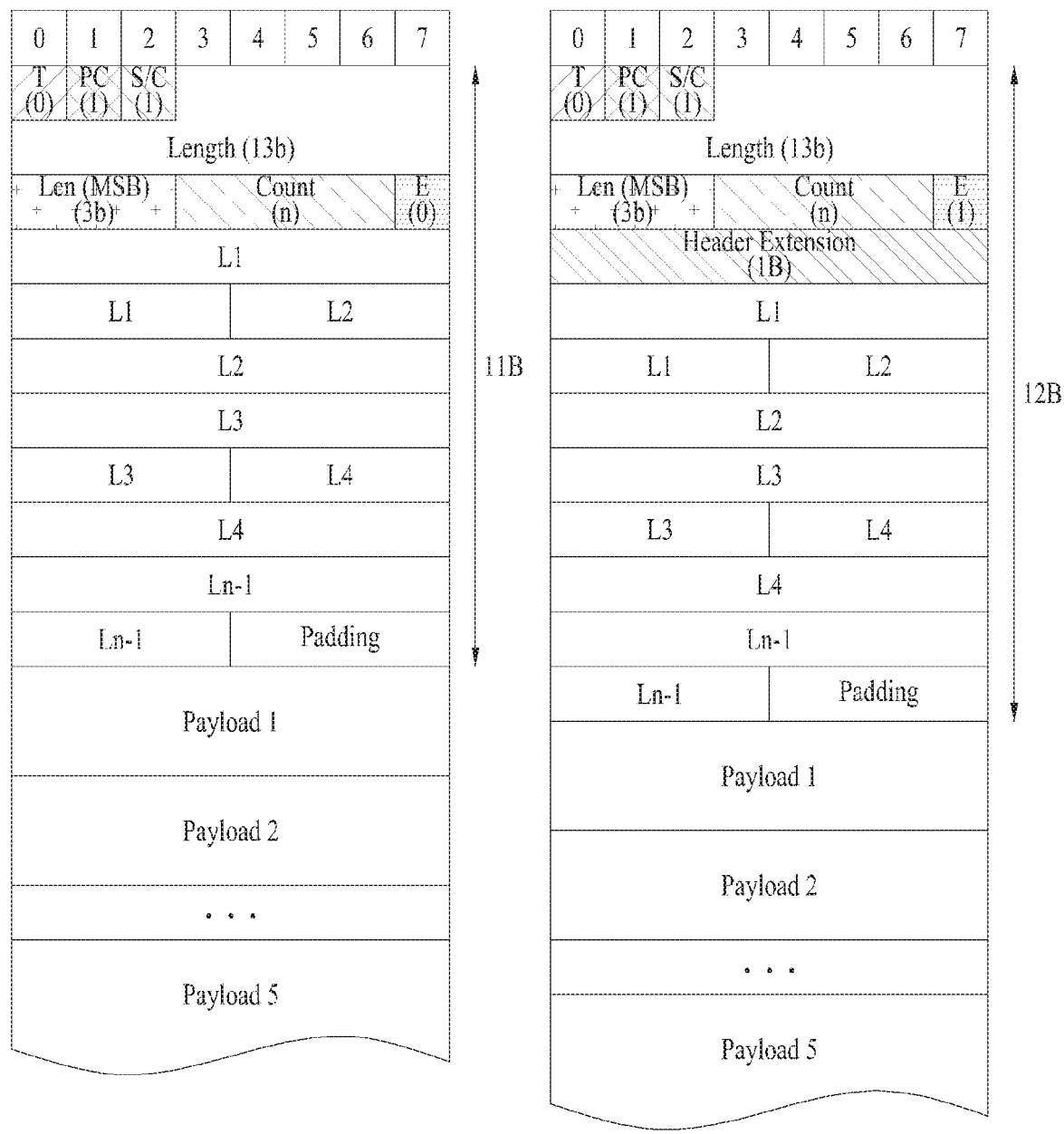
FIG. 86 illustrates link layer packet header structures when two or more input packets are included in a payload of a link layer packet according to an embodiment of the present invention.

FIG. 86 illustrates link layer packet header structures when two or more input packets are included in a link layer packet payload according to an embodiment of the present invention.

When the T element is "0", the PC element is "l" and the S/C element is "1", the header structure may be changed to the illustrated structures according to values of the E element.

In the present embodiment, the extension header has a size of 1 byte if the extension header is present.

The present embodiment illustrates header structures when an IP packet is included in a link layer packet as an input packet.

Elements or fields included in each header structure have been described above.

Figure 87:
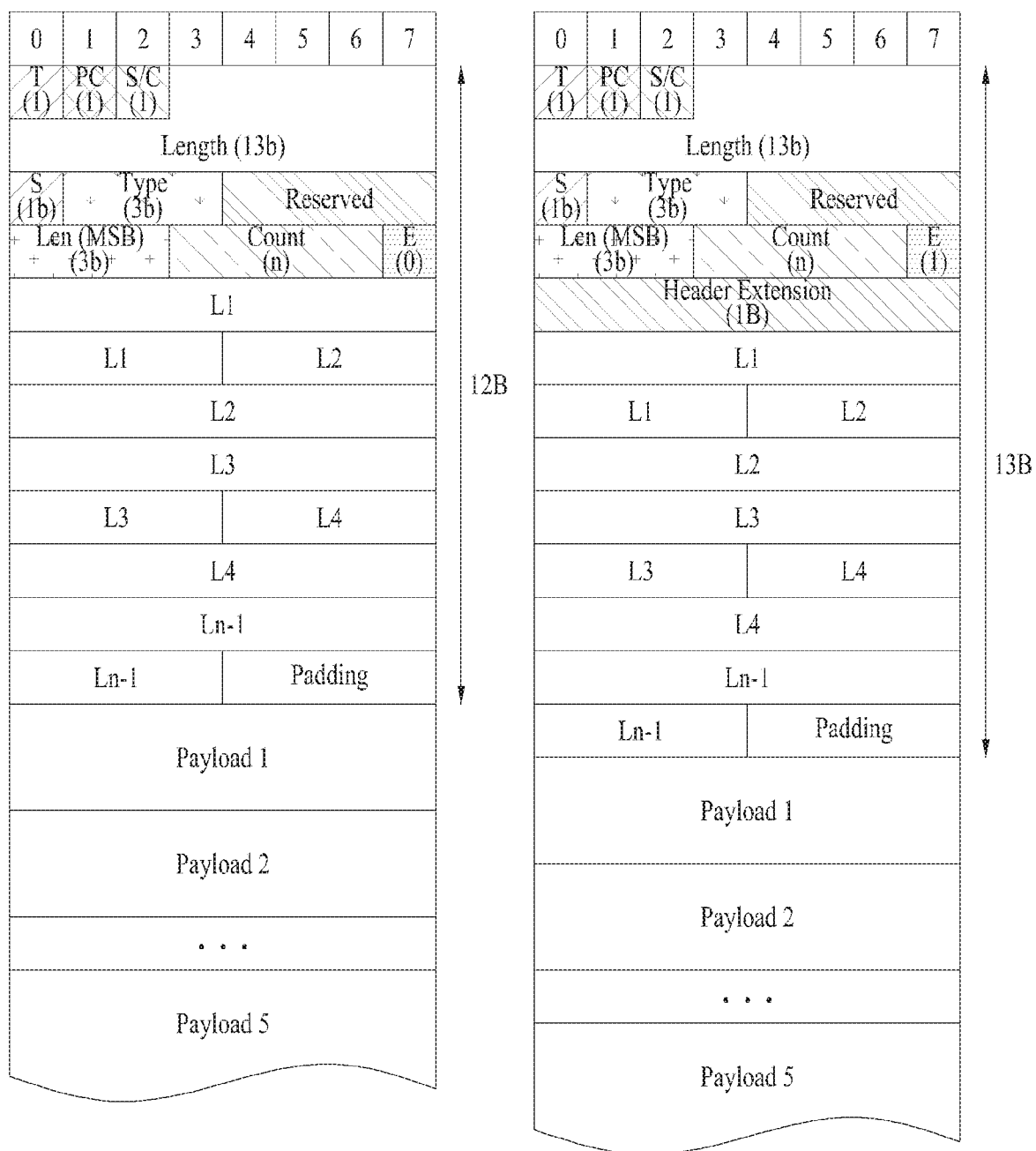
FIG. 87 illustrates link layer packet header structures when two or more input packets are included in a payload of a link layer packet according to an embodiment of the present invention.

FIG. 87 illustrates link layer packet header structures when two or more input packets are included in a link layer packet payload according to an embodiment of the present invention.

When the T element is "l", the PC element is "l" and the S/C element is "l", the header structure may be changed to the illustrated structures according to values of the E element.

In the present embodiment, the extension header has a size of 1 byte if the extension header is present.

The present embodiment illustrates header structures when input packets other than IP packets are included in a link layer packet as an input packet. The input packet type may be indicated by the S element and/or the Packet Type element (Type element), as described above.

Elements or fields included in each header structure have been described above.

Figure 88:
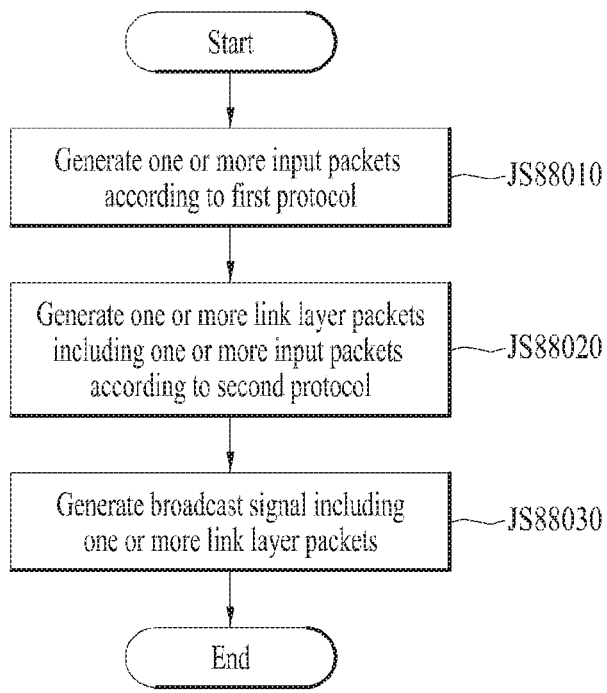
FIG. 88 is a flowchart illustrating a method of transmitting a broadcast signal according to an embodiment of the present invention.

FIG. 88 is a flowchart illustrating a method of transmitting a broadcast signal according to an embodiment of the present invention.

A broadcast transmitter generates one or more input packets according to a first protocol (JS88010).

The broadcast transmitter generates one or more link layer packets including the one or more input packets according to a second protocol (JS88020). Here, each link layer packet may include a header and a payload. The header may include packet type information indicating types of the input packets and payload configuration information indicating whether the payload includes one input packet, more than one input packet or a part of one input packet.

The broadcast transmitter generates a broadcast signal including the one or more link layer packets (JS88030).

Figure 89:
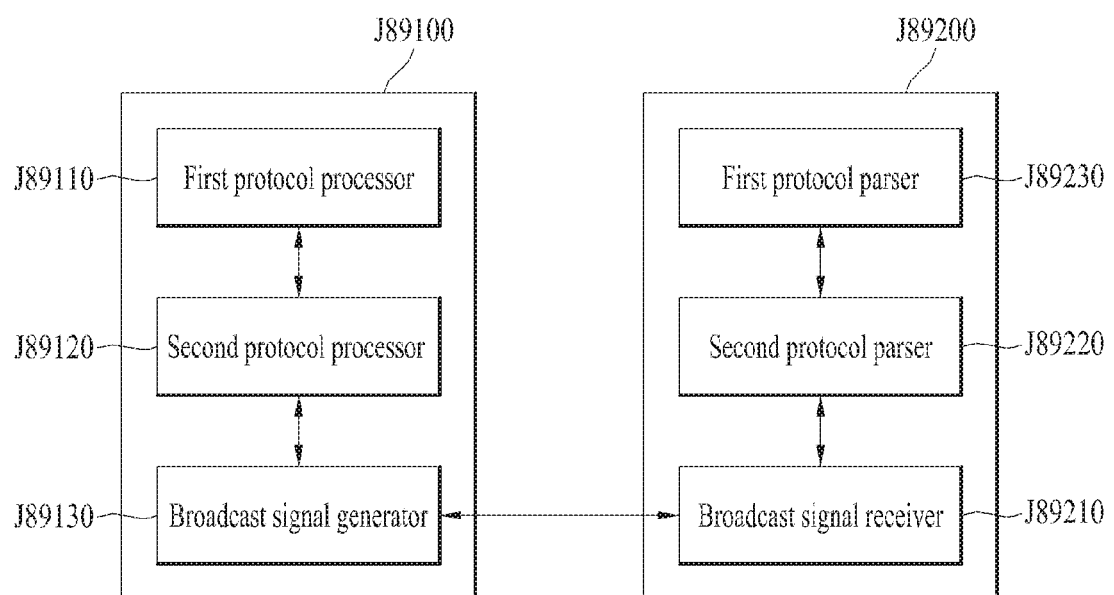
FIG. 89 illustrates a broadcast system according to an embodiment of the present invention.

FIG. 89 illustrates a broadcast system according to an embodiment of the present invention.

The broadcast system according to an embodiment of the present invention may include a broadcast transmitter J89100 and/or a broadcast receiver J89200.

The broadcast transmitter J89100 may include a first protocol processor J89110, a second protocol processor J89120 and/or a broadcast signal generator J89130.

The broadcast receiver J89200 may include a broadcast signal receiver J89210, a second protocol parser J89220 and/or a first protocol parser J89230.

The first protocol processor J89110 generates one or more input packets according to the first protocol.

The second protocol processor J89120 generates one or more link layer packets including the one or more input packets according to the second protocol. Here, each link layer packet may include a header and a payload. The header may include packet type information indicating types of the input packets and payload configuration information indicating whether the payload includes one input packet, more than one input packet or a part of one input packet.

The broadcast signal generator J89130 generates a broadcast signal including the one or more link layer packets.

The first protocol processor J89110 and the second protocol processor J89120 may be implemented in the form of a single processor. The broadcast transmitter J89100 may further include devices or modules included in general broadcast transmitters.

The broadcast signal receiver J89210 receives a broadcast signal. The broadcast signal includes one or more link layer packets.

The second protocol parser J89220 parses or decodes the link layer packets according to the second protocol. The second protocol parser J89220 extracts one or more input packets by parsing the link layer packets according to the second protocol.

The first protocol parser J89230 parses or decodes the one or more input packets according to the first protocol.

The second protocol parser 389220 and the second protocol parser J89220 may be implemented in the form of a single processor.

Although not illustrated, the broadcast receiver J89200 may process one or more input packets to present a broadcast service/program to viewers. During this procedure, all or part of the aforementioned signaling information may be used by the broadcast receiver. The procedure in which the broadcast receiver uses signaling information has been described above.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device.

The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

Various embodiments have been described in the best mode for carrying out the invention.

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

What is claimed is:

1. A method of transmitting a broadcast signal, the method comprising:
   processing one or more input packets to generate one or more link layer packets, a link layer packet including a header and a payload,
   the header including packet type information representing a type of an input packet in the payload and payload configuration information representing a configuration of the payload,
   the payload configuration information representing whether the link layer packet carries a single input packet or not,
   wherein the type of the input packet is either an Internet Protocol (IP) packet or a Movie Picture Exports Group (MPEG) Transport Stream (TS) packet,
   the payload configuration information is set to:
   0 (zero) in response to a layer packet including a single input packet, and
   1 in response to a link layer packet including more than one input packet or a segmented part of one input packet,
   in response to the link layer packet including the single input packet, the header includes header mode information, the header mode information is set to:
   0 (zero) in response to a payload length that is less than 2048 bytes,
   1 in response to a payload length that is larger than 2047 bytes;
   processing the one or more link layer packets to generate the broadcast signal; and
   transmitting the broadcast signal.

2. The method of claim 1, wherein:
   in response to the link layer packet including more than one input packet or a segmented part of one input packet, the header includes segmentation concatenation information representing whether the link layer packet includes the more than one input packet or the segmented part of one input packet.

3. The method of claim 2, wherein the segmentation concatenation information is set to:
   0 (zero) in response to the link layer packet including the segmented part of one input packet,
   1 in response to the link layer packet including more than one input packet.

4. A device of transmitting a broadcast signal, the device comprising:
   a link layer processor configured to process one or more input packets to generate one or more link layer packets, a link layer packet including a header and a payload,
   the header including packet type information representing a type of an input packet in the payload and payload configuration information representing a configuration of the payload,
   the payload configuration information representing whether the link layer packet carries a single input packet or not,
   wherein the type of the input packet is either an Internet Protocol (IP) packet or a Movie Picture Exports Group (MPEG) Transport Stream (TS) packet,
   wherein the payload configuration information is set to:
   0 (zero) in response to a layer packet including a single input packet, and
   1 in response to a link layer packet including more than one input packet or a segmented part of one input packet, in response to the link layer packet including the single input packet, the header includes header mode information, the header mode information is set to:
0 (zero) in response to a payload length that is less than 2048 bytes,
1 in response to a payload length that is larger than 2047 bytes;
a processor configured to process the one or more link layer packets to generate the broadcast signal; and
a broadcast signal transmitter configured to transmit the broadcast signal.

5. The device of claim 4, wherein:
in response to the link layer packet including more than one input packet or a segmented part of one input packet, the header includes segmentation concatenation information representing whether the link layer packet includes the more than one input packet or the segmented part of one input packet.

6. The device of claim 5, wherein the segmentation concatenation information is set to:
0 (zero) in response to the link layer packet including the segmented part of one input packet,
1 in response to the link layer packet including more than one input packet.

7. A device of receiving a broadcast signal, the device comprising:
a tuner configured to receive the broadcast signal including one or more link layer packets;
a first decoder configured to decode the one or more link layer packets carrying one or more input packets,
a link layer packet including a header and a payload,
the header including packet type information representing a type of an input packet in the payload and payload configuration information representing a configuration of the payload,
the payload configuration information representing whether the link layer packet carries a single input packet or not,
wherein the type of the input packet is either an Internet Protocol (IP) packet or a Movie Picture Exports Group (MPEG) Transport Stream (TS) packet,
in response to the payload configuration information that is set to 0 (zero), a link layer packet includes a single input packet,
in response to the payload configuration information that is set to 1, a link layer packet includes more than one input packet or a segmented part of one input packet, and
in response to the payload configuration information that is set to 0 (zero), the header further includes header mode information, the header mode information is set to:
0 (zero) in response to a payload length that is less than 2048 bytes,
1 in response to a payload length that is larger than 2047 bytes,
wherein the first decoder is further configured to decode data in each link layer packet based on information in the header of each link layer packet; and
a second decoder configured to decode the one or more input packets.

8. The device of claim 7, wherein:
in response to the payload configuration information that is set to 1, the header includes segmentation concatenation information representing whether the link layer packet includes the more than one input packet or the segmented part of one input packet.

9. The device of claim 8, wherein the segmentation concatenation information is set to:
0 (zero) in response to the link layer packet including the segmented part of one input packet,
1 in response to the link layer packet including more than one input packet.

10. A method of receiving a broadcast signal, the method comprising:
receiving the broadcast signal including one or more link layer packets,
decoding the one or more link layer packets carrying one or more input packets,
a link layer packet including a header and a payload,
the header including packet type information representing a type of an input packet in the payload and payload configuration information representing a configuration of the payload,
the payload configuration information representing whether the link layer packet carries a single input packet or not,
wherein the type of the input packet is either an Internet Protocol (IP) packet or a Movie Picture Exports Group (MPEG) Transport Stream (TS) packet,
in response to the payload configuration information that is set to 0 (zero), a link layer packet includes a single input packet,
in response to the payload configuration information that is set to 1, a link layer packet includes more than one input packet or a segmented part of one input packet, and
in response to the payload configuration information that is set to 0 (zero), the header further includes header mode information, the header mode information is set to:
0 (zero) in response to a payload length that is less than 2048 bytes,
1 in response to a payload length that is larger than 2047 bytes,
wherein data in the payload of each link layer packet is decoded based on information in the header of each link layer packet; and
decoding the one or more input packets.

11. The method of claim 10, wherein:
in response to the payload configuration information that is set to 1, the header includes segmentation concatenation information representing whether the link layer packet includes the more than one input packet or the segmented part of one input packet.

12. The method of claim 11, wherein the segmentation concatenation information is set to:
0 (zero) in response to the link layer packet including the segmented part of one input packet,
1 in response to the link layer packet including more than one input packet.

* * * * *